(12) United States Patent
Aoyama et al.

(10) Patent No.: US 10,419,115 B2
(45) Date of Patent: Sep. 17, 2019

(54) TRANSMITTER, TRANSMITTING METHOD, AND RECEIVING METHOD

(71) Applicant: PANASONIC INTELLECTUAL PROPERTY CORPORATION OF AMERICA, Torrance, CA (US)

(72) Inventors: Hideki Aoyama, Osaka (JP); Mitsuaki Oshima, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/693,512

(22) Filed: Sep. 1, 2017

(65) Prior Publication Data

US 2017/0363895 A1    Dec. 21, 2017

Related U.S. Application Data

(63) Continuation of application No. 15/157,598, filed on May 18, 2016, now Pat. No. 9,791,727, which is a
(Continued)

(30) Foreign Application Priority Data

Feb. 19, 2014    (JP) .................. 2014-030063

(51) Int. Cl.
    *G02F 1/135*    (2006.01)
    *H04B 10/116*   (2013.01)
    (Continued)

(52) U.S. Cl.
    CPC .......... *H04B 10/116* (2013.01); *G02F 1/135* (2013.01); *G02F 1/1336* (2013.01);
    (Continued)

(58) Field of Classification Search
    CPC .................. G02F 1/135; G02F 2001/1351
    See application file for complete search history.

(56) References Cited

U.S. PATENT DOCUMENTS

| 6,437,893 B1 | 8/2002 | Rivollet et al. |
| 7,583,901 B2 | 9/2009 | Nakagawa et al. |
| (Continued) |

FOREIGN PATENT DOCUMENTS

| JP | 61-252727 | 11/1986 |
| JP | 64-004127 | 1/1989 |
| (Continued) |

OTHER PUBLICATIONS

International Search Report (PCT/ISA/210), dated Aug. 12, 2014, for the corresponding International Application No. PCT/JP2014/002787 (including PCT/ISA/220 and PCT/ISA/237).
(Continued)

*Primary Examiner* — Phu Vu
(74) *Attorney, Agent, or Firm* — Greenblum & Bernstein, P.L.C.

(57) ABSTRACT

An apparatus is provided that includes a light source, a memory storing a visible light signal, a control circuit configured to control change in luminance of the light source in accordance with the visible light signal, and a receiver configured to receive another visible light signal, which rewrites over the visible light signal, by a communication method that is different from a visible light communication. The control circuit determines whether the visible light signal is rewritten by the another visible light signal or not when the receiver receives the another visible light signal, and the visible light signal is rewritten by the another visible light signal when the control circuit determines the visible light signal is rewritten by the another visible light signal.
(Continued)

The control circuit controls the change in luminance of the light source to transmit the another visible light signal.

12 Claims, 57 Drawing Sheets

Related U.S. Application Data continuation of application No. 14/302,679, filed on Jun. 12, 2014, now Pat. No. 9,377,638.

(60) Provisional application No. 61/941,610, filed on Feb. 19, 2014.

(51) Int. Cl.
| | | |
|---|---|---|
| *G02F 1/133* | (2006.01) | |
| *G02F 1/1335* | (2006.01) | |
| *G02F 1/13357* | (2006.01) | |
| *G02F 1/1333* | (2006.01) | |

(52) U.S. Cl.
CPC .... *G02F 1/13306* (2013.01); *G02F 1/133504* (2013.01); *G02F 1/133524* (2013.01); *G02F 1/133528* (2013.01); *G02F 1/133553* (2013.01); *G02F 2001/133342* (2013.01); *G02F 2001/133626* (2013.01)

(56) References Cited

U.S. PATENT DOCUMENTS

| 7,929,867 | B2 | 4/2011 | Nakagawa |
| 8,381,985 | B2 | 2/2013 | Ferren et al. |
| 8,439,265 | B2 | 5/2013 | Ferren et al. |
| 8,700,012 | B2 | 4/2014 | Ferren et al. |
| 8,700,102 | B2 | 4/2014 | Ferren et al. |
| 8,820,644 | B2 | 9/2014 | Ferren et al. |
| 2002/0167701 | A1 | 11/2002 | Hirata |
| 2004/0227719 | A1 | 11/2004 | Chang et al. |
| 2006/0056855 | A1 | 3/2006 | Nakagawa et al. |
| 2009/0297156 | A1 | 12/2009 | Nakagawa et al. |
| 2009/0297157 | A1 | 12/2009 | Nakagawa |
| 2009/0297166 | A1 | 12/2009 | Nakagawa et al. |
| 2009/0297167 | A1 | 12/2009 | Nakagawa et al. |
| 2009/0310976 | A1 | 12/2009 | Nakagawa et al. |
| 2011/0311234 | A1 | 12/2011 | Almassy et al. |
| 2012/0074227 | A1 | 3/2012 | Ferren et al. |
| 2012/0075194 | A1 | 3/2012 | Ferren |
| 2012/0075452 | A1 | 3/2012 | Ferren |
| 2012/0079265 | A1 | 3/2012 | Ferren |
| 2012/0118971 | A1 | 5/2012 | Ferren et al. |
| 2012/0118972 | A1 | 5/2012 | Ferren et al. |
| 2012/0118973 | A1 | 5/2012 | Ferren et al. |
| 2012/0120301 | A1 | 5/2012 | Ferren et al. |
| 2012/0157127 | A1 | 6/2012 | Ferren et al. |
| 2012/0190408 | A1 | 7/2012 | Ferren et al. |
| 2012/0268405 | A1 | 10/2012 | Ferren et al. |
| 2012/0268581 | A1 | 10/2012 | Ferren |
| 2012/0270575 | A1 | 10/2012 | Ferren et al. |
| 2012/0270601 | A1 | 10/2012 | Ferren et al. |
| 2012/0272313 | A1 | 10/2012 | Ferren |
| 2012/0276932 | A1 | 11/2012 | Ferren et al. |
| 2013/0019321 | A1 | 1/2013 | Ferren |
| 2014/0232903 | A1* | 8/2014 | Oshima ................ H04N 5/3532 348/229.1 |

FOREIGN PATENT DOCUMENTS

| JP | 02-037850 | 2/1990 |
| JP | 05-191349 | 7/1993 |
| JP | 2002-190764 | 7/2002 |
| JP | 2002-290335 | 10/2002 |
| JP | 2005-236614 | 9/2005 |
| JP | 2005-303919 | 10/2005 |
| JP | 2006-319545 | 11/2006 |
| JP | 2009-0239800 | 10/2009 |
| JP | 2012-527820 | 11/2012 |
| WO | 2004/038962 | 5/2004 |
| WO | 2010/147609 | 12/2010 |

OTHER PUBLICATIONS

International Search Report (PCT/ISA/210), dated Sep. 2, 2014, for corresponding International Application No. PCT/JP2014/003466 (including PCT/ISA/220 and PCT/ISA/237).

USPTO Notice of Allowance and Fee(s) Due, dated Mar. 16, 2016, in related U.S. Appl. No. 14/318,745.

Extended European Search Report, dated Jan. 5, 2017 by the European Patent Office (EPO), in the corresponding European Patent Application No. 14883077.1.

Extended European Search Report, dated Jan. 5, 2017 by the European Patent Office (EPO), in the corresponding European Patent Application No. 14883193.6.

Japan Office Action, dated Feb. 20, 2018 by the Japan Patent Office (JPO), for the corresponding Japanese Patent Application No. 2016-503786.

* cited by examiner

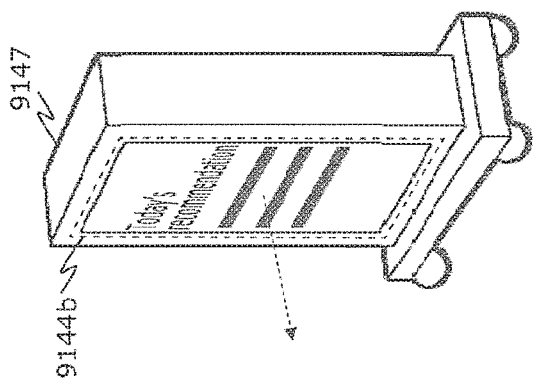
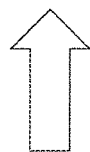
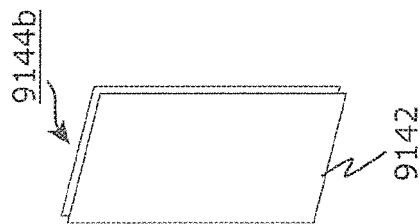
FIG. 12
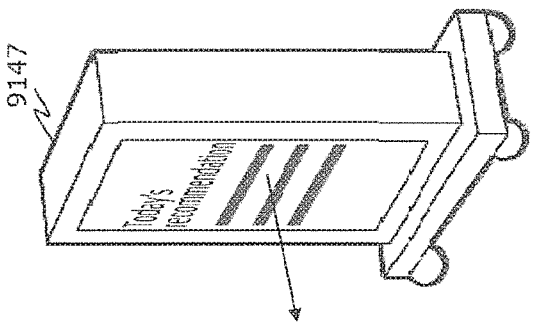
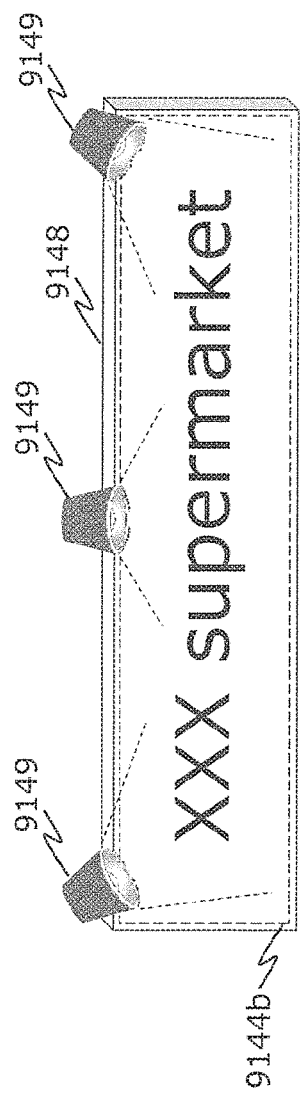
FIG. 13

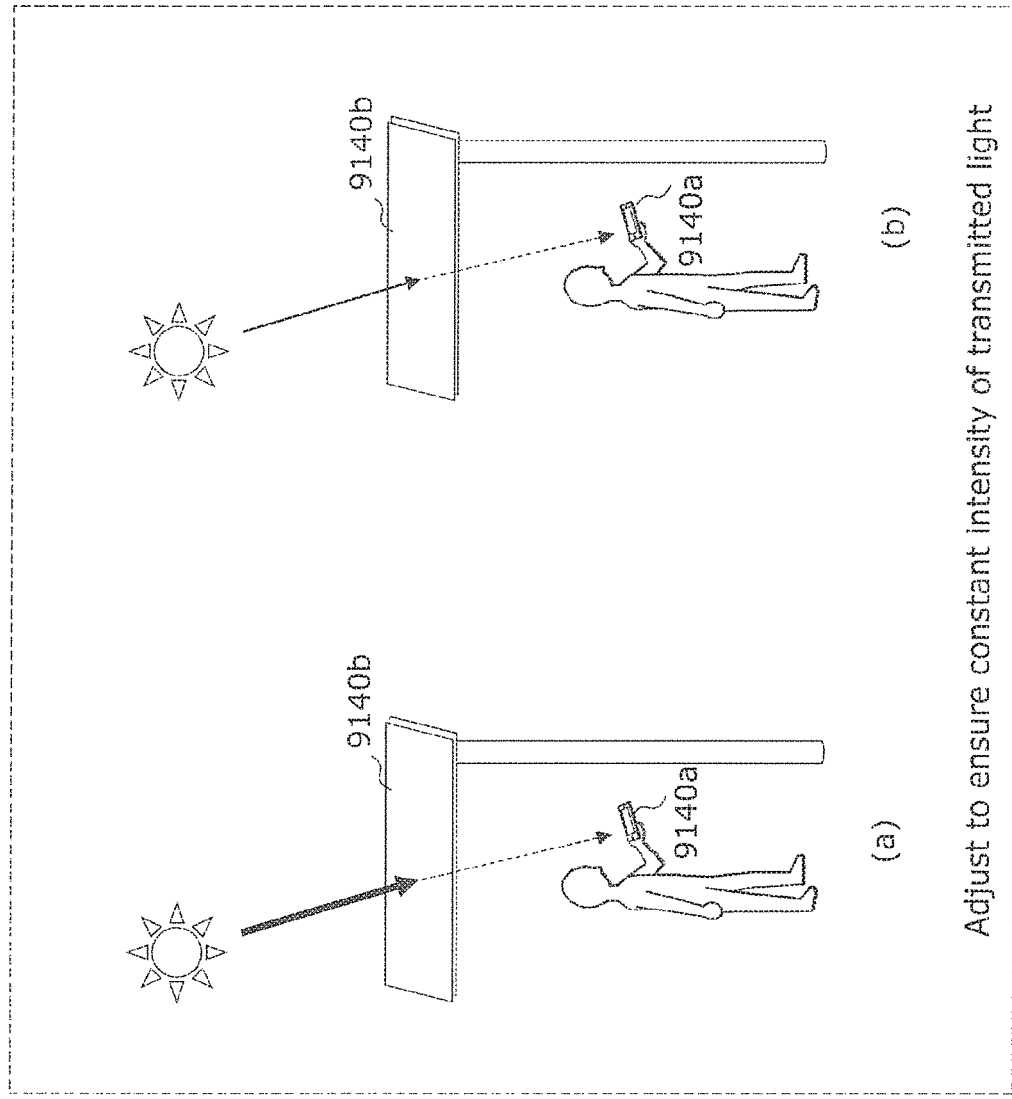

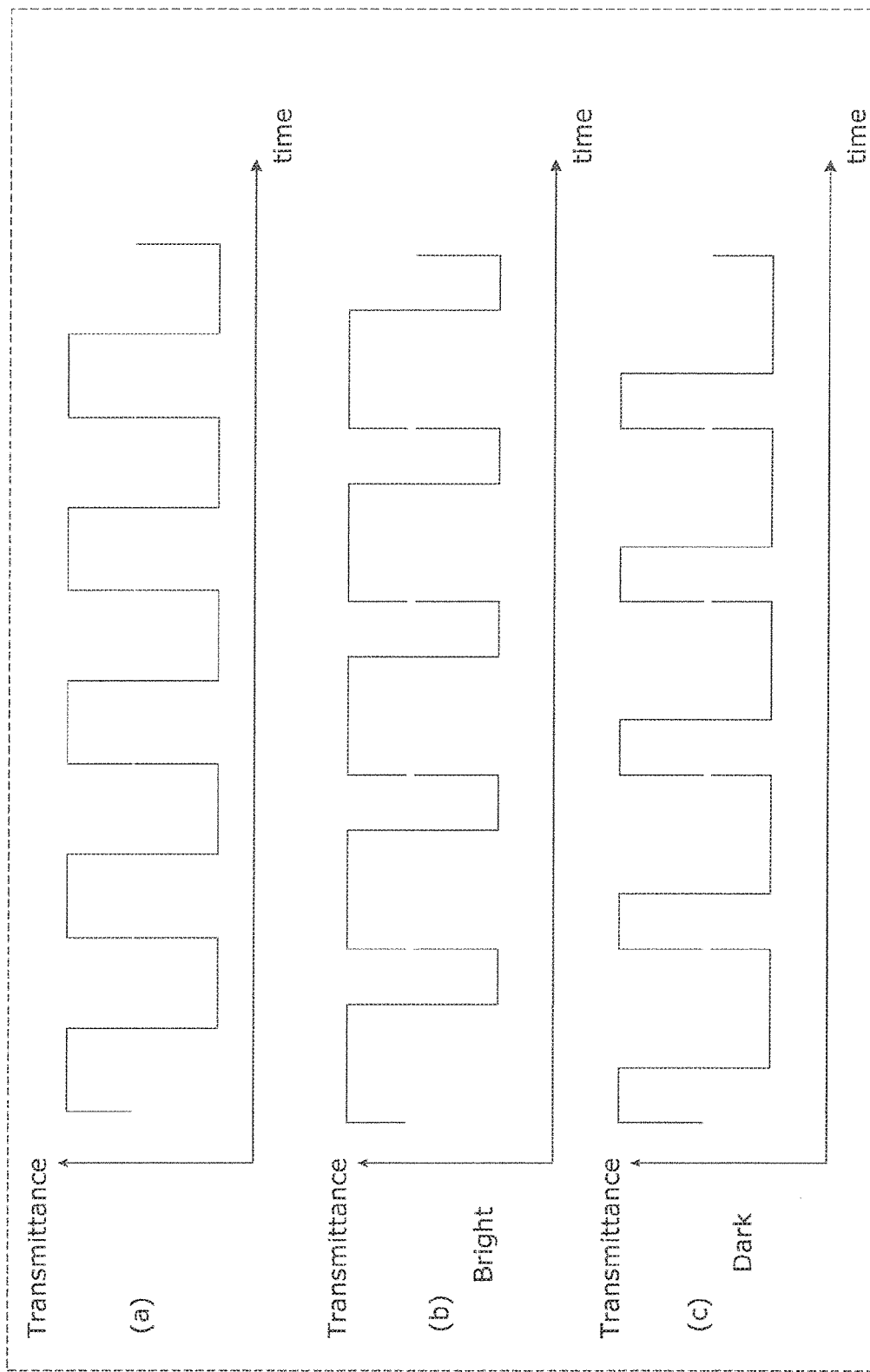

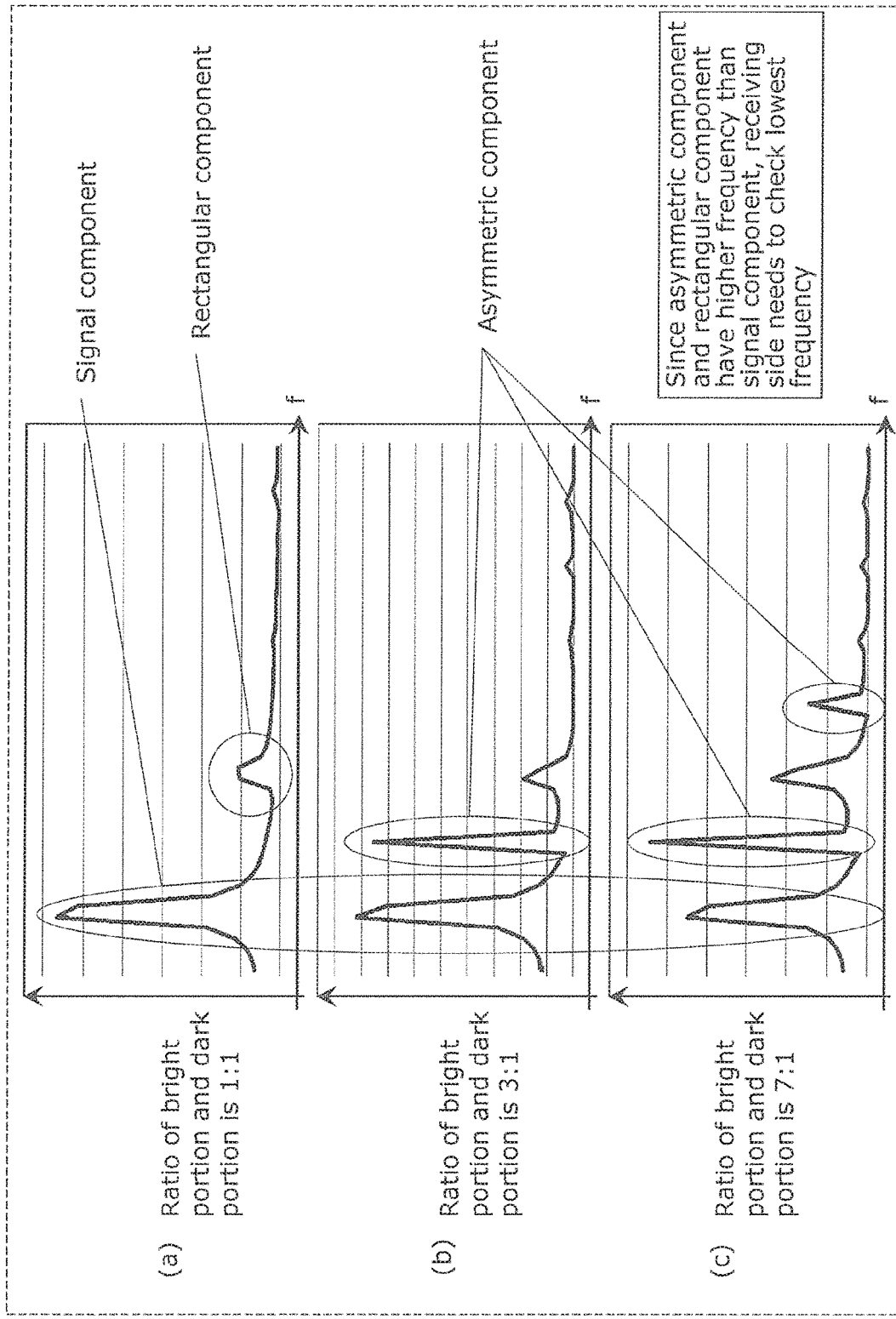

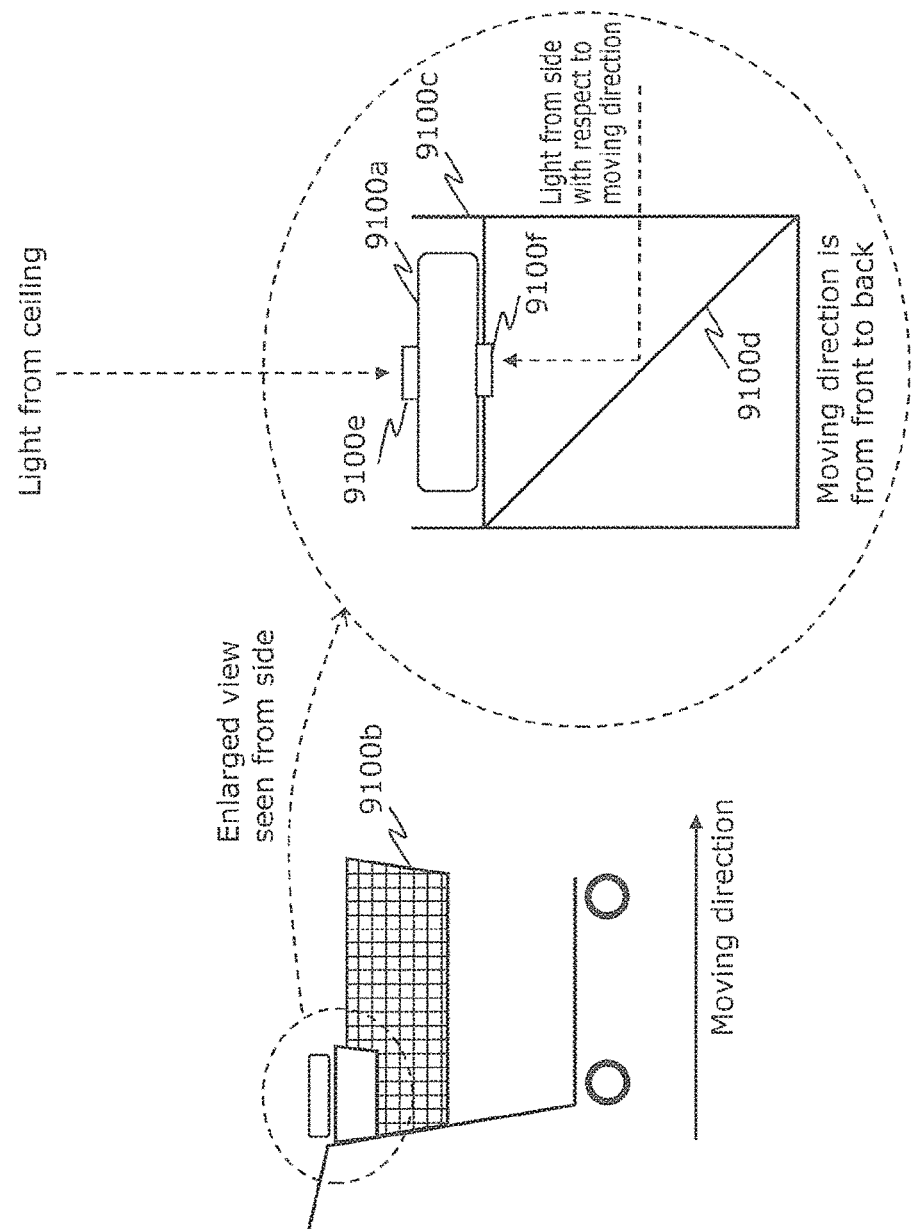

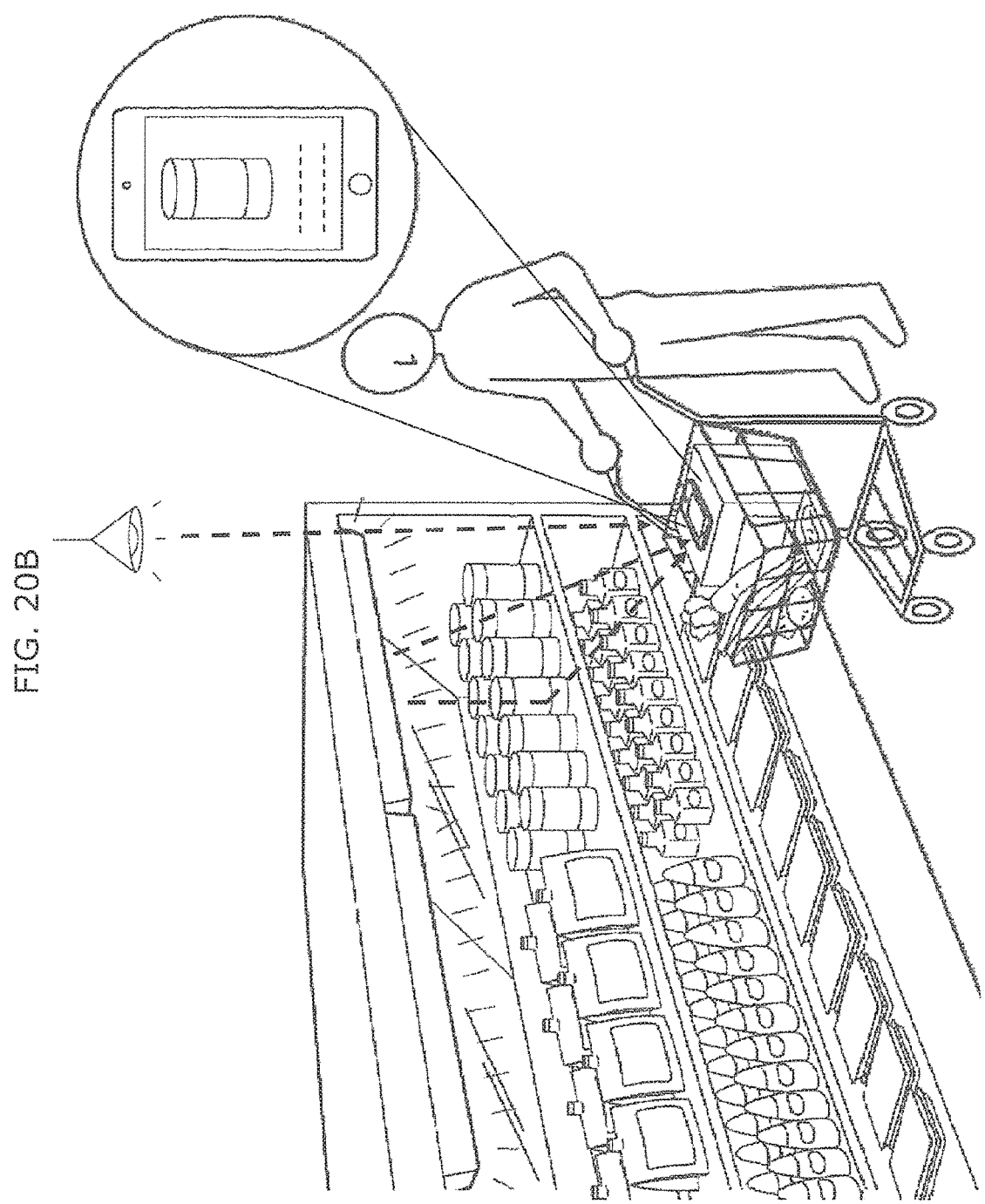

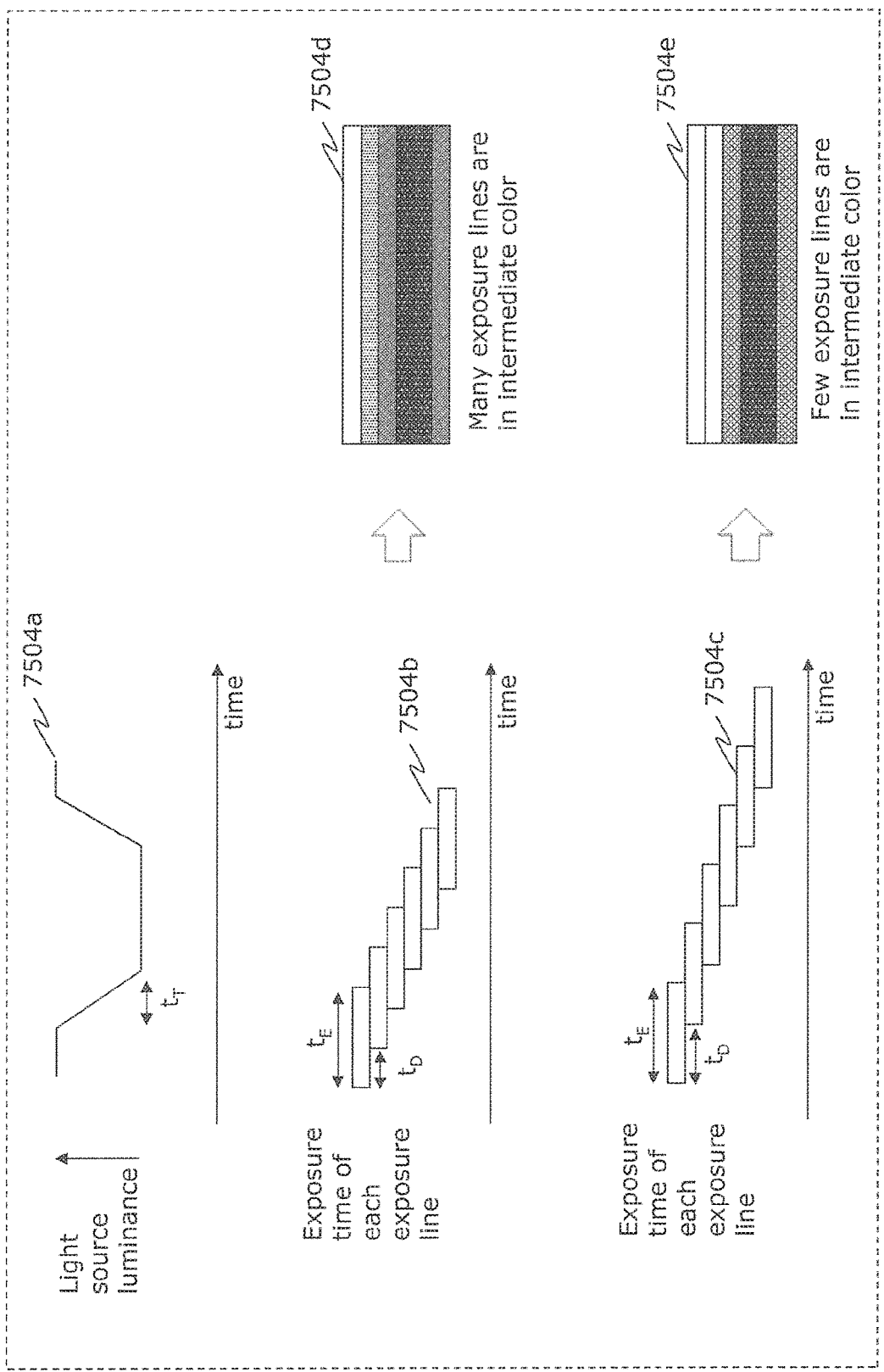

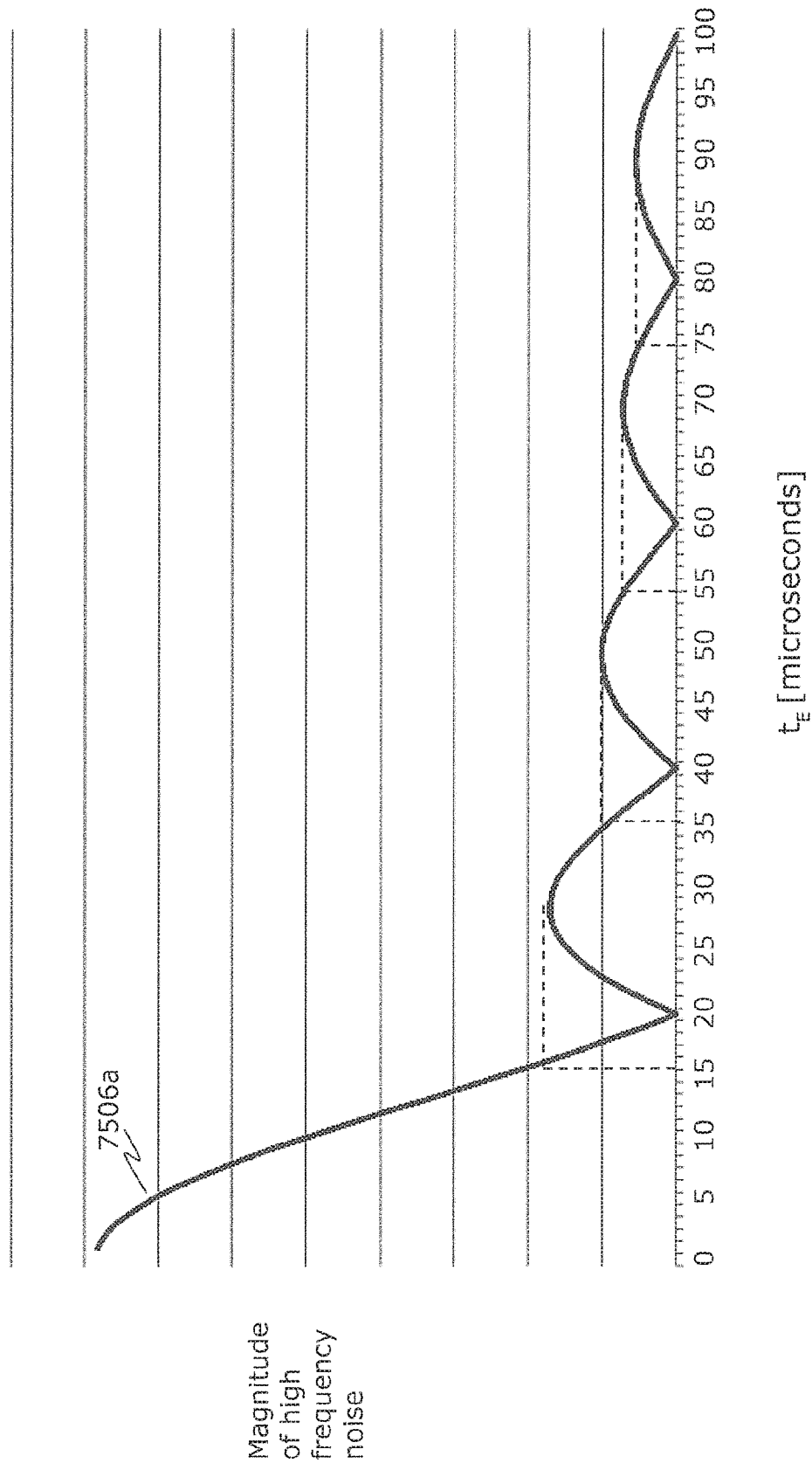

TRANSMITTER, TRANSMITTING METHOD, AND RECEIVING METHOD

CROSS REFERENCE TO RELATED APPLICATIONS

This a continuation application of U.S. application Ser. No. 15/157,598, filed on May 18, 2016, which is a continuation application of U.S. application Ser. No. 14/302,679, filed on Jun. 12, 2014 now U.S. Pat. No. 9,377,638, issued Jun. 28, 2016, which claims the benefit of U.S. Provisional Patent Application No. 61/941,610 filed on Feb. 19, 2014 and Japanese Patent Application No. 2014-030063 filed on Feb. 19, 2014. The entire disclosures of the above-identified applications, including the specifications, drawings and claims are incorporated herein by reference in there entirety.

FIELD

The present disclosure relates to a method of communication between a mobile terminal such as a smartphone, a tablet terminal, or a mobile phone, and a home electric appliance such as an air conditioner, a lighting device, or a rice cooker.

BACKGROUND

In recent years, a home-electric-appliance cooperation function has been introduced for a home network, with which various home electric appliances are connected to a network by a home energy management system (HEMS) having a function of managing power usage for addressing an environmental issue, turning power on/off from outside a house, and the like, in addition to cooperation of AV home electric appliances by Internet Protocol (IP) connection using Ethernet@ or wireless local area network (LAN). However, there are home electric appliances whose computational performance is insufficient to have a communication function, and home electric appliances that do not have a communication function due to a matter of cost.

In order to solve such a problem, Patent Literature (PTL) 1 discloses a technique of efficiently establishing communication between devices among limited optical spatial transmission devices that transmit information to free space using light, by performing communication using plural single color light sources of illumination light.

CITATION LIST

Patent Literature

[PTL 1]
Japanese Unexamined Patent Application Publication No. 2002-290335

SUMMARY

Technical Problem

However, there is a problem that a conventional transmitter using the conventional lights needs to have three color light sources such as an illuminator, and therefore is affected by structural constraints.

One non-limiting and exemplary embodiment provides a transmitter or the like that is difficult to be affected by structural constraints.

Solution to Problem

A transmitter according to an aspect of the present disclosure is a transmitter that transmits a signal to a receiver by changing an amount of light emitted, the transmitter comprising: a control unit configured to generate a control voltage corresponding to a signal to be transmitted; a reflector that reflects sunlight; and a liquid crystal board that receives reflected light that is sunlight reflected by the reflector and changes, according to the control voltage, the amount of light emitted toward the receiver by allowing the reflected light to pass therethrough.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The present disclosure can achieve a transmitter that is difficult to be affected by structural constraints.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 12 is a diagram illustrating an example of an application of a transmitter of a reflective type according to Embodiment 1.

FIG. 13 is a diagram illustrating another example of an application of a transmitter of a reflective type in Embodiment 1.

FIG. 16 is a diagram illustrating an example of an application of a transmitter of a transmissive type according to Embodiment 1.

FIG. 17 is a diagram illustrating an example of control of a liquid crystal board in Embodiment 1.

FIG. 18 is a diagram illustrating a spectrum of a luminance change of a liquid crystal board obtained by control of transmittance in the transmitter in Embodiment 1.

FIG. 20A is a diagram illustrating an example of an application of an information communication method in Embodiment 2 to a shopping cart.

FIG. 20B is a diagram illustrating an example of an application of the information communication method in Embodiment 2 to a shopping cart.

FIG. 44F illustrates an example of an observation method of luminance of a light emitting unit in Embodiment 5.

FIG. 44H illustrates an example of an observation method of luminance of a light emitting unit in Embodiment 5.

DESCRIPTION OF EMBODIMENTS

Figure 1:
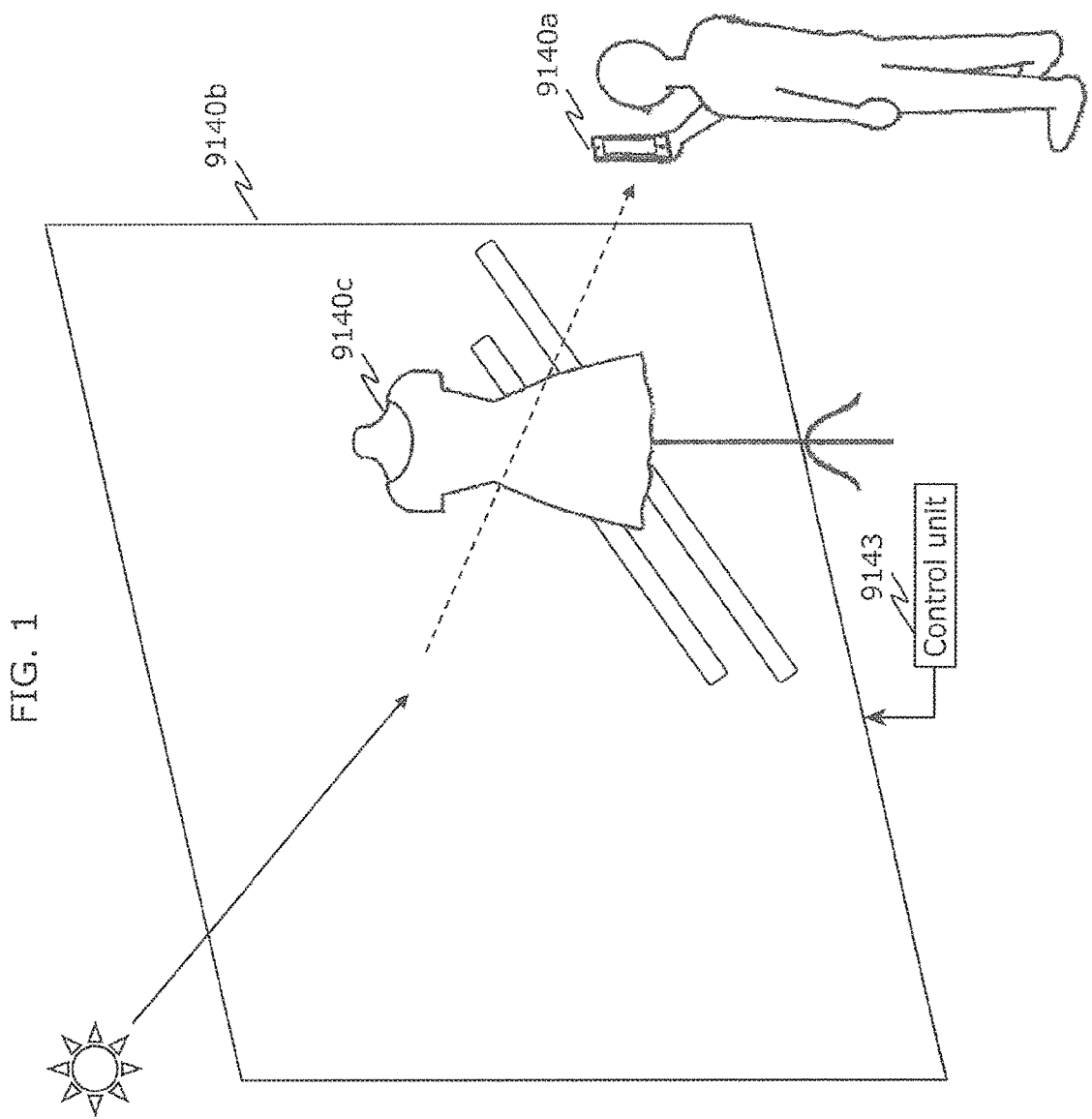
FIG. 1 is a diagram illustrating an example of a transmitter of a transmissive type in Embodiment 1.

A transmitter according to an aspect of the present disclosure is a transmitter that transmits a signal to a receiver by changing an amount of light emitted, the transmitter comprising: a control unit configured to generate a control voltage corresponding to a signal to be transmitted; a reflector that reflects sunlight; and a liquid crystal board that receives reflected light that is sunlight reflected by the reflector and changes, according to the control voltage, the amount of light emitted toward the receiver by allowing the reflected light to pass therethrough.

With this, the transmitter can perform visible light communication using sunlight and does not need a light source for visible light communication, thus making it difficult to be affected by structural constraints. It should be noted that the transmitter may use light from other devices such as a lighting device instead of the sunlight.

Moreover, the reflector may be disposed opposite to, with a gap therebetween, a surface of the liquid crystal board that receives the reflected light, may receive at least part of the sunlight from the gap and not via the liquid crystal board, and may reflect the part of the sunlight toward the liquid crystal board.

For example, when the reflector is in contact with the liquid crystal board, the sunlight passes through the liquid crystal board and is reflected by the reflector, and then the reflected sunlight passes through the liquid crystal board again as reflected light. Therefore, since the sunlight passes through the liquid crystal board twice, the amount of light emitted from the liquid crystal board toward the receiver is small. Therefore, as described above, when the reflector opposite to the liquid crystal board with a gap receives at least part of the sunlight from the gap and not via the liquid crystal board and then reflects the part toward the liquid crystal board, at least part of the sunlight is emitted toward the receiver by pasting through only once the liquid crystal board. Therefore, the amount of light emitted from the liquid crystal board toward the receiver can be increased, a change range of amount of light, that is, a range of luminance change can be large, and therefore it is possible to transmit a signal easy for the receiver to receive.

Moreover, the transmitter may further comprise a light source for illuminating a reflected light receiving surface that is a surface of the liquid crystal board that receives the reflected light, wherein when the reflected light receiving surface is illuminated by light from the light source without receiving the reflected light, the liquid crystal board changes, according to the control voltage, the amount of light emitted toward the receiver by allowing the light from the light source instead of the reflected light to pass therethrough.

With this, when the weather is fine, it is possible to perform visible light communication using sunlight. When it is at night or the weather is cloudy, it is possible to perform visible light communication using a light source such as a backlight. In other words, an influence from the state of sunlight can be reduced.

Moreover, the reflector may be translucent and may be disposed opposite to the reflected light receiving surface of the liquid crystal board, the transmitter may further comprise a plate-like light guide disposed substantially parallel to the liquid crystal board, with the reflector interposed therebetween, and the light guide may guide incident sunlight in the light guide so that the sunlight incident to an end portion of the light guide is spread via the reflector to the reflected light receiving surface of the liquid crystal board.

With this, since the reflected light receiving surface of the liquid crystal board not only receives reflected light but also sunlight to be spread from the light guide, the amount of light emitted from the liquid crystal board toward the receiver can be increased. Therefore, a change range of amount of light, that is, a range of luminance change can be large, and therefore it is possible to transmit a signal easy for the receiver to receive.

Moreover, the transmitter may further comprise a light collecting lens that collects sunlight at the end portion of the light guide.

With this, the amount of sunlight incident to the light guide can be increased, and therefore the amount of light emitted from the liquid crystal board toward the receiver can be further increased.

Moreover, the light guide may further guide the light from the light source in the light guide so that the light from the light source incident to the end portion of the light guide is spread via the reflector to the reflected light receiving surface of the liquid crystal board.

With this, when light from such light source as the backlight is incident to an end portion of the light guide, the light from the light source is spread to the reflected light receiving surface, the backlight can be disposed toward the end portion of the light guide. In other words, a degree of freedom of the disposition of the backlight can be increased.

Moreover, the light collecting lens and the light source may be disposed at respective ends of the light guide, the light collecting lens and the light source interposing the light guide therebetween, and in the light guide, a plurality of reflective dots for scattering light may be formed along a direction connecting the light collecting lens and the light source, and a width in the direction of each of the reflective dots may be smaller as a position of the reflective dot is closer to one of the ends, and may be larger as the position of the reflective dot is closer to a center of the light guide.

With this, the amount of light each for sunlight and a light source in each position in the light guide that is incident from each end portion of the light guide and is guided to the center of the light guide is larger as a position is closer to the end of the light guide, and is smaller as a position is closer to the center of the light guide. Therefore, as described above, in an aspect of the present disclosure, the width of a reflective dot is smaller as the position of a reflective dot is closer to the end, and the width of a reflective dot is larger as the position of a reflective dot is closer to the center. With this, a ratio of light emitted from the light guide to the liquid crystal board via the reflector at each position in the light guide is smaller as the position is closer to the end of the light guide, and is larger as the position is closer to the center of the light guide. As a result, at each position in the light guide, the amount of light emitted from the light guide to the liquid crystal board via the reflector can be substantially even. As a result, a signal can be transmitted according to an appropriate luminance change.

Moreover, the reflector may be translucent, and the liquid crystal board may receive transmitted light that is sunlight passing through the reflector, and may change, according to the control voltage, the amount of light emitted toward the receiver by allowing the transmitted light to pass therethrough.

With this, since not only reflected light but also transmitted light are emitted from the receiver side, the amount of light emitted from the liquid crystal board toward the receiver can be increased. Therefore, the amount of light emitted from the liquid crystal board toward the receiver can be increased, a change range of amount of light, that is, a range of luminance change can be large, and therefore it is possible to transmit a signal easy for the receiver to receive.

Moreover, a surface of the reflector that reflects the sunlight may be formed as a specular surface.

With this, it is possible to increase the amount of reflected light, that is, to make the reflected light brighter. Therefore, a change range of the amount of light emitted from the liquid crystal board toward the receiver, that is, a range of luminance change can be large, and therefore it is possible to transmit a signal easy for the receiver to receive.

A transmitter according to an aspect of the present disclosure is a transmitter that transmits a signal to a receiver by changing an amount of light emitted, and the transmitter may comprise: a control unit configured to generate a control voltage corresponding to a signal to be transmitted; and a liquid crystal board that receives sunlight and changes, according to the control voltage, the amount of light emitted toward the receiver by allowing the sunlight to pass therethrough.

Also with this, the transmitter can perform visible light communication using sunlight and does not need a light source for visible light communication, thus making it difficult to be affected by structural constraints. It should be noted that the transmitter may use light from other devices such as a lighting device instead of the sunlight.

Moreover, a receiving method according to an aspect of the present disclosure is a receiving method of receiving a signal from a transmitter, the receiving method comprising: emitting flash of light to the transmitter according to claim 1; and receiving, by imaging the transmitter illuminated by the flash of light, a signal indicated by a change in an amount of light emitted from the transmitter, wherein a reflector of the transmitter reflects the flash of light instead of the sunlight, and a liquid crystal board of the transmitter changes, according to the control voltage to be applied to the liquid crystal board, an amount of light emitted by allowing reflected light that is the reflected flash of light to pass through the liquid crystal board.

With this, by using flash of light instead of sunlight when there is no sunlight or the sunlight is weak, a signal from the transmitter can be appropriately received.

An information communication method according to an aspect of the present disclosure is an information communication method of obtaining information from a subject, the information communication method comprising: receiving at least one first data item to be transmitted by radio wave; receiving, by imaging the subject, second data to be transmitted by visible light from the subject; and identifying third data corresponding to the received second data from the received at least one first data item, wherein the receiving of a visible light includes: setting an exposure time of an image sensor so that in an image obtained by imaging the subject with the image sensor, a bright line corresponding to an exposure line included in the image sensor is generated according to a luminance change of the subject; obtaining an image including the bright line by imaging the subject having luminance change at the set exposure time; and obtaining the second data by demodulating data identified by a pattern of the bright line which is included in the obtained image.

With this, as illustrated in FIGS. 32 to 35 to be described later, since the third data corresponding to the second data to be transmitted by visible light can be identified from at least one first data item to be transmitted by radio wave, from a large amount of data to be transmitted by radio wave to a relatively wide area, the third data corresponding to a relatively narrow area that is communicable with visible light communication can be received at a fast speed even when the data amount of the second data is small. In other words, the data amount of visible light communication for receiving the third data necessary in the relatively narrow area can be small. With this, communication between various devices is possible.

These general and specific aspects may be implemented using a system, a method, an integrated circuit, a computer program, or a computer-readable recording medium such as a CD-ROM, or any combination of systems, methods, integrated circuits, computer programs, or recording media.

The following will describe embodiments with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims representing the broadest concepts are described as arbitrary structural elements.

Embodiment 1

(Visible Light Signal Transmission by Transmittance Control of Liquid Crystal: Transmissive Type)

Figure 2:
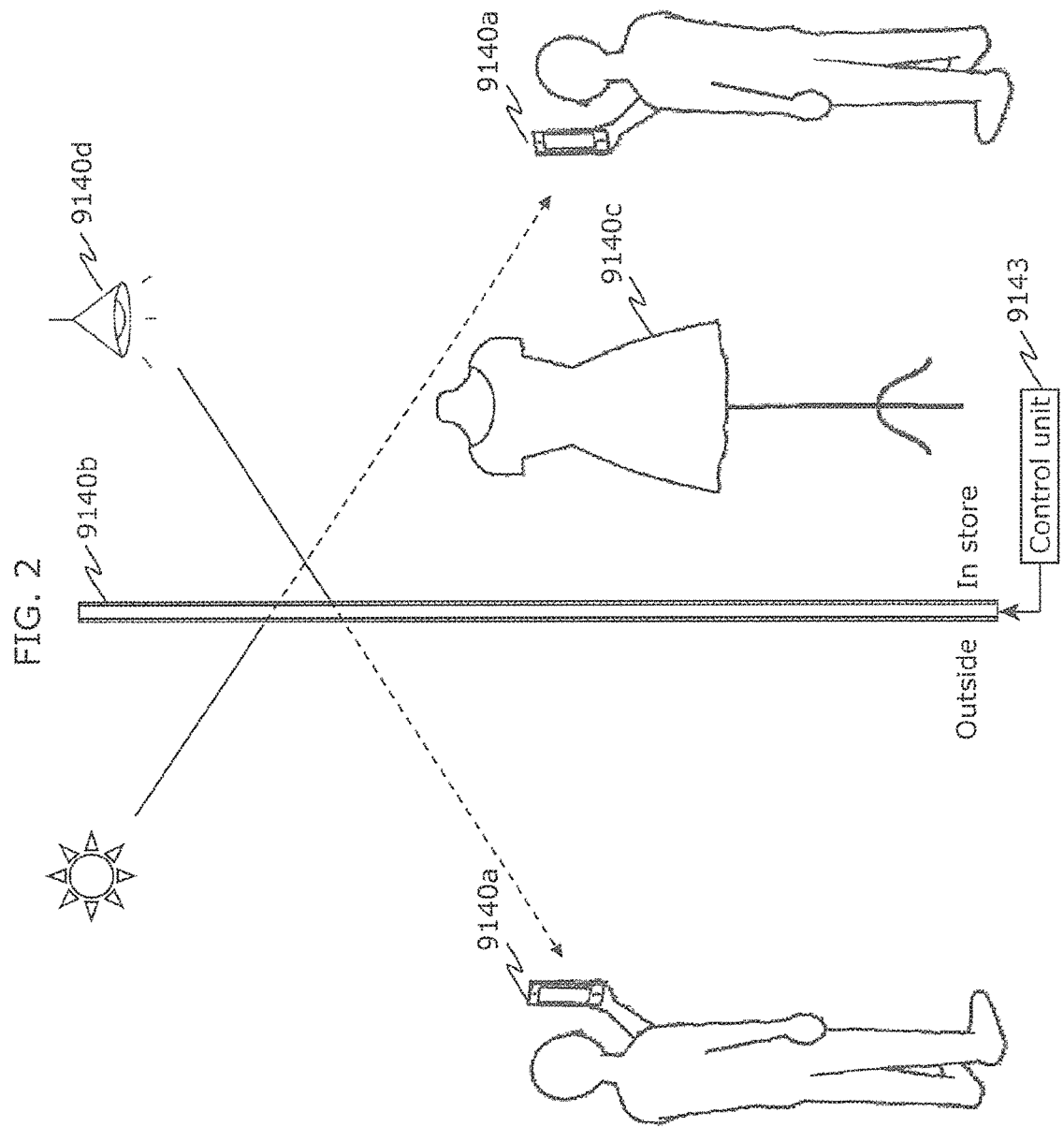
FIG. 2 is a diagram illustrating an example of a transmitter of a transmissive type in Embodiment 1.

FIGS. 1 and 2 are each a diagram illustrating an example of a transmitter of a transmissive type in Embodiment 1.

The transmitter according to the present embodiment includes a liquid crystal board. By applying a voltage (control voltage) to this liquid crystal board, the ratio of light passing through this liquid crystal board (transmittance) can be controlled. By using characteristics of this liquid crystal board and controlling the transmittance, the transmitter can transit a visible light signal without a light source. Moreover, when even when ambient light is bright and therefore blinking of illumination light is difficult to be observed, it is possible to transmit a visible light signal that is easy to receive. It should be noted that the same effect can be obtained from a method of controlling the transmittance of this liquid crystal board, when using an electromagnetic wave other than visible light such as infrared light or ultraviolet light.

For example, as illustrated in FIG. 1, the transmitter includes a liquid crystal board 9140*b* configured as the glass of a show window, and a control unit 9143 that generates a control voltage to be applied to the liquid crystal board 9140*b* according to a signal to be transmitted. This transmitter transmits a signal by controlling the transmittance of outside light such as sunlight in the liquid crystal board 9140*b*. The transmitter transmits information about a product 9140*c* located nearby and information for accessing to the information, by controlling the transmittance of the liquid crystal board 9140*b*. An imaging unit of a receiver 9140*a* simultaneously images, by being directed to the product 9140*c*, the product 9140*c* and the liquid crystal board 9140*b* that is the background of the product 9140*c*. As a result, the receiver 9140*a* can receive a signal that includes the information about the product 9140*c* and comes from the liquid crystal board 9140*b* of the transmitter. It should be noted that the imaging unit of the receiver 9140*a* is a camera having an image sensor including a plurality of exposure lines. This receiver 9140*a* sets an exposure time of the image sensor so that in an image obtained by imaging the subject by the image sensor, a bright line corresponding to each exposure line included in the image sensor is generated according to a luminance change of the subject. Then, the image sensor of the receiver 9140*a* obtains a bright line image that is an image including a plurality of bright lines, by imaging the subject having luminance change at a set exposure time. Next, the receiver 9140*a* obtains information about the aforementioned product 9140*c* by demodulating data identified by a plurality of bright line patterns included in the obtained bright line image.

Moreover, as illustrated in FIG. 2, when the control unit 9143 applies a control voltage to the liquid crystal board 9140*b*, the transmitter transmits a signal by controlling the transmittance of the sunlight and the transmittance of light of an in-store lighting device 9140*d*. When the receiver 9140*a* is outside the store, the receiver 9140*a* simultaneously images, by imaging the product 9140*c* across the show window, the liquid crystal board 9140*b* in front of the product 9140*c*. As a result, the receiver 9140*a* can receive a signal that includes the information about the product 9140*c* and comes from the liquid crystal board 9140*b* of the transmitter.

The transmitter in the present embodiment is a transmitter that transmits a signal to the receiver 9140*a* by changing the amount of light emitted, and includes the control unit 9143 that generates a control voltage according to a signal to be transmitted, and the liquid crystal board 9140*b* that receives sunlight and changes, according to the control voltage, the amount of light emitted toward the receiver 9140*a* by allowing the sunlight to pass through. With this, the transmitter can perform visible light communication using sunlight and does not need a light source for visible light communication, thus making it difficult to be affected by structural constraints. It should be noted that the transmitter may use light from other devices such as a lighting device instead of the sunlight.

(Visible Light Signal Transmission by Transmittance Control of Liquid Crystal: Reflective Type)

Figure 3:
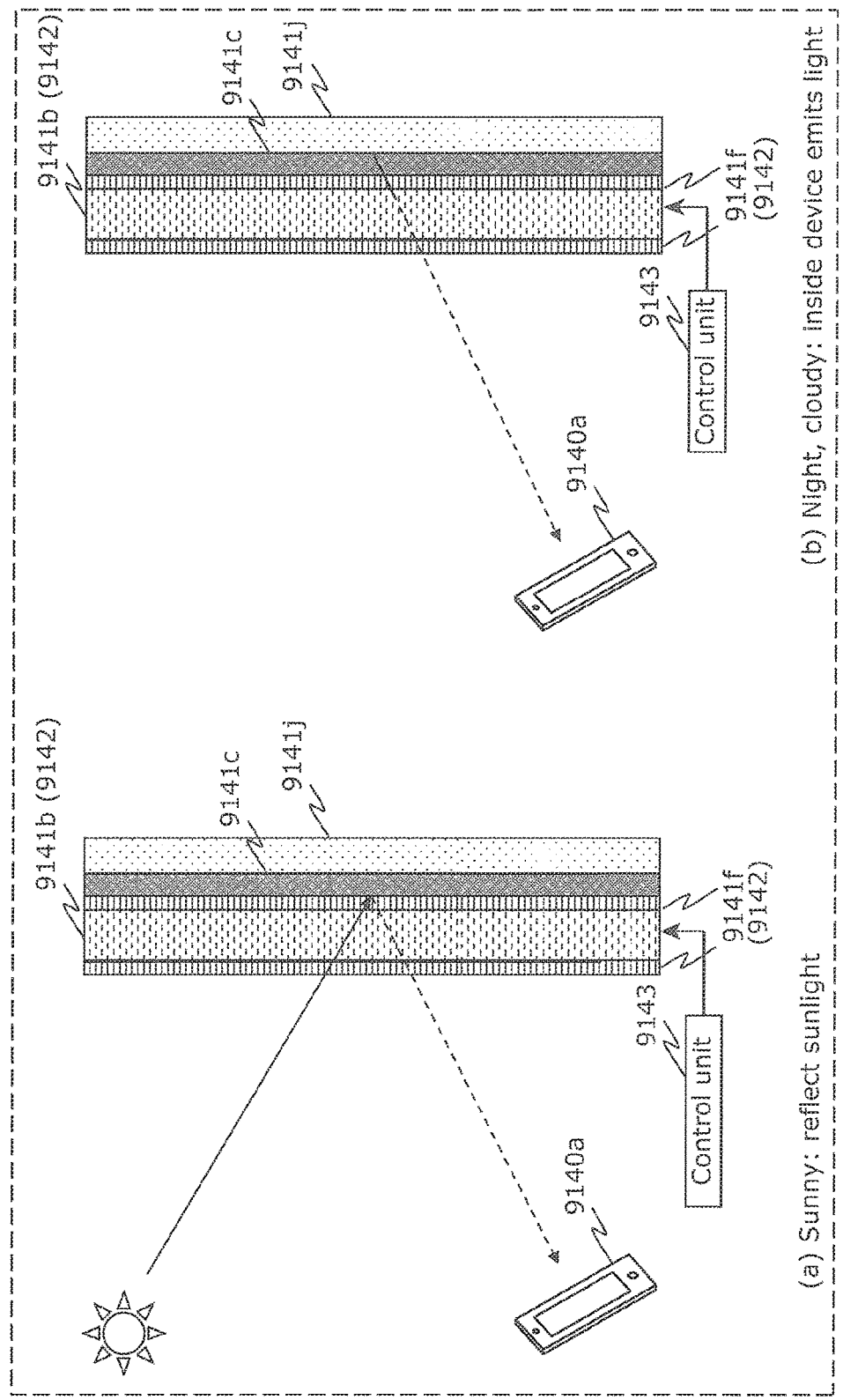
FIG. 3 is a diagram illustrating an example of a transmitter of a reflective type in Embodiment 1.

FIG. 3 is a diagram illustrating an example of a transmitter of a reflective type in Embodiment 1.

The transmitter that is an information communication device in the present embodiment includes, as illustrated in FIG. 3, a liquid crystal board 9142, a reflection board (reflector) 9141c that reflects sunlight, the aforementioned control unit 9143 that controls the transmittance of the liquid crystal board 9142, and a backlight 9141j. When the control unit 9143 controls the transmittance of the liquid crystal board 9142, this transmitter can superimpose a signal on light emitted from the liquid crystal board 9142 toward the receiver 9140a by being reflected by the reflection board 9141c.

The reflection board 9141c is a board that is translucent and is disposed opposite, without a gap therebetween, to the back surface of the liquid crystal board 9142 (reflected light receiving surface), and is, for example, an advertisement display on which letters and designs are drawn.

The backlight 9141j is disposed at the back surface side of this reflection board 9141c and illuminates the reflection board 9141c from the back surface side. It should be noted that in the present embodiment, in each of the structural elements included in the transmitter, the surface of the receiver 9140a side (the side to which a visible light signal is transmitted) is referred to as a front surface, and the surface opposite to the front surface is referred to as a back surface.

The liquid crystal board 9142 includes a liquid crystal 9141b, and two polarizing boards that interpose the liquid crystal 9141b therebetween. A polarizing direction each for the two polarizing boards 9141f tilts toward each other by 90 degrees. The control unit 9143 generates a control voltage correspond to a signal to be transmitted, and applies the control voltage to the liquid crystal 9141b of the liquid crystal board 9142. With this, when a voltage value of the control voltage to be applied to the liquid crystal 9141b is 0 V, the liquid crystal 9141b twists a vibration direction of the light passing through the liquid crystal 9141b by 90 degrees. As a result, the light that passed through one of the polarizing boards 9141f is twisted by the liquid crystal 9141b, and passes through the other polarizing board 9141f. In other words, as illustrated in (a) in FIG. 3, when the weather is fine or when the sun is shining, sunlight pass through the liquid crystal board 9142 from the front surface side, and then is reflected by the reflection board 9141c, and then is emitted by passing through the liquid crystal board 9142. Therefore, at this time, the imaging unit of the receiver 9140a directed to the reflection board 9141c images the reflection board 9141c that is brightly illuminated.

Meanwhile, a voltage value of the control voltage to be applied to the liquid crystal 9141b is a predetermined value more or less than 0 V (operating voltage value), the liquid crystal 9141b does not twist the vibration direction of the light passing through the liquid crystal 9141b. As a result, since the light that passed through one of the polarizing boards 9141f is twisted by the liquid crystal 9141b, the light cannot pass through the other polarizing board 9141f. In other words, the sunlight irradiated to the front surface of the liquid crystal board 9142 does not pass through the liquid crystal board 9142. Therefore, at this time, the imaging unit of the receiver 9141a directed to the reflection board 9141c images the reflection board 9141c that becomes dark.

It should be noted that in FIG. 3, among solid lines and dotted lines indicating an orientation of light, the solid line indicates an orientation of light that is not modulated by a signal to be transmitted, and the dotted line indicates an orientation of light that is modulated by a signal to be transmitted. The same can be applied to other drawings.

As described above, the transmitter in the present embodiment can change luminance using outside light such as sunlight according to a signal, by changing the transmittance of the liquid crystal board 9142 with respect to light according to a signal to be transmitted. As a result, the transmitter can transmit a visible light signal to the receiver 9140a without a light source. Moreover, when even when ambient light is bright and therefore blinking of illumination light is difficult to be observed, it is possible to transmit a visible light signal that is easy to receive. It should be noted that the same effect can be obtained from this method, when using an electromagnetic wave other than visible light such as infrared light or ultraviolet light. By displaying advertisement on the reflection board 9141c or the like and transmitting information related to the advertisement (related information), the user can obtain the related information by directing the receiver 9140a to the advertisement (the reflection board 9141c) or the like.

In other words, the transmitter in the present embodiment is a transmitter that transmits a signal to the receiver 9140a by changing the amount of light emitted, and includes the control unit 9143 that generates a control voltage according to a signal to be transmitted, the reflection board 9141c that reflects sunlight, and the liquid crystal board 9142 that receives the reflected light that is sunlight reflected by the reflection board 9141c and changes, according to the control voltage, the amount of light emitted toward the receiver 9140a by allowing the reflected light to pass through. With this, the transmitter can perform visible light communication using sunlight and does not need a light source for visible light communication, thus making it difficult to be affected by structural constraints. It should be noted that the transmitter may use light from other devices such as a lighting device instead of the sunlight.

Moreover, as illustrated in (b) in FIG. 3, when it is at night or the weather is cloudy, in other words, when the sun is not shining, the transmitter can transmit a signal by using light of the backlight 9141j that is located at the back surface of the reflection board 9141c, instead of sunlight. In other words, the transmitter can transmit a visible light signal indicated by light to the receiver 9140a, by allowing or not allowing light irradiated to the back surface of the liquid crystal board 9142 via the semi-translucent reflection board 9141c from the backlight 9141j, to pass to the front surface side of the liquid crystal board 9142.

In other words, the transmitter in the present embodiment further includes the backlight 9141j for illuminating the reflected light receiving surface (back surface) of the liquid crystal board 9142 that is a surface that receives the reflected light. Then, the liquid crystal board 9142 changes, according to the control voltage, the amount of light emitted toward the receiver 9140a by allowing the light from the backlight 9141j instead of the reflected light to pass through the liquid crystal board 9142, when the reflected light receiving surface is illuminated with light from the backlight 9141j without receiving the reflected light. With this, when the weather is fine, it is possible to perform visible light communication using sunlight. When it is at night or the weather is cloudy, it is possible to perform visible light communication using light from the backlight 9141j. In other words, an influence from the state of sunlight can be reduced.

Moreover, when the outside light such as sunlight is weak, it is possible to easily receive a signal by turning ON the backlight 9141j to an extent of supplementing the outside light. Moreover, power consumption can be reduced compared with when the backlight 9141j is turned ON with full power. When the backlight 9141j is turned ON, there are a method of expressing a signal by controlling the transmittance of the liquid crystal board 9142 while the backlight 9141j is always turned ON (liquid crystal control method), a method of expressing a signal by controlling the luminance of the backlight 9141j while the transmittance of the liquid crystal board 9142 is fixed to the largest (backlight control method), and a method of controlling the transmittance of the liquid crystal board 9142 in synchronization with controlling the luminance of the backlight 9141j (hybrid control method). By changing these control methods according to the brightness of the outside light, it is possible to reduce a receiving error rate and power consumption. For example, when the outside light is relatively bright, the selection of the liquid crystal method or the hybrid control method can reduce the number of receiving errors. By using wireless communication such as Bluetooth® (Low Energy), Wi-Fi, or the like, the transmitter may notify, to the receiver 9140a, which method is used for transmitting a signal. With this configuration, receiving efficiency (receiving speed or error rate) is increased. Moreover, since the most appropriate modulation method can be used with the control method, transmission efficiency (power consumption or flicker) and receiving efficiency can be increased.

A frequency domain used in the transmittance control of the liquid crystal 9141b is from several hundred Hz to 1 kHz. In this frequency domain, flicker is generated when pulse modulation is used. By expressing a signal using frequency modulation or phase modulation, it is possible to transmit a signal while suppressing flicker. The liquid crystal board 9142 is, for example, a Twist Nematic (TN) liquid crystal or Electrically Controlled Birefringence (ECB) liquid crystal.

Figure 4:
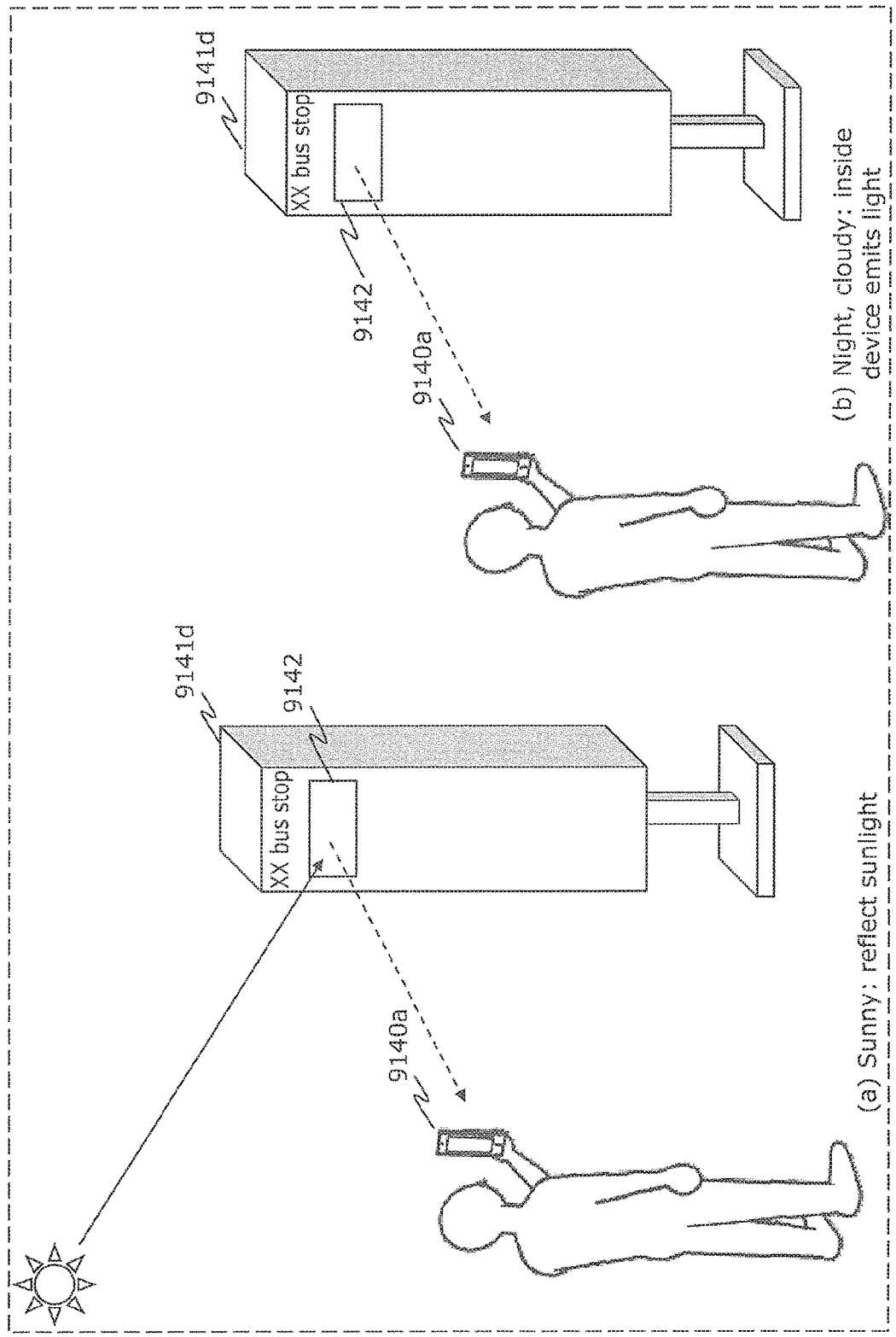
FIG. 4 is a diagram illustrating an example of an application of a transmitter of a reflective type in Embodiment 1.

FIG. 4 is a diagram illustrating an example of an application of a transmitter of a reflective type in the present embodiment.

As illustrated in (a) and (b) in FIG. 4, the transmitter is configured by installing the liquid crystal board 9142 on a sign pole 9141d of a bus stop. The sign pole 9141d constitutes part of the transmitter as the reflection board 9141c and the backlight 9141j illustrated in FIG. 3. With this configuration, it is possible to transmit and receive a visible light signal whether it is day or night.

As described above, the liquid crystal board 9142 includes two polarizing boards 9141f, and the intensity of light is halved every time the light passes through the two polarizing boards 9141f. In the configuration of (a) in FIG. 3, since the light passes through the two polarizing boards 9141f twice, the intensity of the light is reduced to a quarter and it becomes dark. In view of this, the transmitter may be configured for allowing the light not to pass through the two polarizing boards 9141f and hit the light on the reflection board 9141c.

Figure 5:
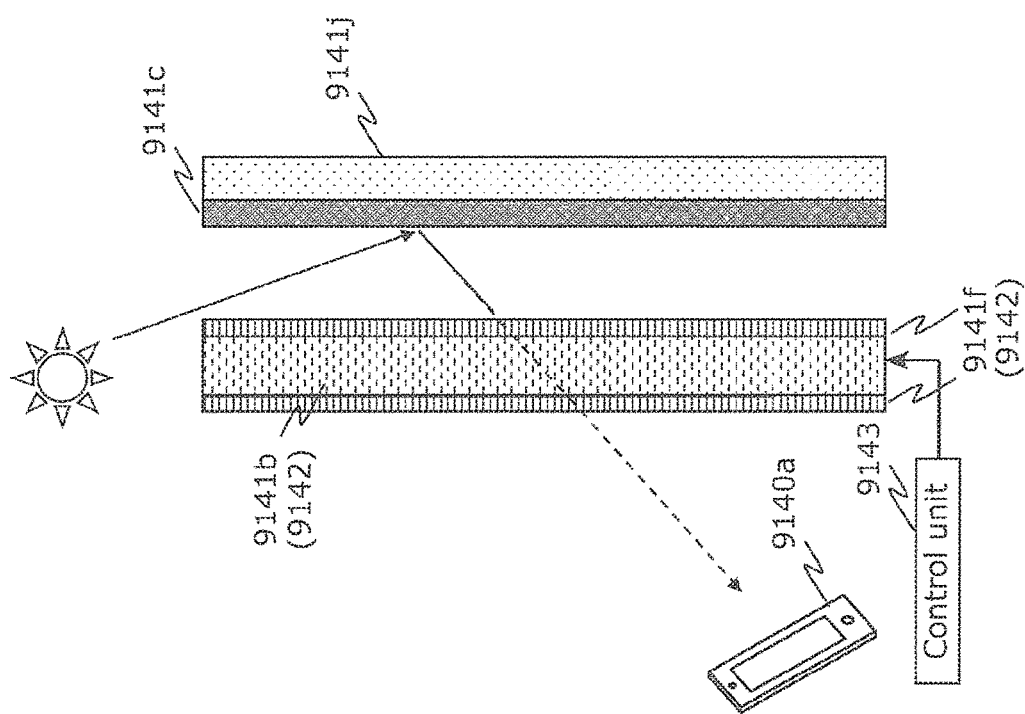
FIG. 5 is a diagram illustrating a configuration diagram of a reflection board of a reflective type in Embodiment 1.

FIG. 5 is a diagram illustrating an arrangement configuration of the reflection board 9141c in the present embodiment.

The reflection board 9141c is disposed opposite to the back surface of the liquid crystal board 9142 with a gap therebetween. The reflection board 9141c receives at least part of the sunlight from the gap and not via the liquid crystal board 9142, and then reflects the part toward the liquid crystal board 9142. With this, since at least part of the outside light such as sunlight is emitted toward the receiver 9140a by passing through the liquid crystal board 9142 only once, the amount of the light emitted from the liquid crystal board 9142 toward the receiver 9140a can be increased. As a result, a change range of amount of light, that is, a range of luminance change can be large, and therefore it is possible to transmit a signal easy for the receiver 9140a to receive.

Here, it is possible to use a light guide so that light is evenly irradiated to the back surface of the reflection board 9141c.

Figure 6:
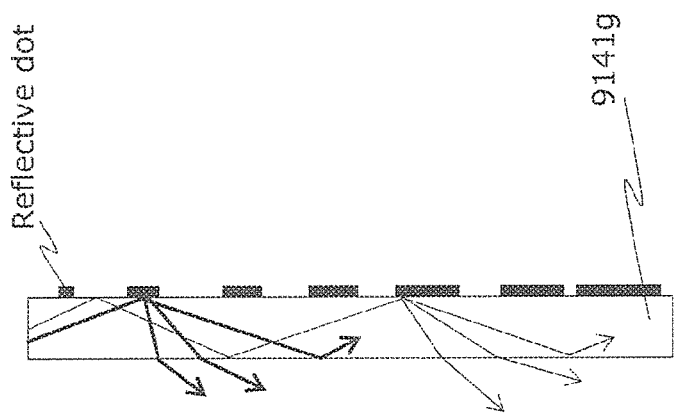
FIG. 6 is a side view of a light guide according to Embodiment 1.

FIG. 6 is a side view of a light guide according to the present embodiment.

A light guide 9141g is a board that is translucent. As illustrated in FIG. 6, the light guide 9141g is set along a vertical direction, and light is irradiated to an upper end of the light guide 9141g. At this time, since much of the light entering from the upper end to the inside of the light guide 9141g has a large angle of incidence with respect to the front surface of the light guide 9141g (the surface on the left side in FIG. 6) and the back surface (the surface on the right side in FIG. 6), the light is guided to the lower end of the light guide 9141g while being reflected by the front surface and the back surface.

Here, a plurality of reflective dots are formed on the back surface of the light guide 9141g. Each of the reflective dots has a property of causing light to have a diffuse reflection (scattering), and is formed in a long band in a horizontal direction (a vertical direction on the illustration in FIG. 6). Each of the reflective dots is disposed with a gap therebetween along a vertical direction of the light guide 9141g. Therefore, the light guided to the lower end in the light guide 9141g has a diffuse reflection when the light hits the reflective dots, and part of the diffused light is incident at a small angle of incidence with respect to the front surface of the light guide 9141g. As a result, the part of the light is emitted from the front surface of the light guide 9141g. As a result, when the light is guided, in the light guide 9141g, from the upper end side to the lower end side, the light in the light guide 9141g becomes gradually weak according to the amount of light emitted in the process. In view of this, each of the reflective dots is formed more widely as the position of the reflective dot is lower. Therefore, when the light is incident to the upper end of the light guide 9141g, the light guide 9141g can emit light from the front surface evenly on the whole.

Figure 7:
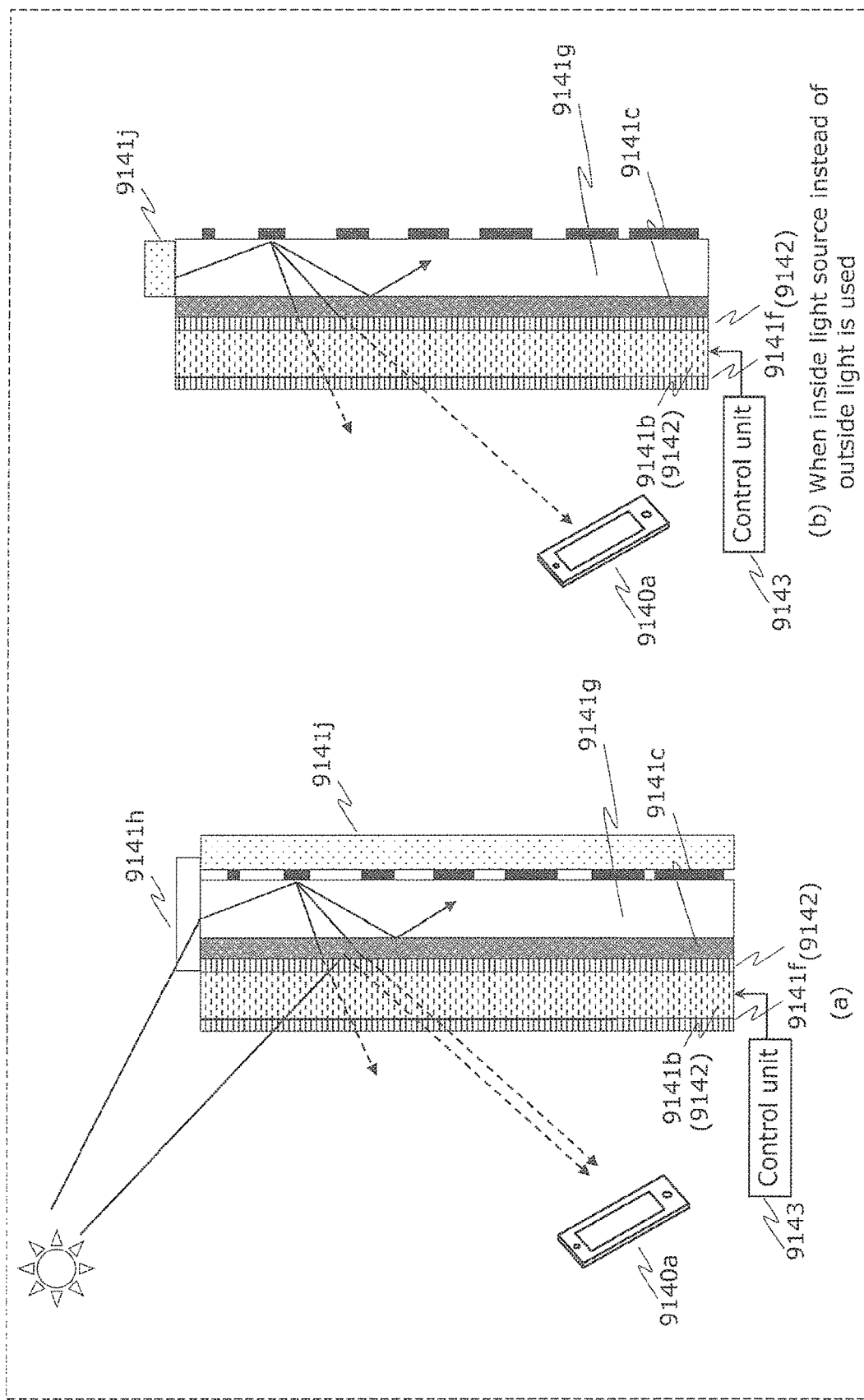
FIG. 7 is a diagram illustrating another example of a transmitter of a reflective type in Embodiment 1.

FIG. 7 is a diagram illustrating another example of a transmitter of a reflective type in the present embodiment.

As illustrated in (a) in FIG. 7, the transmitter includes the liquid crystal board 9142, the reflection board 9141c, the backlight 9141j, and the control unit 9143. The transmitter further includes a light guide 9141g and a light collection unit 9141h.

The light guide 9141g is disposed between the reflection board 9141c and the backlight 9141j. The light collection unit 9141h is configured as a lens and is disposed on the upper end of the light guide 9141g. This light collection unit 9141h collects outside light such as sunlight, and then guides the outside light from the upper end to the inside of the light guide 9141g.

With this, when the transmittance of the liquid crystal board 9142 is high and there is outside light, the front surface of the semi-translucent reflection board 9141c is brightly illuminated by outside light to be irradiated via the liquid crystal board 9142 and outside light to be irradiated via the light collection unit 9141h and the light guide 9141g. Moreover, when there is no outside light, the front surface of the semi-translucent reflection board 9141c is brightly illuminated by light to be irradiated to the back surface of the reflection board 9141c via the light guide 9141g after being emitted from the backlight 9141j.

This transmitter can stably illuminate the front surface of the reflection board 9141c, even when outside light is weak, by including the light guide 9141g and the light collection unit 9141h. As a result, when outside light is weak, the transmitter can greatly change the amount of light emitted from the front surface of the reflection board 9141c via the liquid crystal board 9142 by controlling the transmittance of the liquid crystal board 9142, and therefore can appropriately transmit a signal. It should be noted that the control (switch) of the transmittance of the liquid crystal board 9142 is performed instead of at a frequency of approximately 500 Hz at a frequency of at least several GHz. Therefore, a signal based on outside light to be reflected by the reflection board 9141c does not interfere with a signal based on outside light emitted after passing through the reflection board 9141c from the light guide 9141g. It should be noted that the light guide 9141j may be disposed between the light guide 9141g and the reflection board 9141c.

Moreover, as illustrated in (b) in FIG. 7, the transmitter does not have to include the light collection unit 9141h. In this case, the backlight 9141j is disposed at the upper end of the light guide 9141g. Moreover, in this case, the light guide 9141g receives light from the backlight 9141j instead of outside light, and diffuses the light to the front surface of the light guide 9141g, and evenly emits from the front surface on the whole.

As described above, in the present embodiment, the reflection board 9141c is translucent, and is disposed opposite to the reflected light receiving surface of the liquid crystal board 9142. Then, the transmitter further includes the board-shaped light guide 9141g that interposes the reflection board 9141c between the light guide 9141g and the liquid crystal board 9142 and is disposed substantially parallel to the liquid crystal board 9142. This light guide 9141g guides the incident sunlight in the light guide 9141g so that the sunlight incident on the end portion of the light guide 9141g is spread via the reflection board 9141c to the reflected light receiving surface of the liquid crystal board 9142. With this, since the reflective light receiving surface of the liquid crystal board 9142 not only receives reflected light but also sunlight to be spread from the light guide via the reflection board 9141c, the amount of light emitted from the liquid crystal board 9141 toward the receiver 9140a can be increased. Therefore, a change range of amount of light, that is, a range of luminance change can be large, and therefore it is possible to transmit a signal easy for the receiver 9140a to receive.

Moreover, the transmitter in the present embodiment includes the light collection unit 9141h that collects sunlight at the end portion of the light guide 9141g. With this, the amount of sunlight incident to the light guide 9141g can be increased, and therefore the amount of light emitted from the liquid crystal board 9142 toward the receiver 9140a can be further increased.

Moreover, in the present embodiment, the reflection board 9141c is translucent, and the liquid crystal board 9142 receives transmitted light that is sunlight passing through the reflection board 9141c, and changes, according to the control voltage, the amount of light emitted toward the receiver 9140a after the transmitted light passes through the reflection board 9141c. With this, since not only reflected light but also transmitted light are emitted from the receiver 9140a side, the amount of light emitted from the liquid crystal board 9142 toward the receiver 9140a can be increased. Therefore, a change range of amount of light, that is, a range of luminance change can be large, and therefore it is possible to transmit a signal easy for the receiver 9140a to receive.

Figure 8:
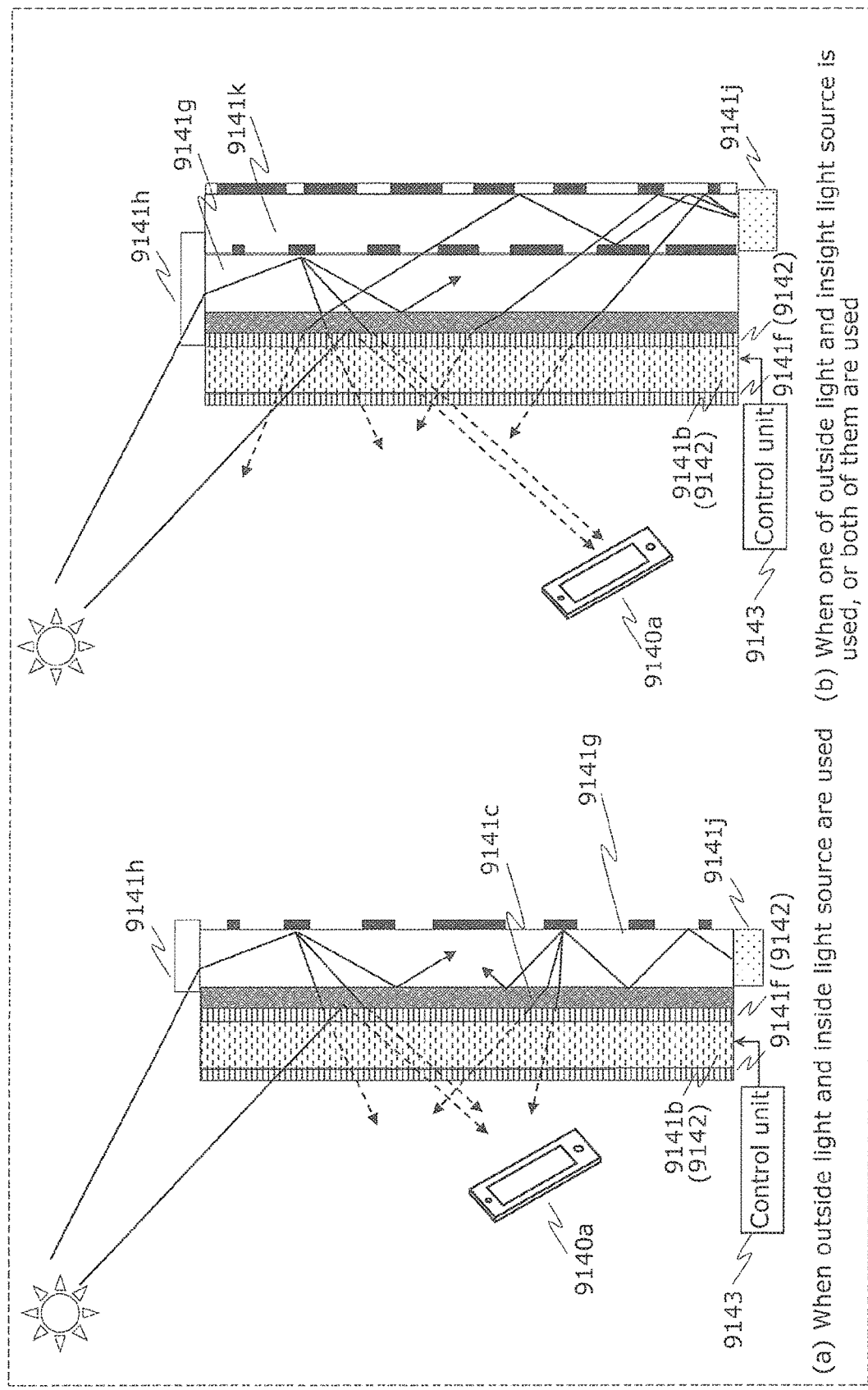
FIG. 8 is a diagram illustrating another example of a transmitter of a reflective type in Embodiment 1.

FIG. 8 is a diagram illustrating another example of a transmitter of a reflective type in the present embodiment.

As illustrated in (a) in FIG. 8, the transmitter, as similarly to the configuration in (a) in FIG. 7, includes the light guide 9141g, the light collection unit 9141h, and the backlight 9141j. However, the backlight 9141j is disposed at the lower end of the light guide 9141g, instead of the upper end or the back surface side of the light guide 9141g. In this case, each of the reflective dots of the light guide 9141g is formed more widely as the position of the reflective dot in a vertical direction is closer to the center.

With this, when the transmittance of the liquid crystal board 9142 is high and there is outside light, the front surface of the upper half of the semi-translucent reflection board 9141c is brightly illuminated by outside light to be irradiated via the liquid crystal board 9142 and outside light to be irradiated via the light collection unit 9141h and the light guide 9141g. The front surface of the lower half of the semi-translucent reflection board 9141c is brightly illuminated by outside light to be irradiated via the liquid crystal board 9142 and outside light to be irradiated via the light guide 9141g after being emitted from the backlight 9141j.

In other words, the light guide 9141g further guides light from the backlight 9141j in the light guide 9141g so that light from the backlight 9141j incident to the end portion of the light guide 9141g is spread to the reflected light receiving surface of the liquid crystal board 9142 via the reflection board 9141c. With this, when light from the backlight 9141j is incident to the end portion of the light guide 9141g, the light from the backlight 9141j is also spread to the reflected light receiving surface of the liquid crystal board 9142. Therefore, it is possible to dispose the backlight 9141j toward the end portion of the light guide 9141g. In other words, a degree of freedom of the disposition of the backlight 9141j can be increased.

Furthermore, the light collection unit 9141h and the backlight 9141j in the present embodiment are disposed at both ends of the light guide 9141g to interpose the light guide 9141g therebetween. With this, the amount of each of sunlight and light from the backlight 9141j in each position in the light guide 9141g that is incident from each end portion of the light guide 9141g and is guided toward the center of the light guide 9141g is larger as the position is closer to the end of the light guide 9141g, and is smaller as the position is closer to the center of the light guide 9141g. Therefore, in the light guide 9141g in the present embodiment, a plurality of reflective dots for scattering light are formed in a direction connecting the light collection unit 9141h and the backlight 9141j. The width of each of the reflecting tots and its direction is smaller as the position of the reflection dot is close to one of both ends, and is larger as the position of the reflective dot is closer to the center of the light guide 9141g. With this, in each of the positions of the light guide 9141g, a ratio of light emitted from the light guide 9141g to the liquid crystal board 9142 via the reflection board 9141c can be smaller as the position is closer to the end of the light guide 9141g, and is larger as the position is closer to the center of the light guide 9141g. As a result, in each of the positions of the light guide 9141g, the amount of light emitted from the light guide 9141g to the liquid crystal board 9142 via the reflection board 9141c can be substantially even. As a result, a signal can be transmitted according to an appropriate luminance change.

Moreover, as illustrated in (b) in FIG. 8, the transmitter may further include a light guide 9141k. The light guide 9141k is configured similarly to the light guide 9141g, and is disposed to be upside down with respect to the light guide 9141g at the back surface side of the light guide 9141g. In other words, each of the reflective dots of the light guide 9141k is formed more widely as the position of the reflective dot in a vertical direction is closer to the upper end. Then, the backlight 9141j is disposed at the lower end of the backlight 9141k.

With this, when the transmittance of the liquid crystal board 9142 is high and there is outside light, the front surface of the semi-translucent reflection board 9141c is brightly illuminated by outside light to be irradiated via the liquid crystal board 9142, outside light to be irradiated via the light collection unit 9141h and the light guide 9141g, and light to be irradiated via the light guide 9141k and the light guide 9141g after being emitted from the backlight 9141j. Moreover, when there is no outside light, the front surface of the semi-translucent reflection board 9141c is brightly illuminated by light to be irradiated to the back surface of the reflection board 9141c via the light guide 9141k and the light guide 9141g after being emitted from the backlight 9141j.

It should be noted that the light emitted from the front surface of the light guide 9141k, when irradiated on a portion in which there is no reflective dot in the back surface of the light guide 9141g, is incident within the light guide 9141g. Meanwhile, the light directing to the back surface in the light guide 9141g is reflected by the bask surface without being emitted toward the light guide 9141k.

Figure 9:
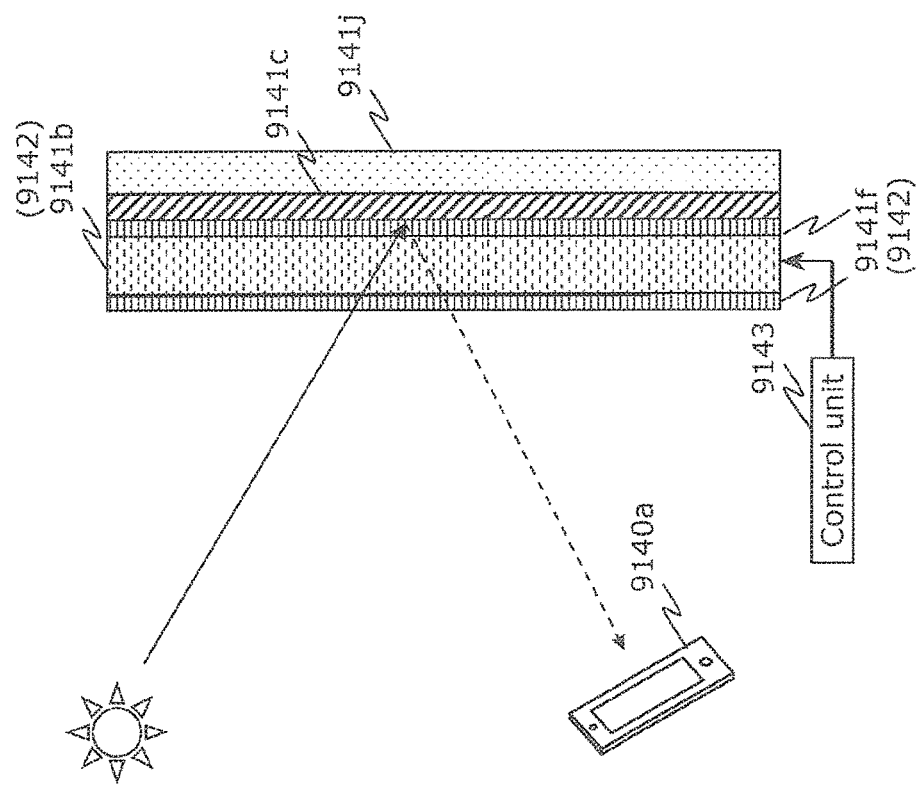
FIG. 9 is a diagram illustrating another example of a transmitter of a reflective type in Embodiment 1.

FIG. 9 is a diagram illustrating another example of a transmitter of a reflective type in the present embodiment.

As illustrated in FIG. 9, the front surface of the reflection board 9141c (the surface reflecting sunlight) may be formed in a specular surface. When outside light such as sunlight that includes a plurality of optical elements having different vibration directions is irradiated to the front surface of the liquid crystal board 9142 set to have high transmittance, an only optical element having a specific vibration direction passes from the front surface side to the back surface side of the liquid crystal board 9142, by the polarizing board 9141f. Therefore, the outside light is reduced to ½. Here, when the optical element in a specified vibration direction that passed through the liquid crystal board 9142 hits the front surface of the reflection board 9141c that is not a specular surface, the optical element is reflected again as light that includes a plurality of optical elements having different vibration directions. Then, this reflected light is further reduced to ½ when passing from the back surface side to the front surface side of the liquid crystal board 9142. Therefore, the outside light reflected by the reflection board 9141c is reduced to ¼ by passing through the liquid crystal board 9142 twice.

However, when the front surface of the reflection board 9141c is formed as a specular surface, the specific optical element that passed through the liquid crystal board 9142 vibrates only in the specific vibration direction even when being reflected by the front surface of the reflection board 9141c. Therefore, the light reflected by the front surface of the reflection board 9141c passes from the back surface side to the front surface side of the liquid crystal board 9142 without almost any reduction. Therefore, the outside light reflected by the reflection board 9141c is reduced to approximately ½ instead of ¼ by passing through the liquid crystal board 9142 twice. In other words, by unifying the light phases, the reduction of light when reflection takes place can be prevented. With this configuration, the reflected light can remain bright.

Figure 10:
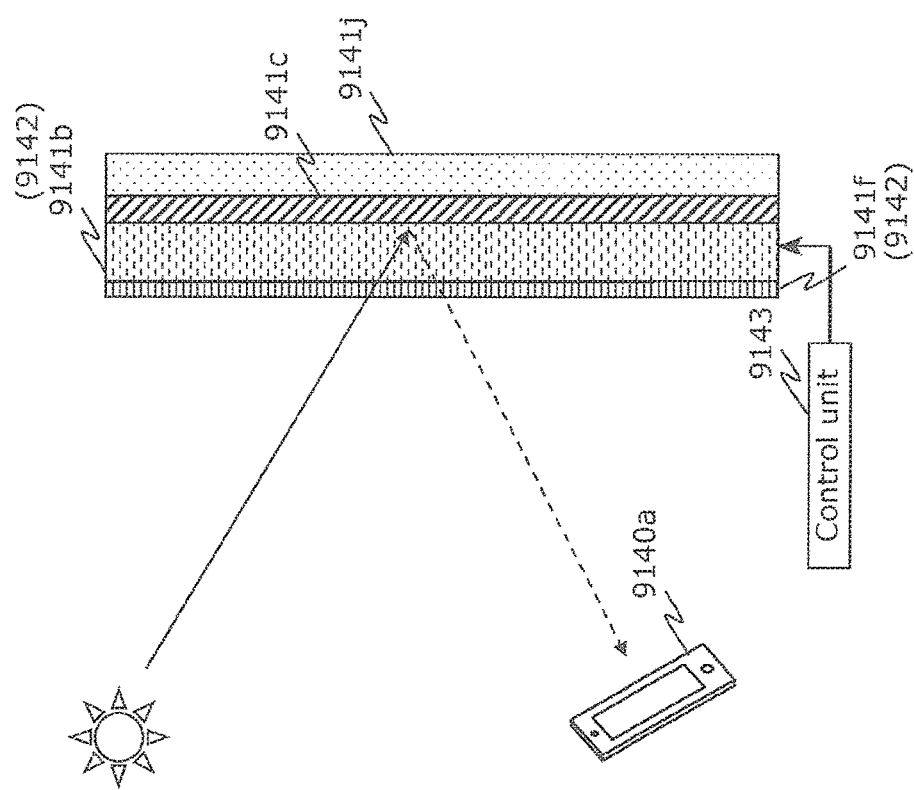
FIG. 10 is a diagram illustrating another example of a transmitter of a reflective type in Embodiment 1.

FIG. 10 is a diagram illustrating another example of a transmitter of a reflective type in the present embodiment.

When the front surface of the reflection board 9141c is formed in the specular surface, the liquid crystal board 9142 of the transmitter does not have to include the polarizing board 9141f on the back surface side, among the two polarizing boards 9141f illustrated in FIG. 9, and may include only the polarizing board 9141f on the front surface side. In the transmitter, when a voltage value of the control voltage is 0 V, the liquid crystal 9141b twists a vibration direction of the light passing through the liquid crystal 9141b by 45 degrees. When a voltage value of the control voltage is an operating voltage value, the liquid crystal 9141b does not twist a vibration direction of the light.

Therefore, when the control voltage is 0 V, the vibration direction of outside light that passes through the polarizing board 9141f and then is incident to the liquid crystal 9141b is the same as the polarizing direction of the polarizing board 9141f, and is twisted by 45 degrees when the outside light passes through the liquid crystal 9141b. Then, the outside light is reflected while being twisted by the front surface formed in the specular surface of the reflection board 9141c, and then passes through the liquid crystal 9141b again. As a result, the vibration direction of the outside light is twisted further by 45 degrees. With this, the outside light that passes through the polarizing board 9141f and then is incident to the liquid crystal 9141b returns to the polarizing board 9141f again while the vibration direction is twisted by 90 degrees. However, since the vibration direction is twisted by 90 degrees, the outside light is not emitted from the front surface of the liquid crystal board 9142.

Meanwhile, when the voltage value of the control voltage is an operating voltage value, the vibration direction of outside light that passes through the polarizing board 9141f and is incident to the liquid crystal 9141b is the same as the polarizing direction of the polarizing board 9141f, and is not twisted even when the outside light passes through the liquid crystal 9141b. Then, the outside light is reflected while not being twisted by the front surface formed in the specular surface of the reflection board 9141c, and then passes through the liquid crystal 9141b again. With this, the outside light that passes through the polarizing board 9141f and then is incident to the liquid crystal 9141b returns to the polarizing board 9141f again without the vibration direction being twisted. Therefore, the outside light is emitted from the front surface of the liquid crystal board 9142.

Even in this transmitter, the transmittance of the liquid crystal board 9142 is changed according to the control voltage, and a signal can be transmitted appropriately. Moreover, since the transmitter includes only one polarizing board, and makes it possible to keep reflected light bright. Moreover, by reducing the number of polarizing boards, cost reduction and miniaturization can be realized.

Figure 11:
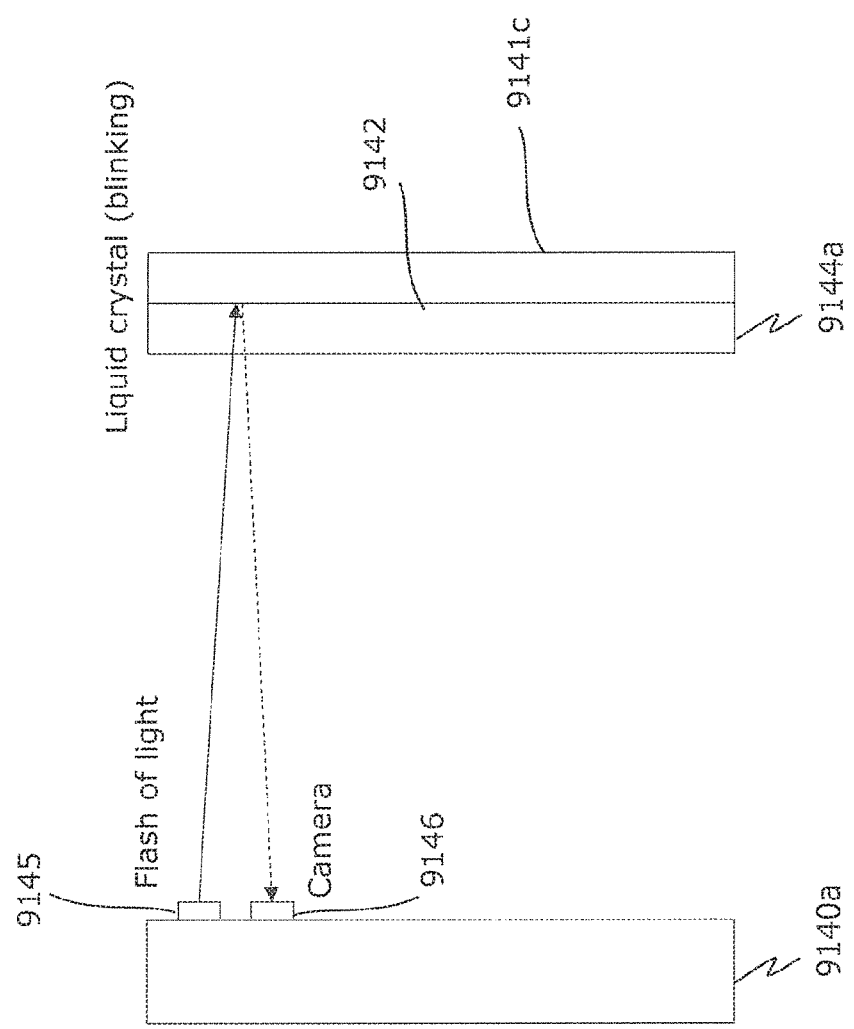
FIG. 11 is a diagram illustrating another example of communication between the transmitter and a receiver in Embodiment 1.

FIG. 11 is a diagram illustrating another example of communication between a transmitter and a receiver in the present embodiment.

A transmitter 9144a in the present embodiment is the aforementioned transmitter, and includes the control unit 9143 (not illustrated), the liquid crystal board 9142, and the reflection board 9141c. The receiver 9140a includes a light emitting unit 9145, and a camera 9146 that is an imaging unit. When receiving a signal from the transmitter 9144a, this receiver 9140a emits flash of light from the light emitting unit 9145 to the transmitter 9144. The transmitter 9144a uses the flash of light from the light emitting unit 9145 as outside light. In other words, by changing the transmittance of the liquid crystal board 9142 according to a signal to be transmitted, the transmitter 9144a illuminates the reflection board 9141c brightly and makes the reflection board 9141c dark. With this, the transmitter 9144a transmits a signal to be transmitted to the camera 9146 of the receiver 9140a.

As described above, a receiving method according to the present embodiment is a receiving method of receiving a signal from the transmitter 9144a, and the receiving method includes emitting flash of light to the transmitter 9144a, and receiving a signal indicated by a change in the amount of light emitted from the transmitter 9144a, by imaging the transmitter 9144a illuminated by the flash of light. Then, the reflection board 9141c of the transmitter 9144a reflects flash of light instead of sunlight. The liquid crystal board 9142 of the transmitter 9144a changes, according to the control voltage to be applied to the liquid crystal board 9142, the amount of light emitted by allowing reflected light that is reflected flash of light to pass through the liquid crystal board 9142. With this, by using flash light instead of sunlight when there is no sunlight or the sunlight is weak, a signal from the transmitter 9144a can be appropriately received.

FIG. 12 is a diagram illustrating an example of an application of a transmitter of a reflective type in the present embodiment.

A transmitter 9144b in the present embodiment is the aforementioned transmitter, and includes the control unit 9143 (not illustrated) and the liquid crystal board 9142. This transmitter 9144b is used by installing on a signboard 9147. The transmitter 9144b installed on the signboard 9147 uses, as the reflection board 9141c, a portion of the signboard 9147 opposed to the liquid crystal board 9142. Moreover, when the aforementioned portion of the signboard 9147 is translucent and a light source is provided in the signboard 9147, the transmitter 9144b uses the light source as the backlight 9141j.

FIG. 13 is a diagram illustrating another example of an application of a transmitter of a reflective type in the present embodiment.

The transmitter 9144b in the present embodiment may be installed on a signboard 9148 illuminated by a plurality of lighting devices 9149. The transmitter 9144b installed on the signboard 9148 uses, as the reflection board 9141c, a portion of the signboard 9148 opposed to the liquid crystal board 9142. Moreover, the transmitter 9144b uses the light from the lighting devices 9149 as the aforementioned outside light such as sunlight. Here, when the lighting devices 9149 transmit signals by luminance change, the luminance changes of the lighting devices 9149 need to be synchronized. In the present embodiment, however, since the transmitter 9144b transmits a signal to be transmitted by changing the transmittance of the liquid crystal board 9142, the aforementioned synchronization is not necessary even when there is a plurality of the lighting devices 9149.

Figure 14:
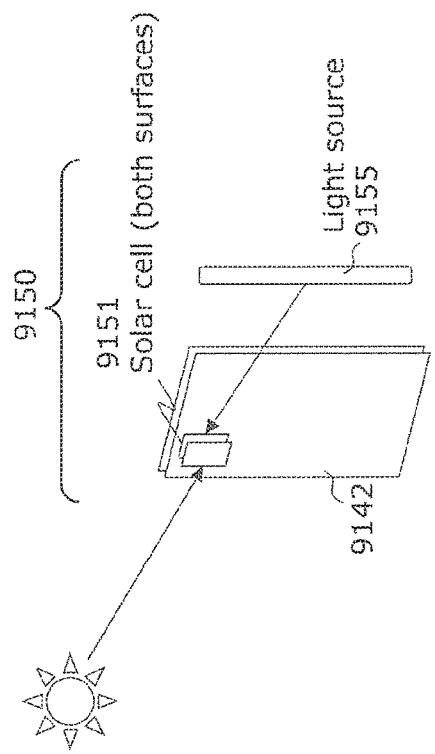
FIG. 14 is a diagram illustrating another example of a transmitter in Embodiment 1.

FIG. 14 is a diagram illustrating another example of a transmitter in the present embodiment.

A transmitter 9150 in the present embodiment includes the aforementioned control unit 9143 (no illustrated) and the liquid crystal board 9142, and further includes a light source 9155 and two solar cells 9151. One of the solar cells 9151 is installed on the front surface side of the liquid crystal board 9142, and the other is installed on the back surface side of the liquid crystal board 9142. Therefore, one of the solar panels 9151 generates power by receiving outside light such as sunlight, and provides the power obtained by the generation to the control unit 9143. Therefore, the other solar cell 9151 generates power by receiving light from the light source 9155, and supplies the power obtained by the generation to the control unit 9143. With this, the transmitter 9150 can transmit a signal by changing the transmittance of the liquid crystal board 9142 without power being supplied from outside.

Figure 15:
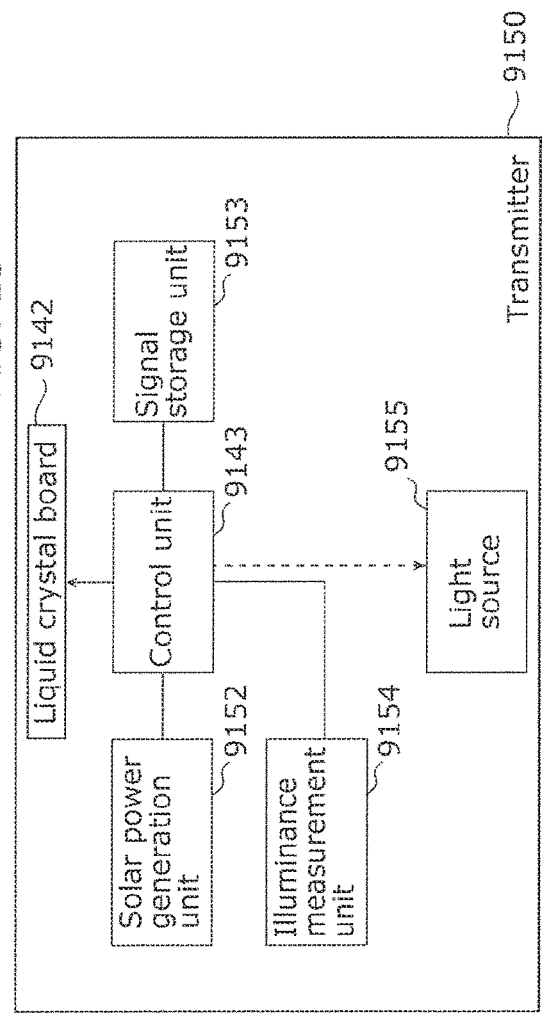
FIG. 15 is a block diagram illustrating a configuration of the transmitter in Embodiment 1.

FIG. 15 is a block diagram illustrating a configuration of the transmitter 9150 in the present embodiment.

The transmitter 9150 includes the liquid crystal board 9142, the control unit 9143, a solar power generation unit 9152, a signal storage unit 9153, an illuminance measurement unit 9154, and a light source 9155.

The solar power generation unit 9152 includes two solar cells 9151, generates power according to outside light or light of the light source 9155, and supplies the power obtained by the power generation to the control unit 9143. The signal storage unit 9153 holds, for example, identification information (ID) for identifying the transmitter 9150. The control unit 9143 reads, from the signal storage unit 9153, the identification information as a signal to be transmitted. The illuminance measurement unit 9154 measures illuminance of outside light in a surrounding area of the transmitter 9150, and notifies the measured illuminance to the control unit 9143. When the notified illuminance is low, the control unit 9143 switches ON the light source 9155. It should be noted that the power of the light source 9155 may be supplied from the power supply installed on the light source 9155, and may be supplied from outside of the transmitter 9150.

The receiver 9140a that receives a signal from this transmitter 9150 obtains, on reception of ID that is a signal of the transmission signal, related information associated with the ID from a server. For example, when the transmitter 9150 is installed in the bus stop, the receiver 9140a obtains, from the server, information indicating the service situation of the bus corresponding to the current time at the bus stop. Moreover, the control unit 9143 of the transmitter 9150 regularly accesses the server and obtains, every time accessing to the server, information indicating the service situation of the bus corresponding to the current time at the bus stop (bus service information). The control unit 9143 of the transmitter 9150 may store the information, instead of ID, in the signal storage unit 9153. In this case, the transmitter 9150 transmits, instead of ID, the latest information of the bus service. Therefore, the receiver 9140a can directly obtain the bus service information without access to the server.

FIG. 16 is a diagram illustrating an example of an application of a transmitter of a transmissive type in the present embodiment.

As illustrated in FIG. 16, the transmitter includes the liquid crystal board 9140b configured as a roof that is translucent and installed in the bus stop, for example. As illustrated in (a) and (b) in FIG. 16, this transmitter measures illuminance (brightness) of outside light such as sunlight that passed through the liquid crystal board 9140b, and controls the transmittance of the liquid crystal board 9140b to ensure that the illuminance is constant. It should be noted that the control of the transmittance is performed by the control unit 9143 (not illustrated) included in the transmitter.

It should be noted that although the transmitter illustrated in FIG. 16 is a transmissive type, the transmitter of the reflective type may also measure illuminance (brightness) of outside light such as sunlight that passed through the liquid crystal board 9142 after being reflected by the reflection board, and may control the transmittance of the liquid crystal board 9142 to ensure that the illuminance is constant.

FIG. 17 is a diagram illustrating an example of control of a liquid crystal board in the present embodiment.

When transmitting a signal indicated by a predetermined frequency, the transmitter, as illustrated in (a) in FIG. 17, changes the transmittance of the liquid crystal board 9140b with the frequency so that the ratio of a period of low transmittance (dark portion) with respect to a period of high transmittance (bright portion) is 1. Here, when outside light that passed through the liquid crystal board 9140b is dark, the transmitter, as illustrated in (b) in FIG. 17, changes the transmittance of the liquid crystal board 9140b with the frequency so that the ratio of a dark portion with respect to a period of a bright portion is less than 1. With this, even when outside light is dark, the transmitter can transmit the aforementioned signal by luminance change of bright and large contrast. Conversely, when outside light that passed through the liquid crystal board 9140b is bright, the transmitter, as illustrated in (c) in FIG. 17, changes the transmittance of the liquid crystal board 9140b with the frequency so that the ratio of a period of a dark portion with respect to a period of a bright portion is more than 1. With this, even when outside light is too bright, the transmitter can transmit the aforementioned signal by luminance change of appropriately controlled contrast.

With this, regardless of whether the outside light is bright or dark, the same signal can be appropriately transmitted. In other words, Fourier series expansion is performed on the process of the transmittance illustrated in FIG. 17, the brightness is adjusted so that the term of the largest coefficient is not changed. It should be noted that the transmitter does not have to be a rectangular wave illustrated in FIG. 17, and may control the transmittance of the liquid crystal board 9140b according to a sine wave.

FIG. 18 is a diagram illustrating a spectrum of a luminance change of a liquid crystal board obtained by control of transmittance by the transmitter in the present embodiment.

For example, as illustrated in (a) in FIG. 18, when the transmittance is changed according to a rectangular wave so that the ratio of a period of a bright portion and a period of a dark portion is 1:1, a signal component and a rectangular component appear in the spectrum of luminance change. The signal component is a component that indicates a frequency of a rectangular wave, and the rectangular component is a component that appears due to a difference between the rectangular wave and a sine wave.

Moreover, as illustrated in (b) in FIG. 18, when the transmittance is changed according to a rectangular wave so that the ratio of a period of a bright portion and a period of a dark portion is 3:1, a signal component and a rectangular component as well as an asymmetric component appear in the spectrum of luminance change. The asymmetric component is a component that appears because the rectangular wave is asymmetric. It should be noted that also when the ratio of a period of a bright portion and a period of a dark portion is 3:1, the spectrum of luminance change is the same as the spectrum illustrated in (b) in FIG. 18.

Moreover, as illustrated in (c) in FIG. 18, when the transmittance is changed according to a rectangular wave so that the ratio of a period of a bright portion and a period of a dark portion is 7:1, a signal component and a rectangular component as well as an asymmetric component appear in the spectrum of luminance change. It should be noted that also when the ratio of a period of a bright portion and a period of a dark portion is 1:7, the spectrum of luminance change is the same as the spectrum illustrated in (c) in FIG. 18.

Here, a frequency of the asymmetric component and a frequency of the rectangular component is higher than a frequency of the signal component. Therefore, by imaging the liquid crystal board in which the luminance change is performed by the transmittance control, the receiver obtains only the lowest frequency among the frequencies of the components (peaks) that appear in the spectrum of luminance change, as a frequency indicating a signal to be transmitted.

As described above, the transmitter and the transmitting method according to an aspect of the present disclosure have been described with reference to Embodiment 1. The transmitter and the transmitting method according to an aspect of the present disclosure are not limited to only the configuration of Embodiment 1.

Figure 19B:
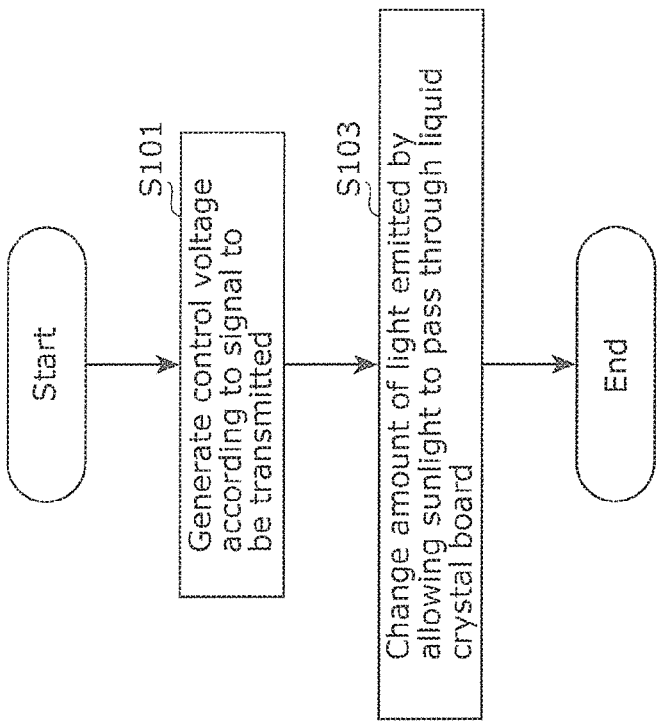
FIG. 19B is a flowchart illustrating a transmitting method according to an aspect of the present disclosure.
Figure 19A:
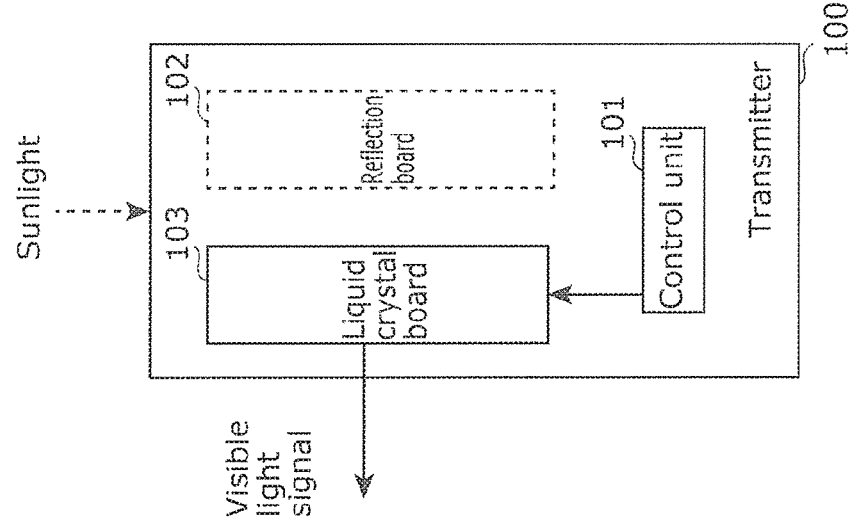
FIG. 19A is a block diagram illustrating a configuration of a transmitter according to an aspect of the present disclosure.

FIG. 19A is a block diagram illustrating a configuration of a transmitter according to an aspect of the present disclosure.

A transmitter 100 in the present embodiment is a transmitter that transmits a signal to the receiver 9140a by changing the amount of light emitted, and includes a control unit 101 that generates a control voltage corresponding to a signal to be transmitted, a reflector 102 that reflects sunlight, and a liquid crystal board 103 that receives reflected light that is sunlight reflected by the reflector 102 and changes, according to a control voltage, the amount of light emitted toward the receiver 9140a by allowing the reflected light to pass through. It should be noted that the reflector 102 does not have to be included in the transmitter 100. In other words, the transmitter 100 in the present embodiment is a transmitter that transmits a signal to the receiver 9140a by changing the amount of light emitted, and includes a control unit 101 that generates a control voltage corresponding to a signal to be transmitted, and a liquid crystal board 103 that receives sunlight and changes, according to a control voltage, the amount of light emitted toward the receiver 9140a by allowing the sunlight to pass through.

FIG. 19B is a block diagram illustrating a configuration of a transmitting method according to an aspect of the present disclosure.

A transmitting method according to an aspect of the present disclosure is a transmitting method of transmitting a signal to the receiver 9140a by changing the amount of light emitted, and includes a voltage generation step S101 of generating a control voltage corresponding to a signal to be transmitted, and a transmittance control step S103 of receiving, through a liquid crystal board, reflected light that is sunlight reflected by a reflector, and changing, according to a control voltage to be applied to the liquid crystal board, the amount of light emitted toward the receiver 9140a by allowing the reflected light to pass through the liquid crystal board. It should be noted that in the transmittance control step S103, without using the reflection board as described above, the amount of light emitted toward the receiver 9140a may be changed by allowing sunlight directly irradiated to the liquid crystal board to pass through the liquid crystal board.

With this, the transmitter and the transmitting method according to an aspect of the present disclosure make it possible to perform visible light communication using sunlight and do not need a light source for visible light communication, thus making it difficult to be affected by structural constraints.

Embodiment 2

(Application to Shopping Cart)

FIGS. 20A to 22 are each a diagram illustrating an information communication method (signal receiving method) in Embodiment 2.

As illustrated in FIG. 20A, a shopping cart 9100b in the present embodiment includes a setting board 9100c. The setting board 9100c has a structure in which a receiver 9100a which is configured as a smartphone (multifunctional mobile phone), for example, is installed in the upper part, and includes a reflection board 9100*d* in the lower part. Light incident from the side with respect to a moving direction of the shopping cart 9100*b* is reflected as reflected light in an upper direction with respect to the reflection board 9110*d*.

The receiver 9100*a* includes receiving units 9100*e* and 9100*f* that capture an image or receive light. The receiver 9100*a* receives a signal indicated by the reflected light using the receiving unit 9100*f* provided on the lower surface. Moreover, the receiver 9100*a* receives a signal indicated by light from a transmitter configured as a ceiling lighting device provided in the upper surface, for example, by the receiver 9100*e* provided in the upper surface. The receiver 9100*a*, as illustrated in FIG. 20B, notifies, to the user, sale information and detailed information about a product, for example, by displaying information on the display according to the received signal and by reproducing sound.

Figure 21:
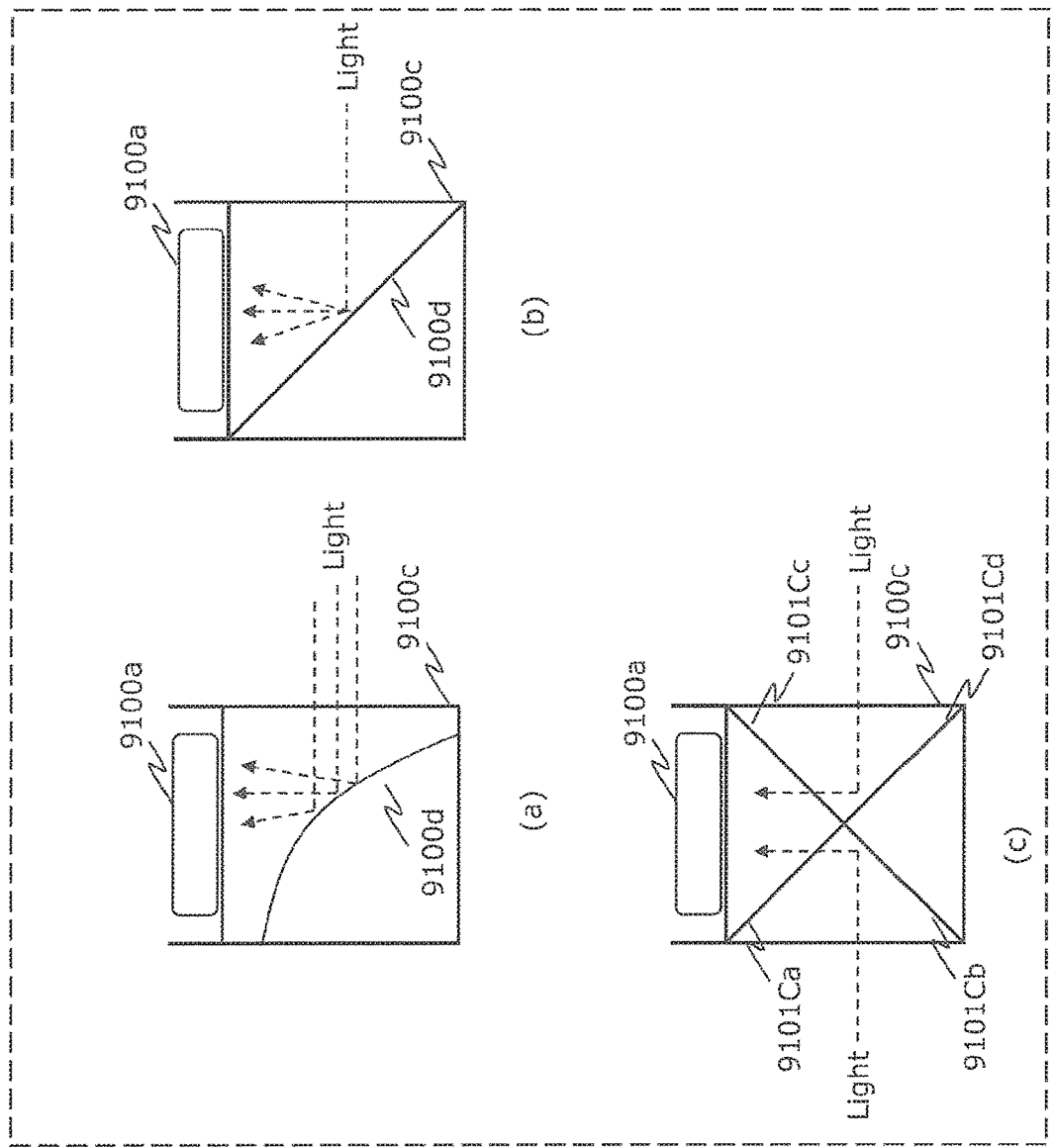
FIG. 21 is a diagram illustrating an example of an application of the information communication method in Embodiment 2 to a shopping cart.

As illustrated in (a) in FIG. 21, the reflection board 9100*d* may be shaped in convex. With this, since the receiver 9100*a* can receive light from a light source via the reflection board 9100*d* more widely compared with when the reflection board 9100*d* is planar, the receiver 9100*a* can capture an image having the light source largely projected. With this, it is possible to receive a signal from a light source at a distance, and increase a receiving speed.

As illustrated in (b) in FIG. 21, the reflection board 9100*d* may have diffuse reflection of light. With this, since the receiver 9100*a* can receive light from a light source via the reflection board 9100*d* more widely compared with when the reflection board 9100*d* has specular reflection of light, the receiver 9100*a* can capture an image having the light source largely projected. With this, it is possible to receive a signal from a light source at a distance, and increase a receiving speed.

As illustrated in (c) in FIG. 21, the setting board 9100*c* may include a half mirror 9101Ca, a half mirror 9101Cc, a reflection board 9101Cb, and a reflection board 9101Cd, instead of the reflection board 9100*d*. With this, a signal indicated by light incident from both sides can be received by the receiver 9100*a*.

The user causes the receiver 9100*a* to image barcode and label of the product, and the receiver 9100*a* displays the information of the imaged product on the display.

Moreover, the receiver 9100*a* stores the captured product as a product on the shopping list. The receiver 9100*a* passes the information about the product on the shopping list to a checkout counter by communicating, with the checking counter, using visible light communication, radio wave communication, or near field communication. This can remove a checking operation at the checkout counter, thus making it possible to quickly complete the purchasing process. Moreover, when the user pays the bill by credit card or electronic money that is associated with the receiver 9100*a*, the communication with the checkout counter is not necessary. The receiver 9100*a* obtains the weight of the product on the shopping list from a server, and then passes the weight to the shopping cart 9100*b*. The shopping cart 9100*b* includes a weighing unit, and checks whether or not the weight measured by the weighing unit and the weight of the product on the shopping list are equal to each other. When the weights are not equal to each other, the weighing unit notifies this to the receiver 9100*a*, and then issues a warning. The weighing unit may be included in the checkout counter instead of the shopping cart 9100*b*. In this case, the receiver 9100*a* notifies the weight of the product on the shopping list to the checkout counter. Moreover, the receiver 9100*a* may notify only the product on the shopping list to the checkout counter, and then the checkout counter may measure the weight.

Figure 22:
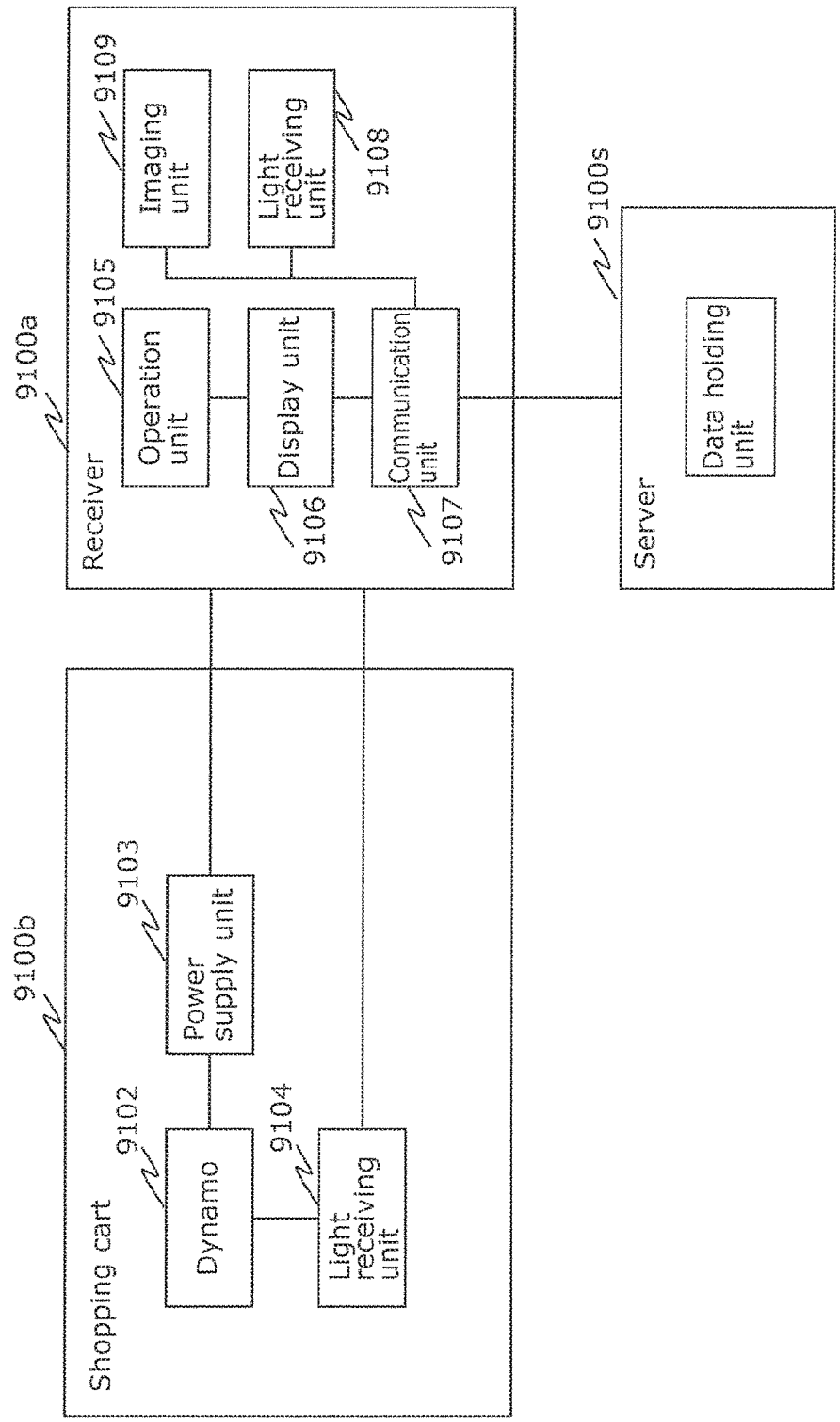
FIG. 22 is a configuration diagram of a receiver and a shopping cart used in the information communication method in Embodiment 2.

FIG. 22 is a block diagram of the receiver 9100*a* and the shopping cart 9100*b*.

The shopping cart 9100*b* includes a dynamo 9102, a power supply unit 9103, and a light receiving unit 9104. The dynamo 9102 generates power using force when the user pushes the shopping cart 9100*b*. Using the generated power, the light receiving unit 9104 performs communication with the receiver 9100*a*, and receives a signal indicated by light from a transmitter such as a ceiling lighting device. Moreover, the power supply unit 9103 operates as a charger of the receiver 9100*a*, by transmitting the surplus power of the power generated by the dynamo 9102.

The receiver 9100*a* includes an operation unit 9105, a display unit 9106, a communication unit 9107, a light receiving unit 9108, and an imaging unit 9109. The operation unit 9105 receives an operation on the receiver 9100*a* and the shopping cart 9100*b* by the user. The display unit 9106 displays an image according to the operation received by the operation unit 9105. Each of the light receiving unit 9108 and the imaging unit 9109 is the aforementioned receiving unit 9100*e* or the aforementioned receiving unit 9100*f*, and images an image or receives light. By communication with a server 9100*s* that is the aforementioned server, the communication unit 9107 obtains, for example, the product on the shopping list held in a data holding unit of the server 9100*s*.

Figure 23:
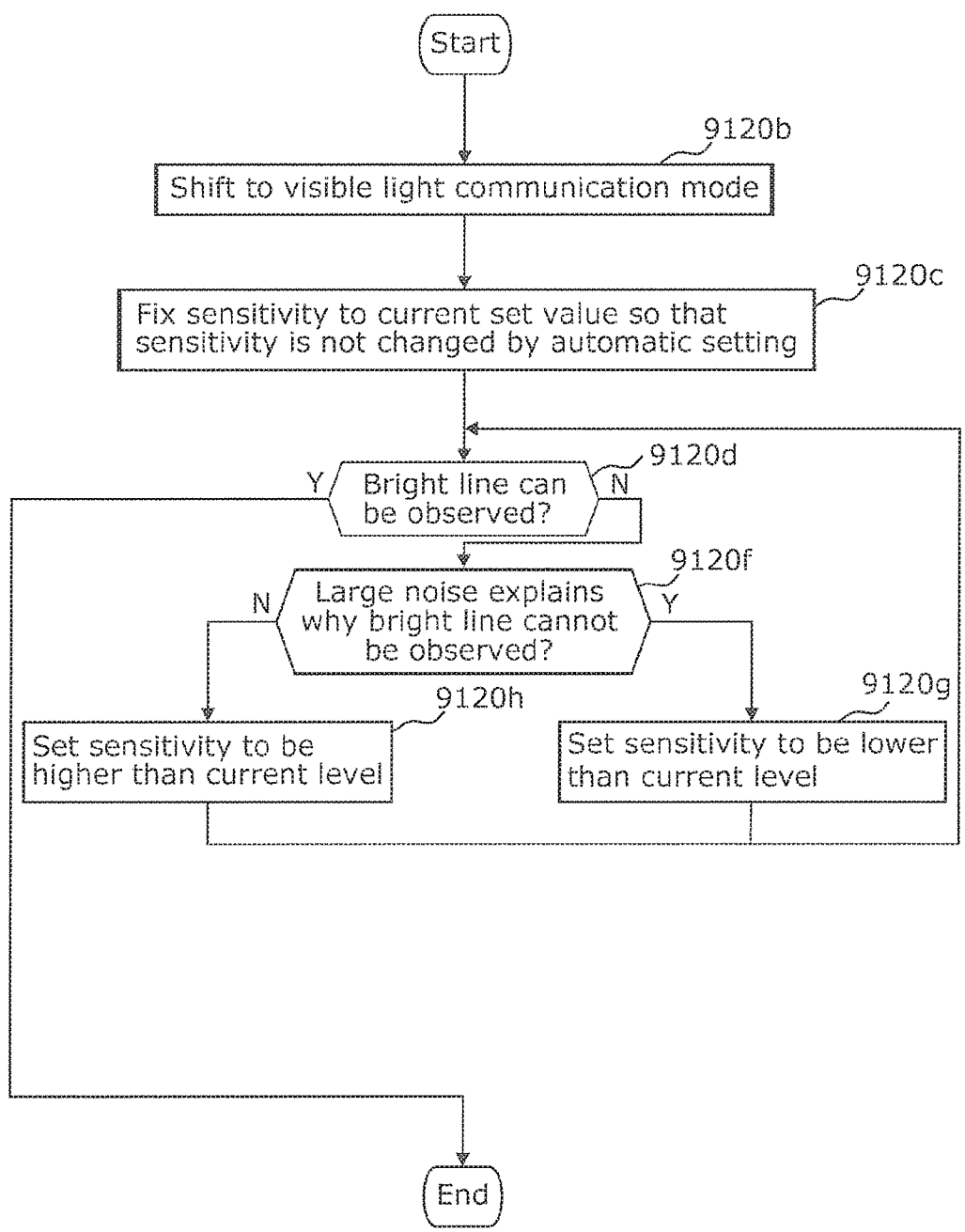
FIG. 23 is a flowchart illustrating another example of an operation of the receiver in Embodiment 2.

FIG. 23 is a flowchart illustrating another example of an operation of the receiver 9100*a*.

First, the receiver 9100*a* shifts to a visible light communication mode in Step 9120*b*. Next, in Step 9120*c*, the receiver 9100*a* fixed the sensitivity to the current set value so that the sensitivity of the light receiving unit included in the receiver 9100*a* is not changed by automatic setting. Then, in Step 9120*d*, the receiver 9100*a* determines whether or not a bright line can be observed. When it is determined that the bright line can be observed (Y in Step 9120*d*), the receiver ends a setting process of the sensitivity for visible light communication. When the bright line cannot be observed (N in Step 9120*d*), the receiver 9100*a* determines in Step 9120*f* whether or not large noise explains why the bright line cannot be observed. When it is determined that large noise explains why the bright line cannot be observed (Y in Step 9120*f*), in Step 9120*g*, the receiver 9100*a* repeats the process of Step 9120*d* by setting the sensitivity of the light collecting unit to a value lower than the current set value (low sensitivity). When it is determined that large noise does not explain why the bright line cannot be observed (N in Step 9120*f*), in Step 9120*h*, the receiver 9100*a* repeats the process of Step 9120*d* by setting the sensitivity of the light collecting unit to a value higher than the current set value (high sensitivity).

Embodiment 3

(Museum Service)

Figure 24:
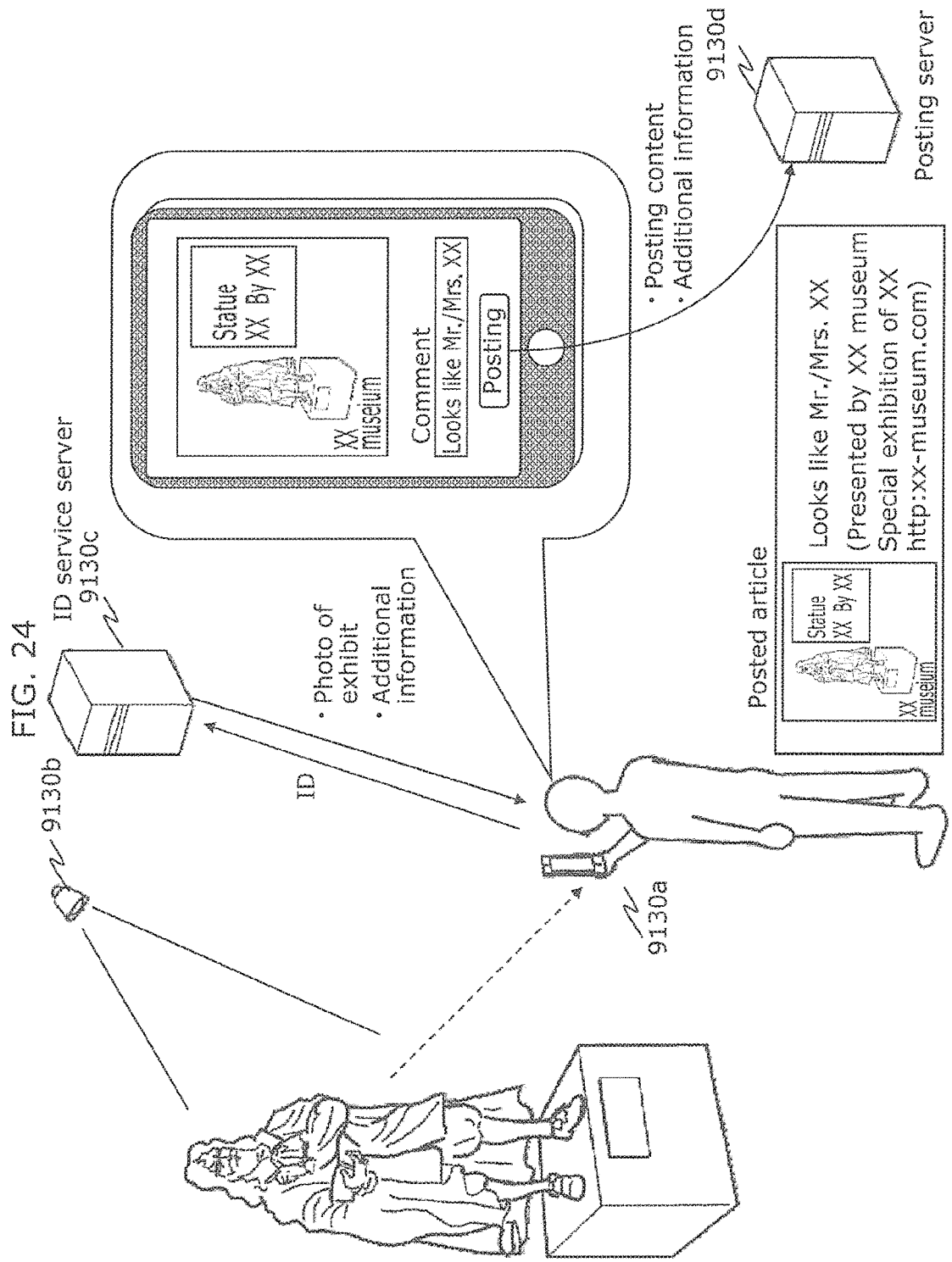
FIG. 24 is a diagram illustrating an example of control of a signal transmitting and receiving system in Embodiment 3.

FIG. 24 is a diagram illustrating an example of a signal transmitting and receiving system in Embodiment 3.

This signal transmitting and receiving system includes a receiver 9130*a*, a transmitter 9130*b*, an ID service server 9130*c*, and a posting server 9130*d*. The transmitter 9130*b* illuminates an exhibit and its surrounding area with light including a visible light signal. The receiver 9130*a* is configured as the smartphone, for example, and receives a visible light signal from the transmitter 9130*b* by imaging the exhibit with light that is illuminated by the transmitter 9130*b*, that is, by imaging light that is emitted from the transmitter 9130*b* and is reflected by the exhibit. The receiver 9130*a* transmits, to the ID service server 9130*c*, information indicated by the received visible light signal (for example, ID). Then, by using the information as a key, the receiver 9130*a* obtains information about an exhibit, an exhibition facility, and the like (for example, the photo of the exhibit and additional information) from the ID service server 9130*c*, and displays the information on the screen. According to an operation by the user via the screen, the receiver 9130*a* adds the obtained information about the exhibit and the like to a user's comment, and then posts it to a posting server 9130*d*. With this, the posting server 9130*d* discloses, as the posted article via a communication line network, the photo of the exhibit, a user's comment, and additional information (for example, URL: Uniform Resource Locator indicating a Web site of the exhibition facility, such as an art museum, which displays the exhibit) that are indicated by the information. Moreover, the receiver 9130*a* displays the comment posted by another user.

(Control of Directional Speaker)

Figure 25:
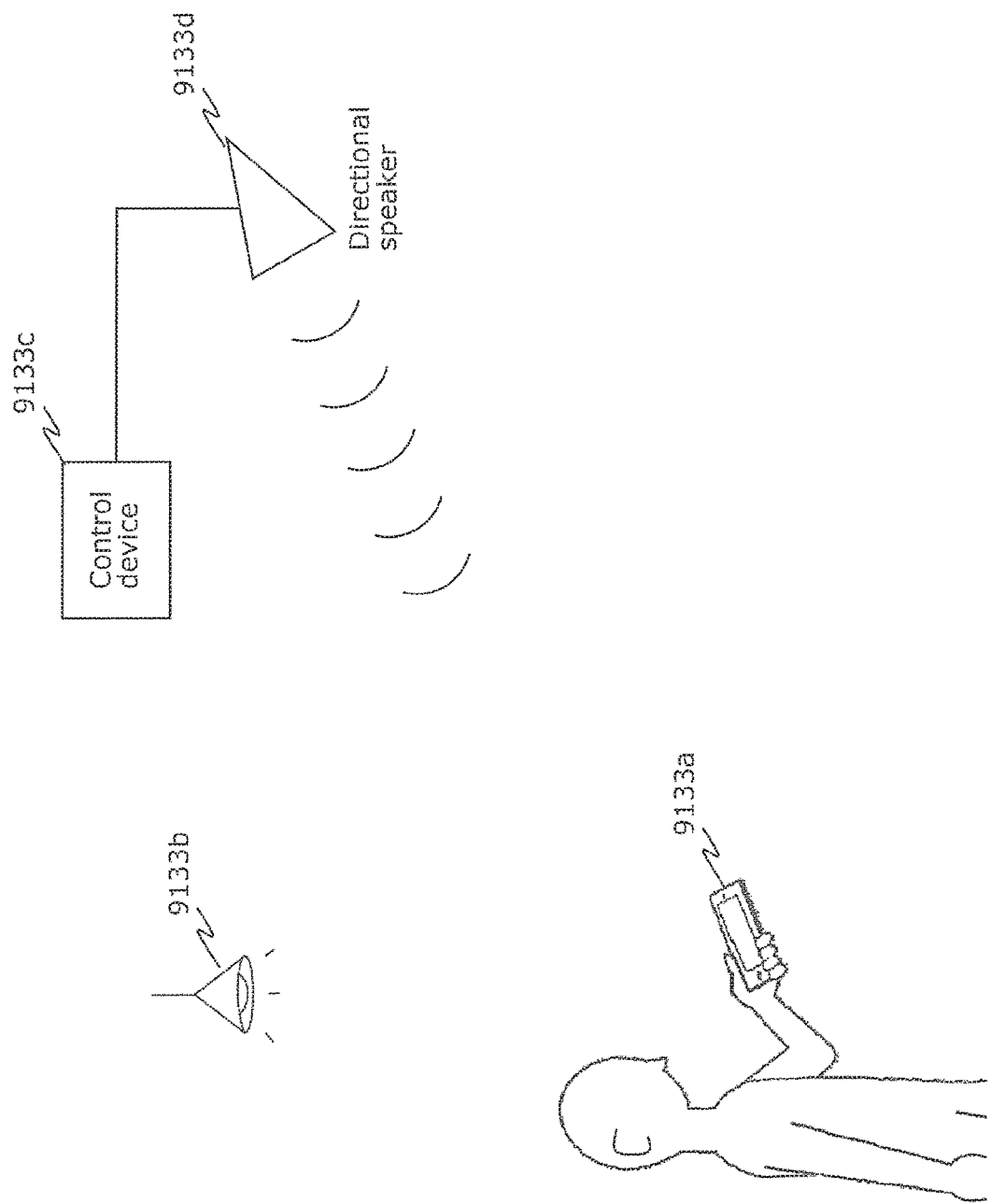
FIG. 25 is a diagram illustrating another example of control of a signal transmitting and receiving system in Embodiment 3.

FIG. 25 is a diagram illustrating another example of a signal transmitting and receiving system in Embodiment 3.

This signal transmitting and receiving system includes a receiver 9133*a*, a transmitter 9133*b*, a control device 9133*c*, and a directional speaker 9133*d*. The transmitter 9133*b* is configured as a lighting device that illuminates the surrounding area, and transmits a signal (visible light signal) by luminance change. The receiver 9133*a* is configured as a smartphone, for example, and receives a signal from the transmitter 9133*b* by imaging the transmitter 9133*b* with the light receiving unit (imaging unit) included in the receiver 9133*a*. Then, the receiver 9133*a* estimates self-position that is a process of estimating the position of the receiver 9133*a*, using the position of the transmitter 9133*b* indicated by the signal, for example. For example, the receiver 9133*a* estimates self-position based on the position and size of the transmitter 9133*b* indicated by the received signal, the position, size, and orientation in the image of the transmitter 9133*b* which is projected by image capture by the light receiving unit. Moreover, the receiver 9133*a* images the user's face, and estimates a position and orientation of the user's face viewed from the receiver 9133*a*, based on the position and orientation of the user's face which is projected in an image obtained by the imaging. As a result, the receiver 9133*a* identifies the position and orientation of the user's face in a space in which the signal transmitting and receiving system is disposed (global coordinate system), based on the position of the receiver 9133*a* obtained by self-position estimation, and the position and orientation of the user's face viewed from the receiver 9133*a*. The receiver 9133*a* transmits, to the control device 9133*c*, information indicating the position and orientation of the user's face. The control device 9133*c* identifies, on reception of the information, a position of the user's ears in a global coordinate system. Then, the control device 9133*c* directs an output direction of sound of the directional speaker 9133*d* to the identified position (the user's ears). With this, the directional speaker 9133*d* can convey, to the user, the sound information about the exhibit that the user is watching and the content designated by the user, by limiting the target to the user.

(Transmission by Inserting Non-Signal Period)

Figure 26:
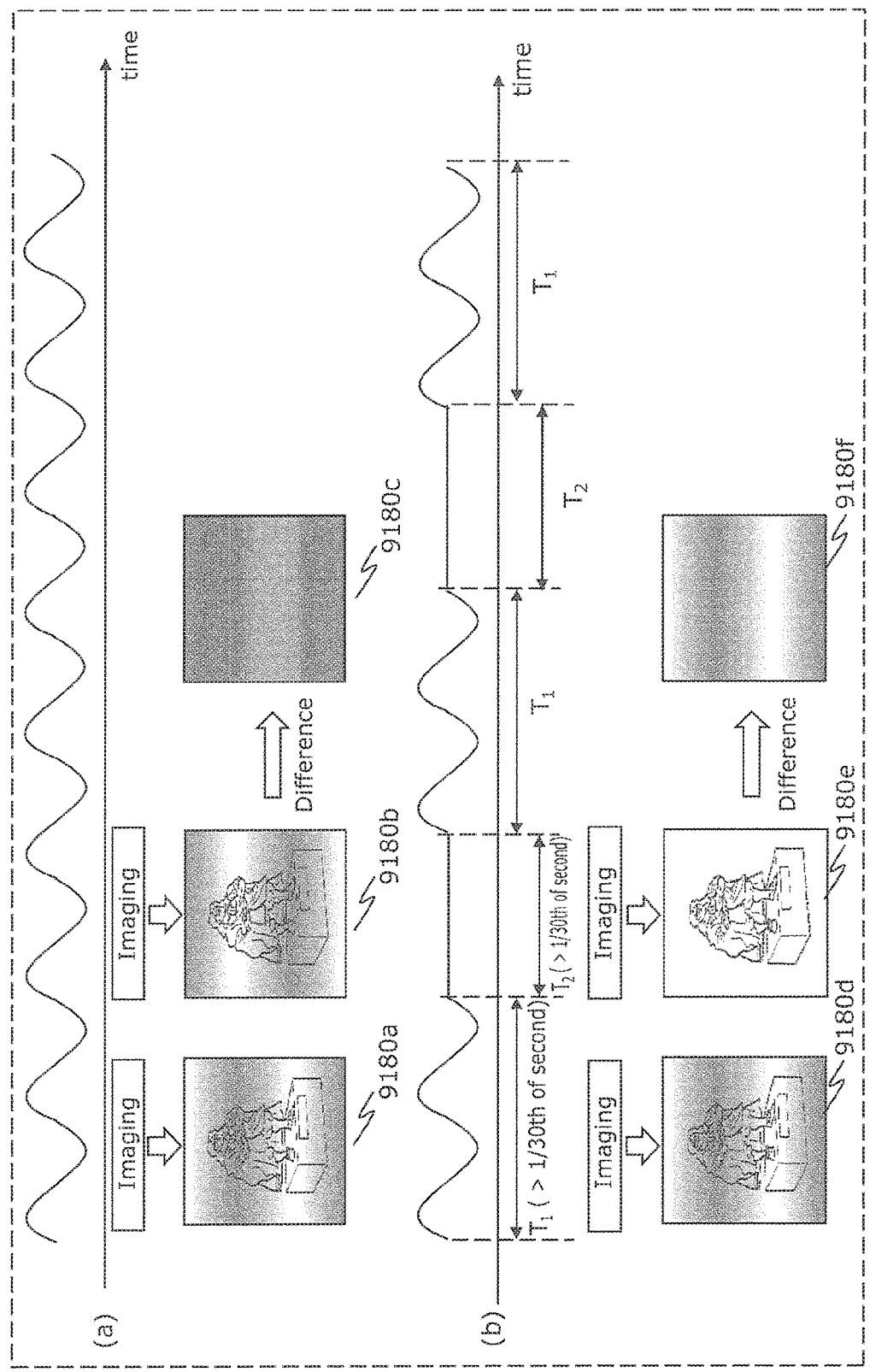
FIG. 26 is a diagram illustrating an example of a signal format in Embodiment 3.

FIG. 26 is a diagram illustrating an example of a signal format in Embodiment 3.

As illustrated in (a) in FIG. 26, the transmitter transmits a signal of a frequency-ID method that indicates specific information at a frequency of specific luminance change. The receiver obtains two images 9180*a* and 9180*b* by imaging them at a different timing. In these images, contrast of light and dark due to luminance change of the transmitter appears across the board as a signal that is transmitted from the transmitter, and a landscape (image of the exhibit) also appears. Here, the transmitter obtains an image 9180*c* in which a landscape is removed, by taking a difference between the two captured images 9180*a* and 9180*b*. However, the difference image 9180*c* is superimposed with a signal when the image 9180*a* and the image 9180*b* are captured.

Therefore, as illustrated in (b) in FIG. 26, the transmitter may set a period in which no signal is transmitted. With this, the receiver can obtain a difference image 9180*f* on which no signal is superimposed. In other words, the receiver obtains an image 9180*d* in which the contrast of light and dark appears along with the landscape, by imaging in a period in which a signal is transmitted by the transmitter. Furthermore, the receiver obtains an image 9180*e* in which only the landscape appears, by imaging, through the transmitter, in a period in which no signal is transmitted. Therefore, the receiver can obtain, as the difference image, an image 9180*f* from which the landscape is removed and on which a plurality of signals are not superimposed by taking the difference between the image 9180*d* and the image 9180*e*.

By extending time T1 in which a signal is transmitted and time T2 in which a signal is not transmitted to be longer than a time in which the receiver images an image (many of the cameras have ⅟₃₀th of a second), it is possible to definitely obtain an image such as the difference image 9180*f*. It should be noted that in the signal non-transmission period, a high frequency that cannot be recognized by the exposure time set in the receiver may be used, instead of not transmitting a signal. With this, even when the transmitter cannot express halftone, average luminance of an image in the signal transmission period and an image in the signal non-transmission period can be equal. Moreover, since the luminance can be continuously changed, flicker can be reduced. Moreover, even in the case of a frequency shift keying (FSK) modulation method in which a signal is expressed by changing the frequency, the same advantageous effect can be obtained from this configuration. In the case of the FSK modulation method, by inserting an interval in which a signal is not transmitted at a timing of a frequency shift, an advantageous effect of notifying the timing of a frequency shift to the receiver can be obtained. In this case, the signal non-transmission period T2 may be a length of no less than one cycle of a signal before the shift.

(Phase Modulation)

Figure 27:
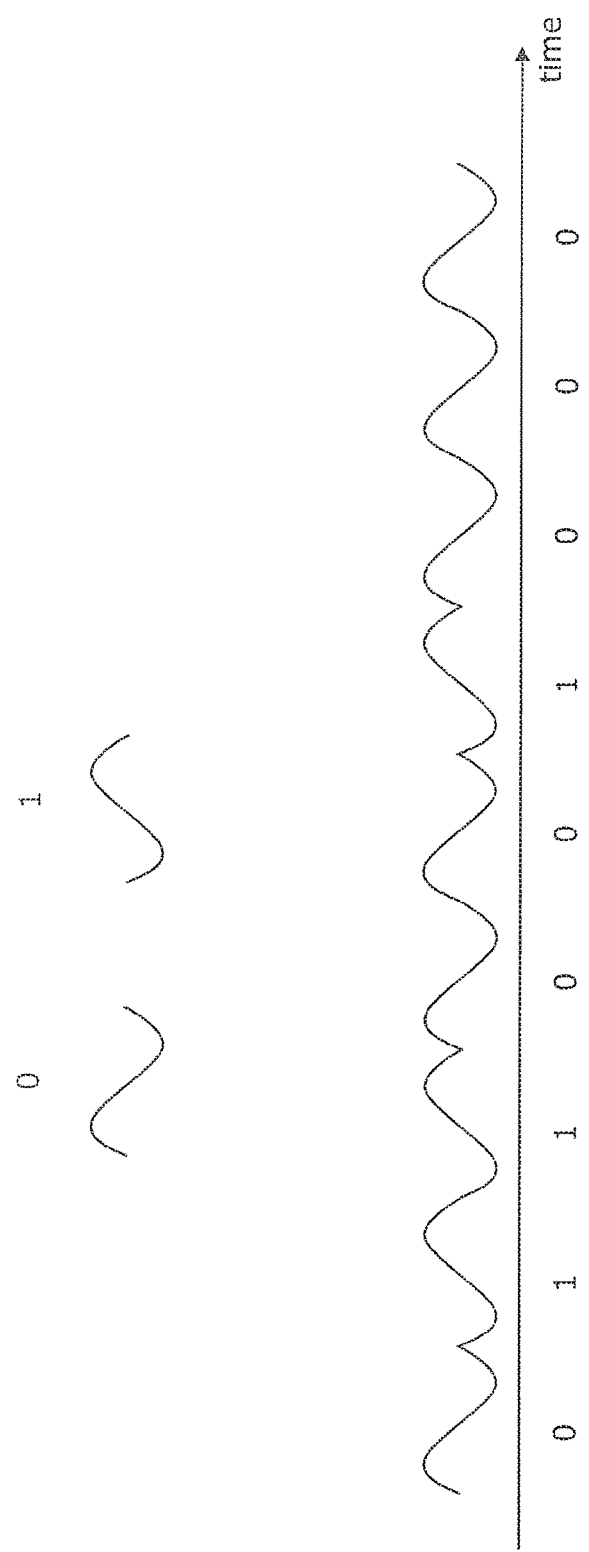
FIG. 27 is a diagram illustrating an example of the signal format in Embodiment 3.

FIG. 27 is a diagram illustrating another example of a signal format in Embodiment 3.

The transmitter expresses a signal by changing the phase according to time. In other words, the transmitter transmits a signal indicating 0 through luminance change according to a waveform of a cycle in a predetermined phase and transmits a signal indicating 1 through luminance change according to a waveform of a cycle in a phase different from the phase by 180 degrees.

(Combined Use of Phase Modulation and Frequency Modulation)

Figure 28:
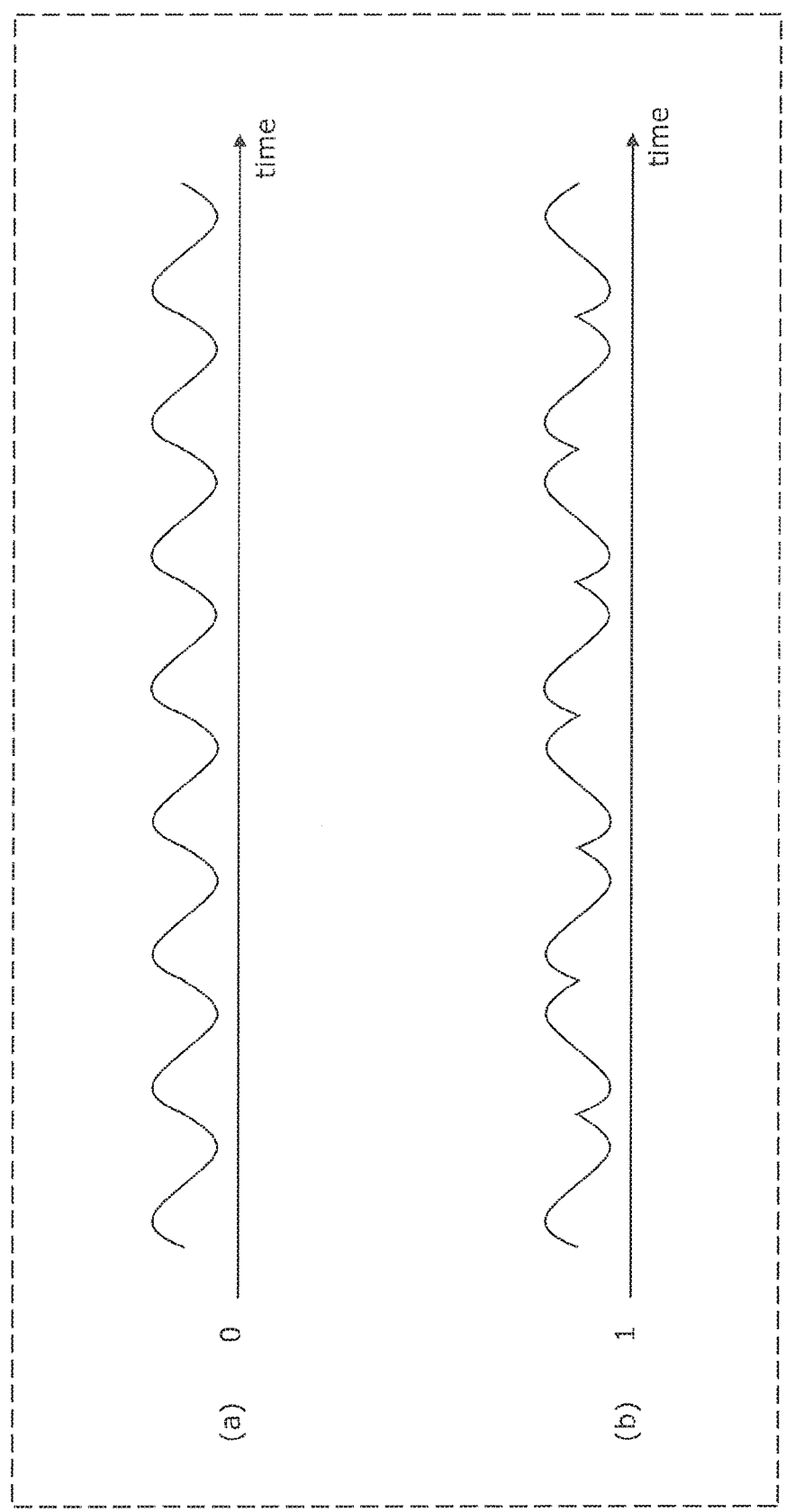
FIG. 28 is a diagram illustrating another example of the signal format in Embodiment 3.

FIG. 28 is a diagram illustrating another example of a signal format in Embodiment 3.

As illustrated in (a) in FIG. 28, the transmitter transmits a signal indicating 0 through luminance change without changing a phase. As illustrated in (b) in FIG. 28, the transmitter transmits a signal indicating 1 through luminance change by changing the phase at every cycle by 180 degrees. By the combined use of the signal format and a frequency modulation illustrated in FIG. 28, this transmitter can transmit a signal having 1 bit more than when only the frequency modulation is used. Moreover, by increasing the number of change patterns of the phase and the number of cycle patterns for changing the phase, the transmitter can transmit a more amount of information.

(Frequency Pattern Used in FSK Modulation Method)

Figure 29:
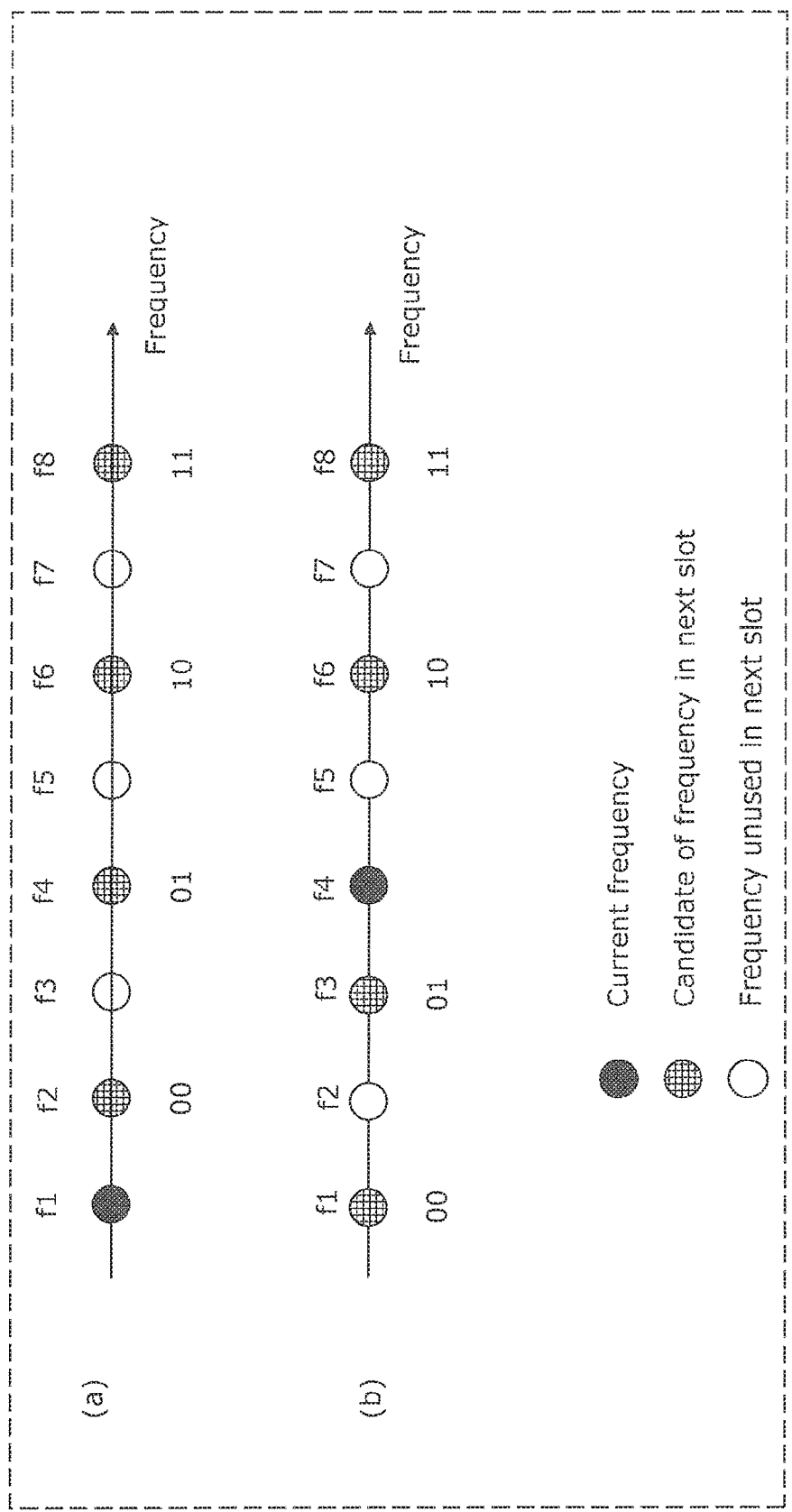
FIG. 29 is a diagram illustrating another example of the signal format in Embodiment 3.

FIG. 29 is a diagram illustrating another example of a signal format in Embodiment 3.

The transmitter transmits a signal according to a FSK modulation method. Specifically, as illustrated in FIG. 29, the transmitter transmits, through luminance change using eight frequencies f1 to f8, a signal identified by each of the frequencies. Here, as illustrated in (a) in FIG. 29, when a signal "00" is transmitted during luminance change at the frequency f1, the transmitter transmits the signal by changing the frequency f1 of the luminance change to the frequency f2. Similarly, when a signal "01" is transmitted during luminance change at the frequency f1, the transmitter transmits the signal by changing the frequency f1 of the luminance change to the frequency f2. Here, as illustrated in (b) in FIG. 29, when a signal "00" is transmitted during luminance change at the frequency f4, the transmitter transmits the signal by changing the frequency f4 of the luminance change to the frequency f1. Similarly, when a signal "01" is transmitted during luminance change at the frequency f4, the transmitter transmits the signal by changing the frequency f4 of the luminance change to the frequency f3.

The four frequencies selected from among the frequencies f1 to f8 according to a frequency of the current luminance change is allocated to "00", "01", "10", and "11", respectively. The current frequency is not included in the selected four frequencies, and among the eight frequencies f1 to 48, the frequencies that are adjacent to each of the selected four frequencies are not used. It should be noted that the luminance change by any of the frequencies f1 to f8 is performed at every slot that is a unit time.

When this receiver does not use the same frequency continuously, the receiver can definitely recognize a shift of slot (timing of frequency shift). Moreover, since the cycle of shift does not have to be strictly determined, it is possible to use an inexpensive clock device. Moreover, the cycle of shift can be indefinite and information can be embedded in the cycle of shift.

Furthermore, by setting the frequencies having a possibility of being used at the next slot not to be adjacent to each other, the number of receiving errors can be reduced.

Moreover, in the FSK modulation method, a start signal indicating the start point of a signal is necessary. By determining, as a start signal, a state in which the luminance is not changed for a constant period of time or a state in which the luminance change is underway at a fast speed unrecognized by the receiver, it is possible to make effective use of a frequency recognizable by the receiver and to extend the expression range of a signal.

(Crossfade of Frequency Shift)

Figure 30:
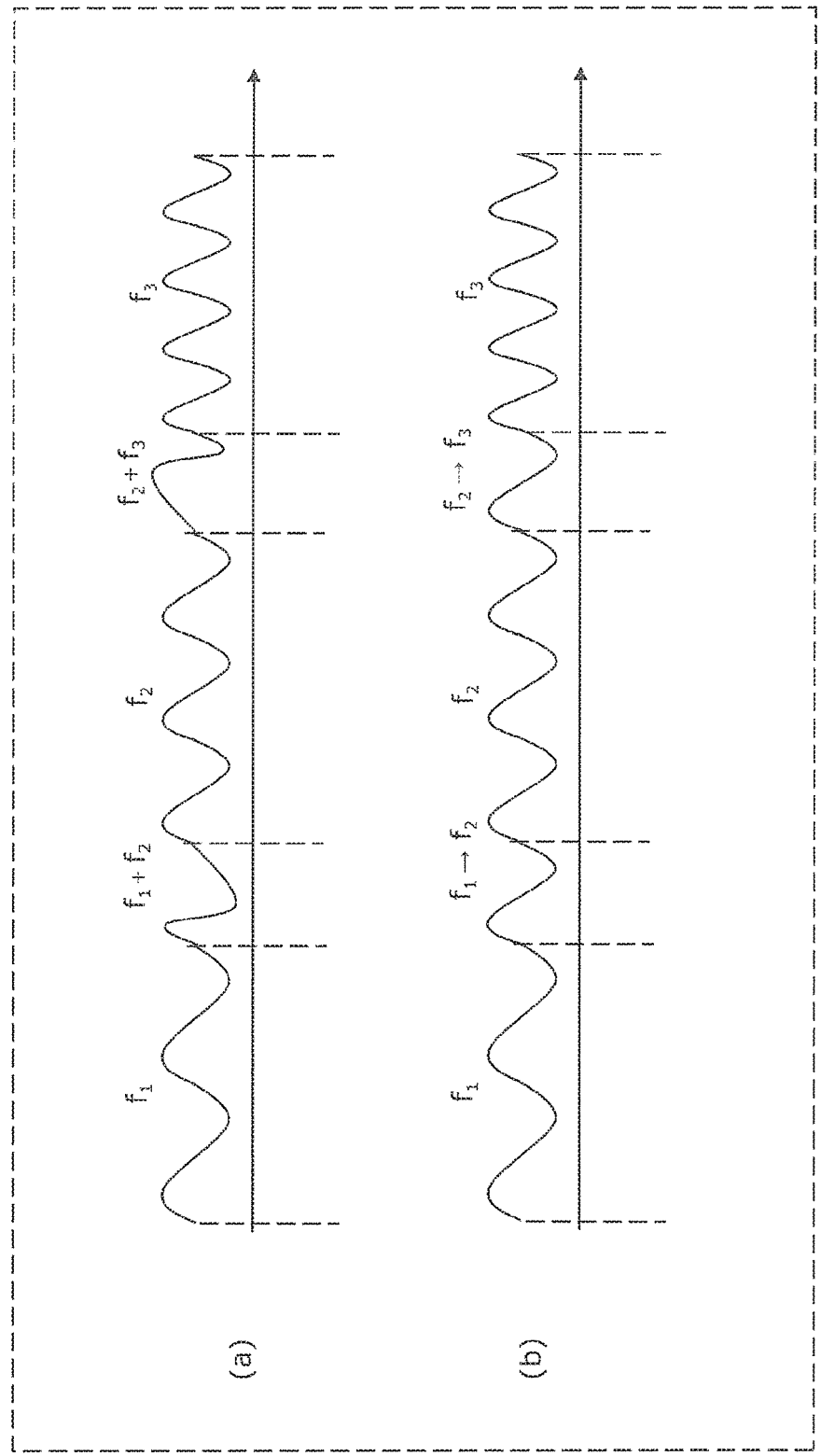
FIG. 30 is a diagram illustrating another example of the signal format in Embodiment 3.

FIG. 30 is a diagram illustrating another example of a signal format in Embodiment 3.

When a frequency of luminance change is rapidly changed, there is flicker when seen with the human eye. In view of this, as illustrated in (a) in FIG. 30, the transmitter performs crossfade of the frequency f1 and the frequency f2 when the frequency f1 of luminance change is changed to the frequency f2. As described above, this flicker can be reduced by shifting during crossfade of the frequency before and after the shift. Moreover, as illustrated in (b) in FIG. 30, the transmitter gradually bring the frequency f1 closer to the frequency f2 when the frequency f1 of luminance change is changed to the frequency f2. As described above, this flicker can be reduced even when the frequency before the shift is gradually brought closer to the frequency after the shift. By inserting a high frequency that cannot be observed by exposure time set in the receiver between the frequencies before and after the shift, flicker can be further reduced.

Embodiment 4

Figure 31:
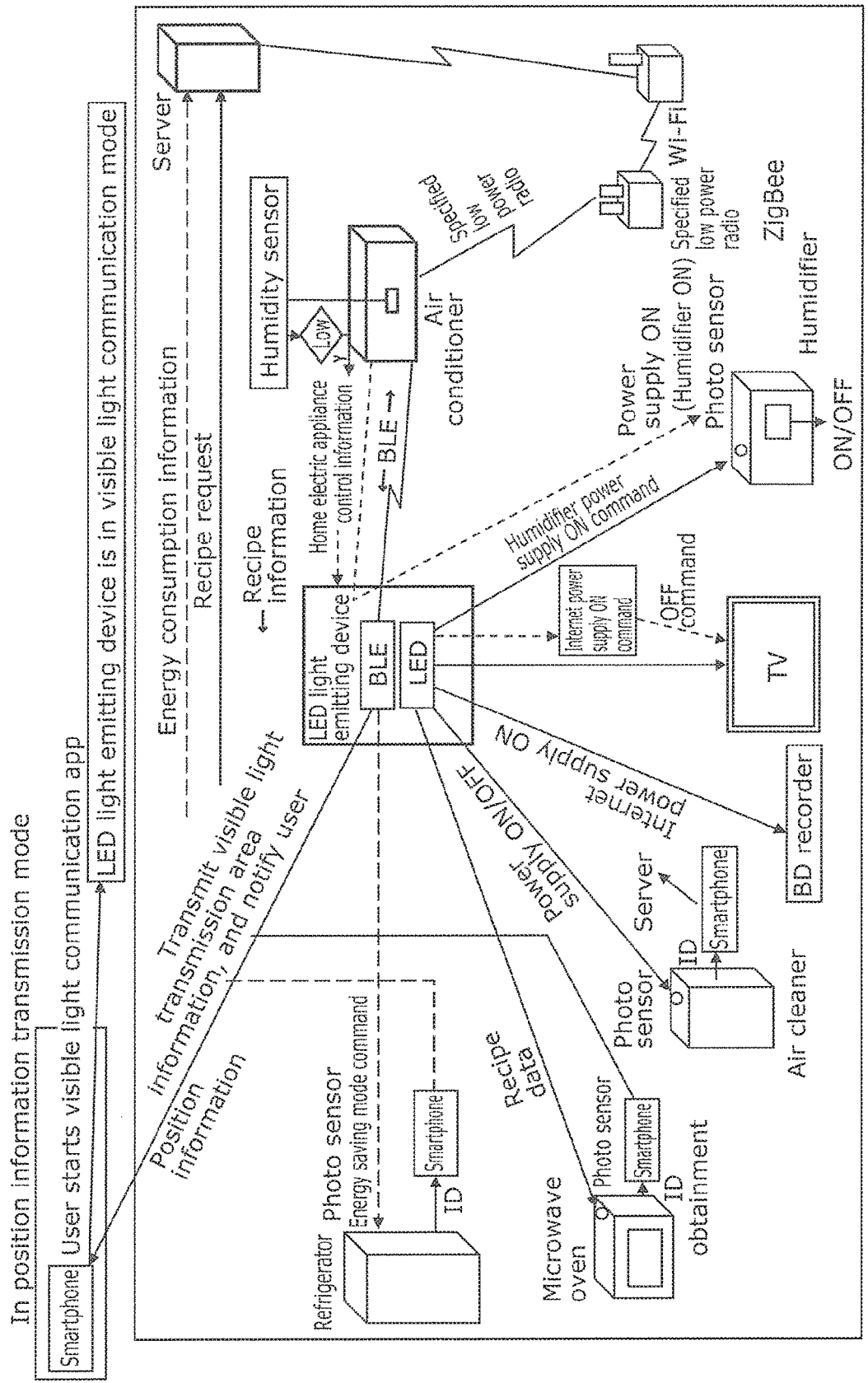
FIG. 31 is a diagram illustrating an example of a signal transmitting and receiving system in Embodiment 4.

FIG. 31 is a diagram illustrating an example of a signal transmitting and receiving system in Embodiment 4.

The signal transmitting and receiving system includes a smartphone that is a multifunctional mobile phone (smapho), an LED light emitting device that is a lighting device, a home electric appliance such as a refrigerator, and a server. The LED light emitting device performs communication using Bluetooth® Low Energy (BTLE) and visible light communication using light emitting diode (LED). For example, the LED light emitting device controls a refrigerator and communicates with an air conditioner using BTLE. Moreover, the LED light emitting device controls the power supply of a microwave oven, an air cleaner, or a television (TV), or the like, using visible light communication.

The TV includes a sunlight power generation element, and uses this sunlight power generation element as an optical sensor. In other words, when the LED light emitting device transmits a signal by luminance change, the TV detects the luminance change of the LED light emitting device with a change of power generated by the sunlight power generation element. Then, the TV obtains the signal transmitted from the LED light emitting device, by demodulating the signal indicated by the detected luminance change. The TV switches its main power supply to ON when the signal indicates a command of turning ON. The TV changes its main power supply to OFF when the signal indicates a command of turning OFF.

Moreover, the server can communicate with the air conditioner via a router and a specified low power radio station (specified low power radio). Furthermore, since the air conditioner can communicate with the LED light emitting device via BTLE, the server can communicate with the LED light emitting device. Therefore, the server can switch the main power source of the TV between ON and OFF via the LED light emitting device. Moreover, the smartphone can control the power supply of TV via the server, by communicating with the server via Wireless Fidelity (Wi-Fi).

(Microcell Method)

Figure 32:
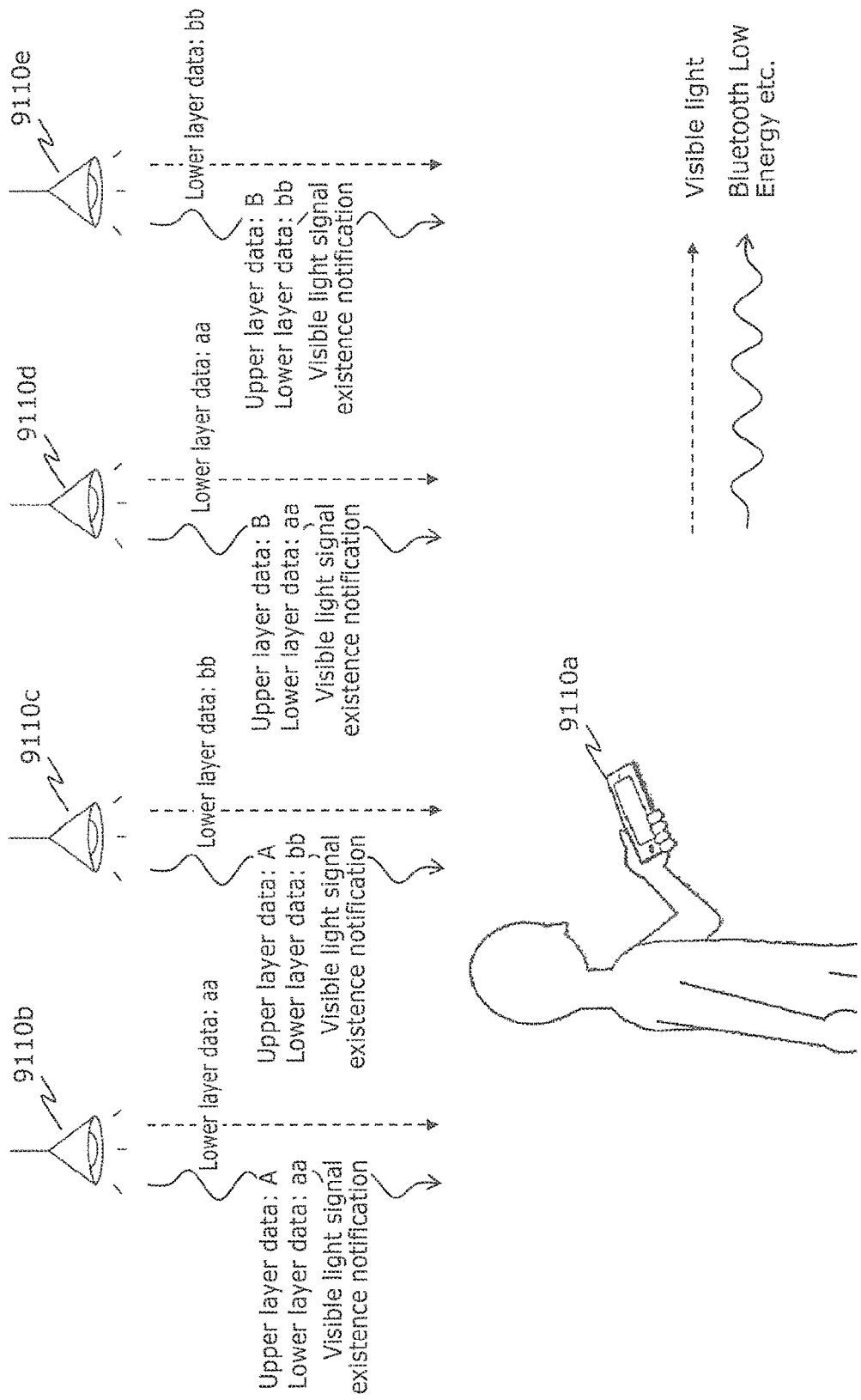
FIG. 32 is a diagram illustrating an example of a signal transmitting and receiving method in Embodiment 4.
Figure 33:
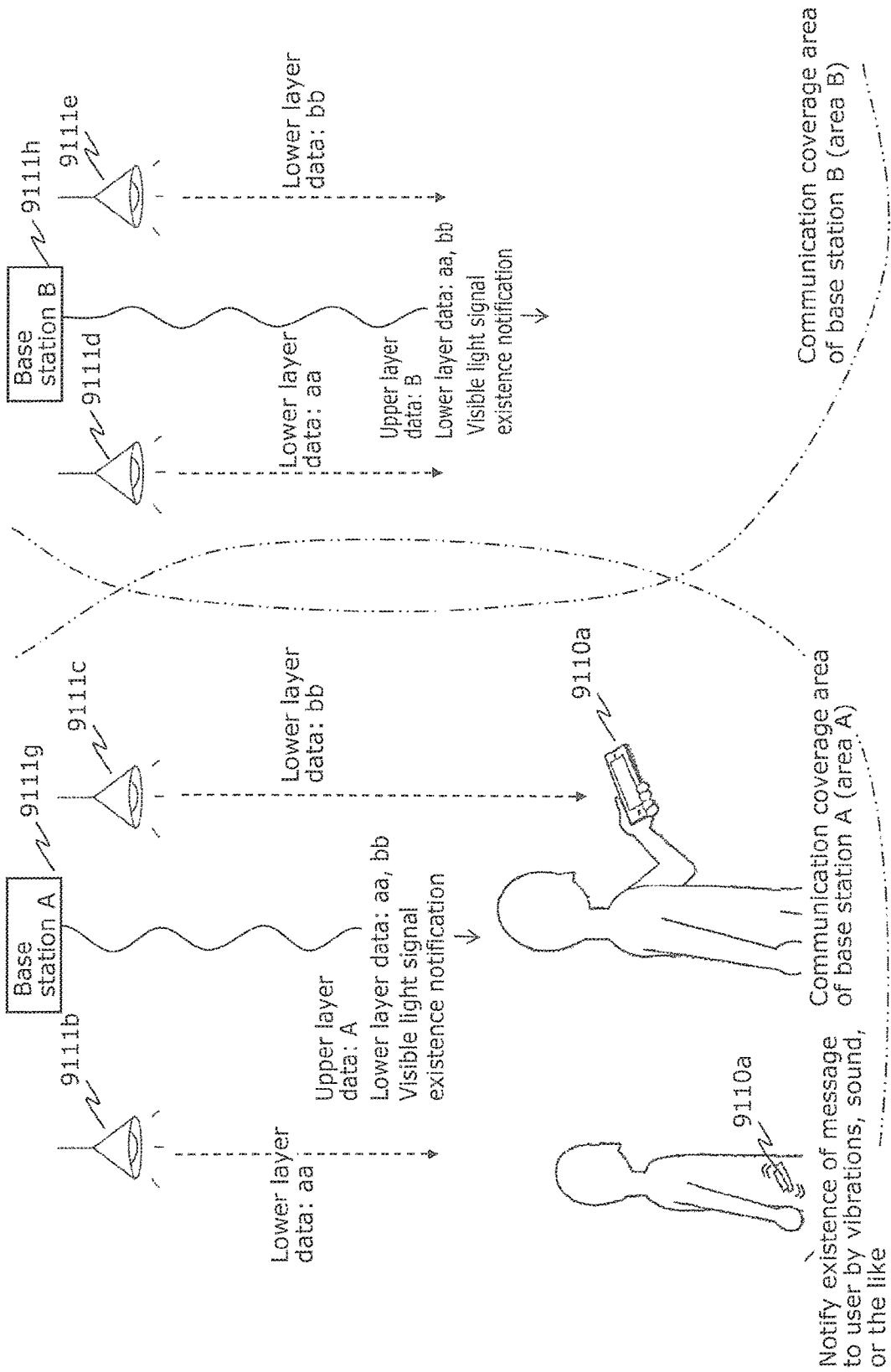
FIG. 33 is a diagram illustrating an example of a signal transmitting and receiving method in Embodiment 4.

FIG. 32 and FIG. 33 are each a diagram illustrating an example of a signal transmitting and receiving method in Embodiment 4.

For example, transmitters 9110*b* to 9110*e* configured as lighting devices transmit a signal (data) using both radio wave and visible light. For example, a protocol such as Wi-Fi, or Bluetooth® (especially, BTLE) is used for radio wave communication. When transmitting data indicating ID "Aaa" of itself, the transmitter 9110*b*, for example, divides the data into upper layer data "A" and lower layer data "a", transmits the upper layer data and the lower layer data by radio wave, and transmits only the lower layer data by visible light. When transmitting data indicating ID of itself, the transmitters 9110*c* to 9110*e* also divide the data into upper layer data "A" and lower layer data "a", transmit the upper layer data and the lower layer data by radio wave, and transmit only the lower layer data by visible light. Moreover, the transmitters 9100b to 9100e may transmit a signal indicating the transmission of data by visible light (visible light existence notification), by radio wave. It should be noted that although the transmitter 9110b includes a visible light transmission unit that transmits the lower layer data by visible light and a radio wave transmission unit that transmits the upper layer data and the lower layer data by radio wave in an integrated manner, the transmitter 9110b does not have to include the radio wave transmission unit as illustrated in FIG. 33. When a transmitter such as the transmitter 9110b includes a radio wave transmission unit, it is possible to stably provide power by supplying power for operating the radio wave transmission unit from a power supply of the lighting device. Therefore, it is possible to transmit data at a high frequency and by intense radio wave, and there is no need to replace a battery. Meanwhile, when a transmitter such as the transmitter 9111b does not include a radio wave transmission unit, it is possible to dispose the radio wave transmission unit at a position convenient for transmitting radio wave (base station A or base station B in FIG. 33, or a corresponding unit). Therefore, it is possible to increase a degree of freedom for the radio wave transmission unit that transmits the lower layer data that is the same as that of the visible light transmission unit.

For example, the receiver 9110a configured as a smartphone receives data transmitted each by radio wave and visible light. Since radio wave has a weaker directionality and wider transmission area than visible light, the receiver 9110a receives data transmitted by radio wave from the transmitters 9110b, 9100c, and 9110d. The data items to be received at this time are "Aaa", "Abb", and "Baa". At this time, the receiver 9110a can determine that the whole data to be processed among the three data items is "Abb" by receiving the lower layer data "bb" using visible light. Moreover, the receiver 9110a, when receiving the first "b" that is a part of the lower layer data "bb", can determine that the whole data to be processed is "Abb" and can perform the subsequent process using the data at an early time. Moreover, the receiver 9110a, by receiving information from the server by using these data items as a key when receiving the data items "Aaa", "Abb", and "Baa" using radio wave, can quickly perform the process such as display when the received data is determined.

With this configuration, the data amount transmitted or received using visible light can be reduced. With this, the transmitter 9110a can receive data at a speed faster than that of receiving the whole data using visible light. Moreover, since the data amount to be transmitted and received by visible light is reduced, it is possible to use a modulation method that can only transmit a small amount of data and a modulation method that can receive data from a distance.

It should be noted that the configuration illustrated in FIG. 33 can obtain the same advantageous effect. In an example illustrated in FIG. 33, for example, the transmitters 9110b to 9110e configured as lighting devices transmit a signal (data) using only visible light among radio wave and visible light. A transmitter 9111g that is the base station A transmits, by radio wave, the upper lower data "A" and the lower layer data items "aa" and "bb". A transmitter 9111h that is the base station B has the same configuration as that of the transmitter 9111g, and transmits, by radio wave, the upper lower data "B" and the lower layer data items "aa" and "bb". Moreover, the transmitters 9111g and 9111h may transmit a signal indicating the transmission of data by visible light (visible light existence notification) by radio wave. In the case of the configuration as illustrated in FIG. 33, it is possible to set a communication coverage area having a different upper layer data item according to each of the base station A and the base station B.

Figure 34:
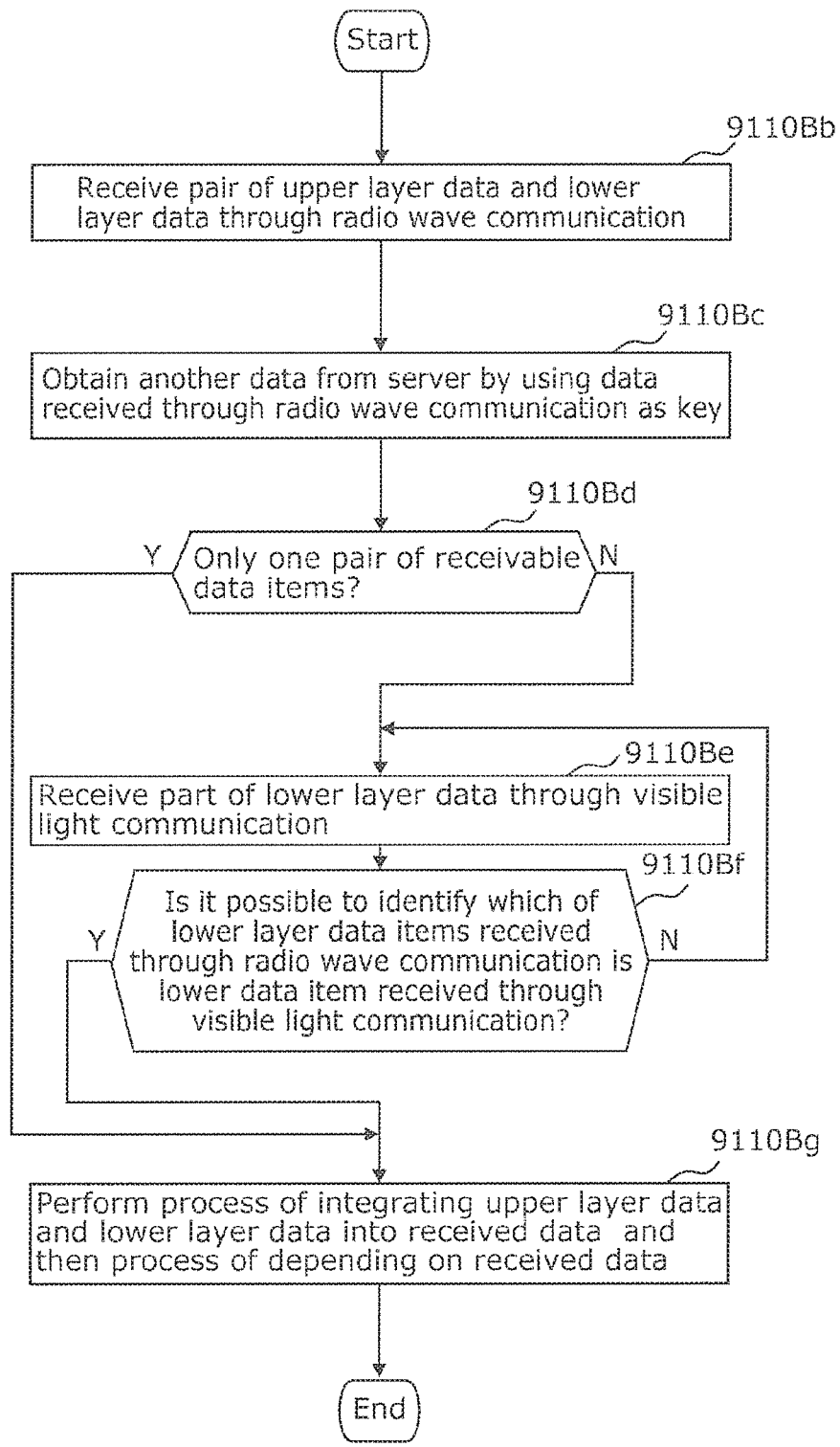
FIG. 34 is a flowchart illustrating an example of an operation of a receiver in Embodiment 4.

FIG. 34 is a flowchart illustrating an example of an operation of the receiver 9110a.

As illustrated in FIG. 34, the receiver 9110a receives one or more pairs of the upper layer data and the lower layer data in Step 9110Bb through radio wave communication. In Step 9110Bc, the receiver 9110a obtains another data from the server by using the data (one or more pairs) received through radio wave communication as a key. In Step 9110Bd, the receiver 9110a checks whether or not only one pair of data items is received in Step 9110Bb. Here, when only one pair (Y in Step 9110Bb), the receiver 9110a in Step 9110Bg generates received data by combining the one pair of the upper layer data and the lower layer data, and then performs a process of depending on the received data. Meanwhile, when not the one pair (N in Step 9110Bd), the receiver 9110a in Step 9110Be receives part of the lower layer data through visible light communication. Next, the receiver 9110a, in Step 9110Bf, checks whether or not it is possible to identify which of each of the pairs of lower layer data items received through radio wave communication is (part of) the lower layer data received through visible light communication. Here, when it can be identified (Y in Step 9110Bf), the receiver 9110a in Step 9110Bg generates the received data by combining the upper layer data belonging to the same pair of the identified lower layer data, and then performs a process of depending on the received data. Meanwhile, when it cannot be identified (N in Step 9110Bf), the receiver 9110a repeats the process from Step 9110Be.

Figure 35:
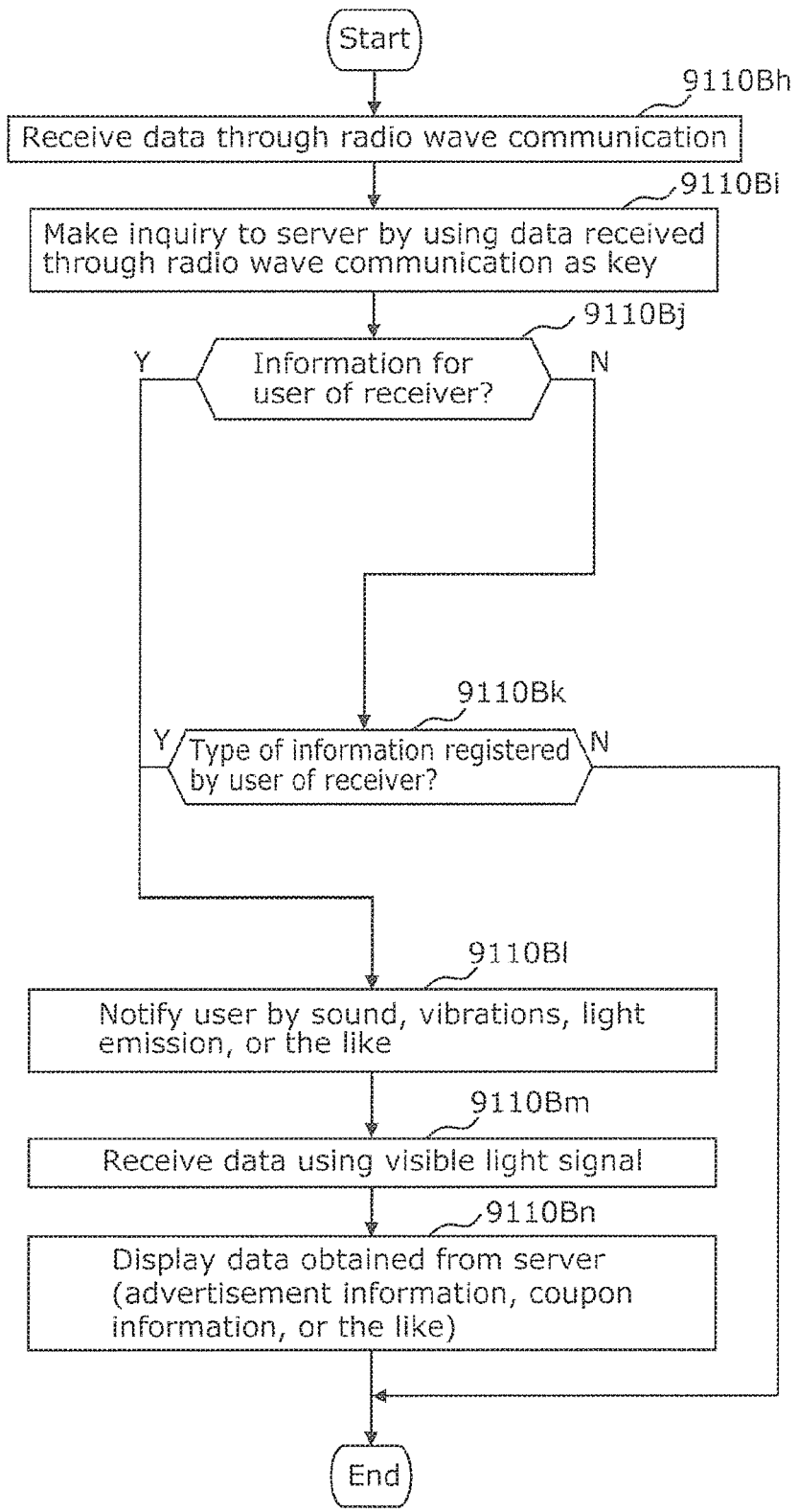
FIG. 35 is a flowchart illustrating another example of an operation of the receiver in Embodiment 4.

FIG. 35 is a flowchart illustrating another example of an operation of the receiver 9110a.

The receiver 9110a receives data through radio wave communication such as Bluetooth Low Energy in Step 9110Bh. Next, the receiver 9110a in Step 9110Bi obtains, by making an inquiry to the server by using the received data as a key, information associated with the key. Then, the receiver 9110a in Step 9110Bj and Step 9110Bk determines whether or not (i) the obtained information belongs to information for the user of the receiver 9110a (first information) or information that is a type registered by the user of the receiver 9110a (second information), or (ii) the obtained information does not belong to any of the two. Here, when the receiver 9110a determines that the obtained information does not belong to any of the first information and the second information (N in Step 9110Bj and N in Step 9110Bk), the process ends without displaying the obtained information. Meanwhile, when the receiver 9110a determines that the obtained information belongs to the first information or the second information (Y in one of Step 9110Bj and Step 9110Bk), the receiver 9110a notifies the user that it has received the information, by sound, light, or vibrations, and then is placed in a visible light receiving mode in Step 9110Bl. The receiver 9110a that is placed in this visible light receiving mode receives data through visible light communication in Step 9110Bm. Furthermore, at this time, in Step 9110Bn, the receiver 9110a displays information about the obtained advertisement or coupon from the server.

(Different Use Depending on Position Recognition Accuracy)

Figure 36:
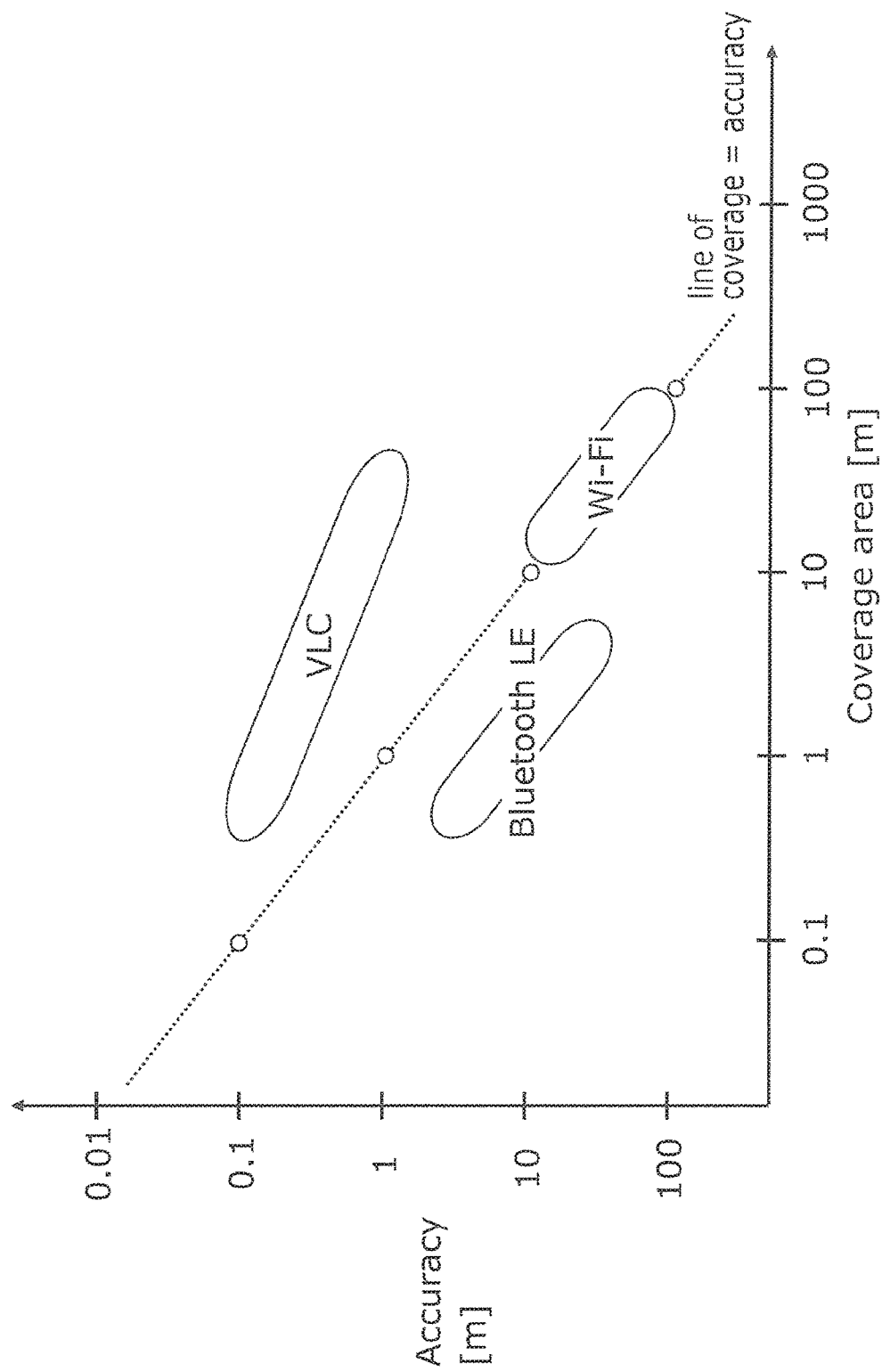
FIG. 36 is a diagram illustrating a relationship between a communication coverage distance and self-position estimation accuracy in each communication method.

FIG. 36 is a diagram illustrating a relationship between a communication coverage distance and self-position estimation accuracy in each communication method.

The communication method includes a visible light communication system in the present invention (VLC), Bluetooth (Bluetooth Low Energy), and Wi-Fi. A horizontal axis in a graph illustrated in FIG. 36 indicates a communication coverage distance (coverage area) that is a distance between the receiver and the transmitter that are communicable by adjusting the size of the light emitting unit and radio wave intensity. Then, a vertical axis in the graph indicates self-position estimation accuracy that is an accuracy of estimating self-position by the receiver according to the communication method. As illustrated in FIG. 36, VLC is longer in communication coverage distance and higher in self-position estimation accuracy than other communication methods.

Figure 37:
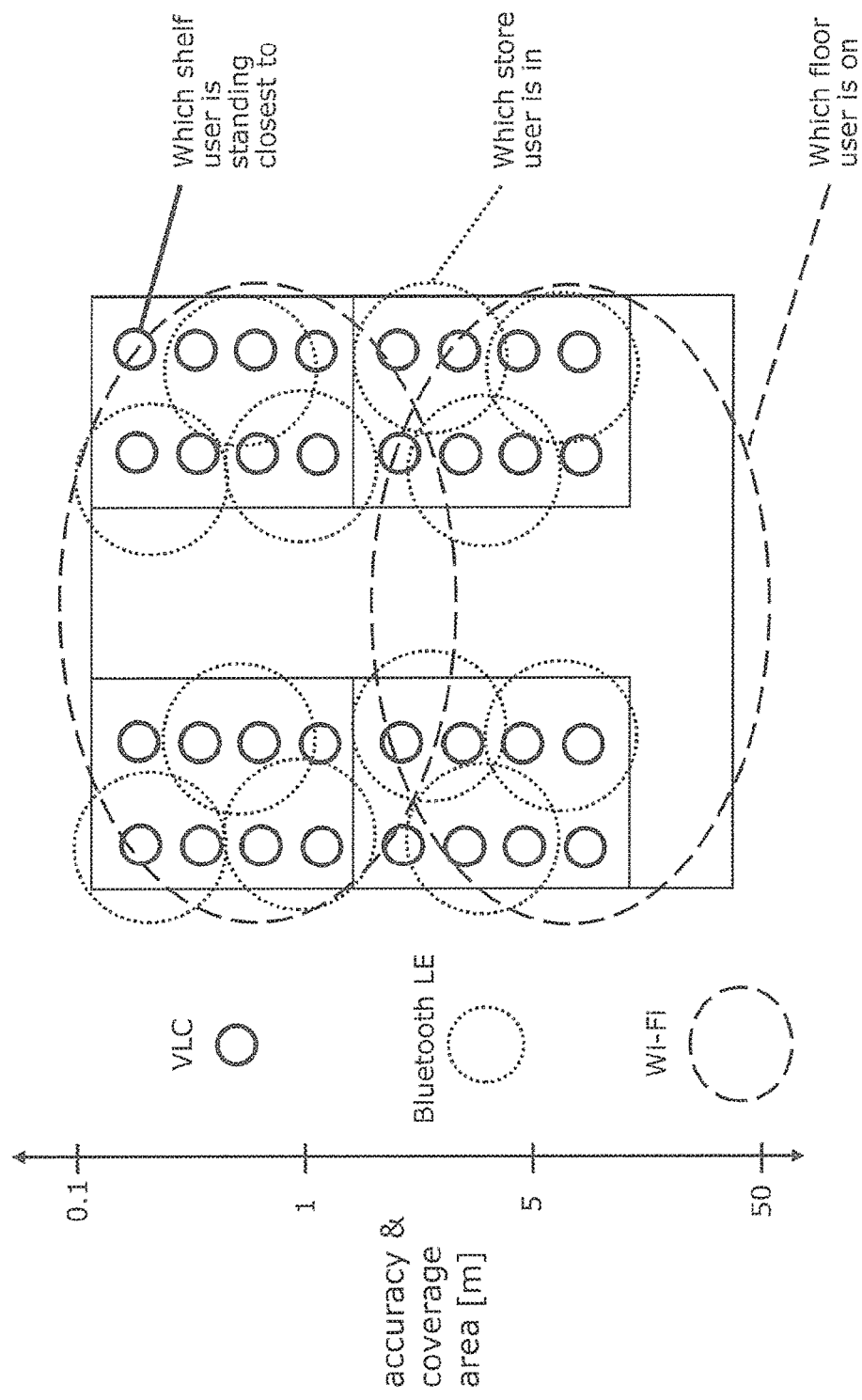
FIG. 37 is a diagram illustrating an example of a position estimation service using three communication methods in Embodiment 4.

FIG. 37 is a diagram illustrating an example of a position estimation service using three communication methods.

Using the Wi-Fi method having low position estimation accuracy, the receiver estimates which position in the building the user is at and which floor in the building the user is on.

Using Bluetooth (Bluetooth Low Energy) having medium level position estimation accuracy, the receiver estimates which store the user is in. At this time, by using in combination with the self-position estimation by Wi-Fi, the receiver can narrow down a communication coverage area of Bluetooth. In other words, when ID that is a signal to be transmitted by Bluetooth is unique to a communication area of Wi-Fi including a communication area of the Bluetooth, it is possible to identify the communication area of the Bluetooth corresponding to the ID. Therefore, the ID management can be simplified. Moreover, the number of necessary ID digits is reduced, and cost required for communication (time and power consumption) is reduced. Moreover, when the user receives, by Wi-Fi, the information that there is no Bluetooth signal nearby for position estimation, power consumption can be reduced by not searching the Bluetooth signal.

Using VLC having high position estimation accuracy, the receiver estimates which shelf the user is standing closest to. At this time, by using in combination with the self-position estimation by Wi-Fi or Bluetooth, the receiver can obtain the advantageous effect that is the same as the aforementioned effect.

It should be noted that although the three communication methods of Wi-Fi, Bluetooth, and VLC are used in the present embodiment, it is possible to use only any two of the three methods. It should be noted that instead of Wi-Fi or Bluetooth, the same advantageous effect can be obtained from another self-position estimation method such as Indoor Messaging System (IMES), sound wave, or ZigBee.

(Rewriting of Transmission Signal)

Figure 38:
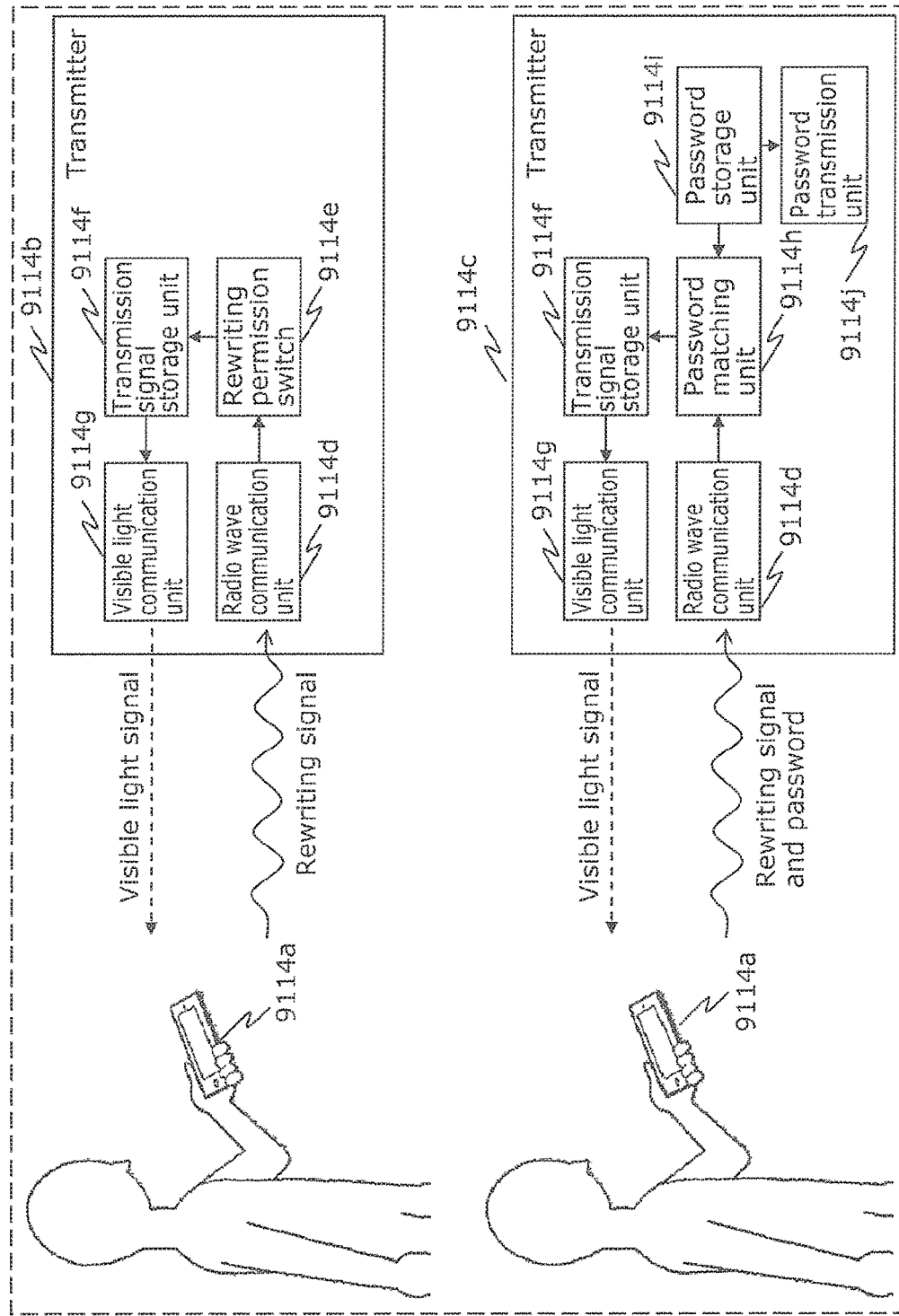
FIG. 38 is a diagram illustrating another example of the signal transmitting and receiving method in Embodiment 4.

FIG. 38 is a diagram describing an example of a signal transmitting and receiving method in Embodiment 4.

For example, an operation terminal 9114*a* configured as the smartphone transmits, to a transmitter 9114*b*, a rewriting signal indicating a command of rewriting a visible light signal through radio wave communication such as Bluetooth Low Energy. The transmitter 9114*b* is, for example, an LED light emitting device illustrated in FIG. 31, and includes a radio wave communication unit 9114*d* that receives the rewriting signal, a rewriting permission switch 9114*e*, a transmission signal storage unit 9114*f* that stores a visible light signal, a visible light communication unit 9114*g* that transmits the visible light signal, to a device such as the microwave oven in FIG. 31, through visible light communication. The rewriting permission switch 9114*e* holds setting information indicating whether or not the rewriting of the visible light signal stored in the transmission signal storage unit 9114*f* is permitted. Then, the rewriting permission switch 9114*e* rewrites, on reception of a rewriting signal via the radio communication unit 9114*d*, when indicating that the setting information held in itself is permission, the visible light signal stored in the transmission signal storage unit 9114*f* according to the rewriting signal. Meanwhile, the rewriting permission switch 9114*e*, when the setting information indicates no permission, does not rewrite the visible light signal according to the rewriting signal. With this, the operation terminal 9114*a* can perform remote control for a device such as a microwave oven via the LED light emitting device that is the transmitter 9114*b*, based on a visible light signal. Moreover, the operation terminal 9114*a* can perform various types of operations for the device by rewriting the visible light signal. Moreover, the visible light signal is stored in the transmitter 9114*b*, the rewriting requires a permission by the transmitter 9114*b*. Therefore, it is possible to prevent the operation terminal 9114*a* from operating the device improperly.

Moreover, the operation terminal 9114*a* may transmit the aforementioned rewriting signal and a password to the transmitter 9114*c* through radio wave communication such as Bluetooth Low Energy. In this case, the transmitter 9114*c* is an LED light emitting device illustrated in FIG. 31, for example, and includes the aforementioned radio wave communication unit 9114*d*, the transmission signal storage unit 9114*f*, the visible light communication unit 9114*g*, a password matching unit 9114*h*, a password storage unit 9114*i*, and a password transmission unit 9114*j*. The password storage unit 9114*i* stores a password. The password matching unit 9114*h* determines, when obtaining a password along with the rewriting signal via the radio wave communication unit 9114*d*, whether or not the password is the same as the password stored in the password storage unit 9114*i*. When it is determined that the passwords are the same, the password matching unit 9114*h* rewrites a visible light signal stored in the transmission signal storage unit 9114*f* according to the obtained rewriting signal. Meanwhile, when it is determined that the passwords are not the same, the password matching unit 9114*h* does not rewrite a visible light signal according to the obtained rewriting signal. The password transmission unit 9114*j* transmits, through near field communication, for example, the password stored in the password storage unit 9114*i* to the operation terminal 9114*a*.

When the transmitter 9114*c* is used, it is possible to prevent control of the device by the improper operation terminal 9114*a*, and the advantageous effect the same as that when using the aforementioned transmitter 9114*b* can be obtained.

It should be noted that the transmitter 9114*c* may store ID of the operation terminal 9114*a*, and correspond to only a rewriting signal from the operation terminal to be identified by the ID. Moreover, the server may store the aforementioned setting information. In this case, the operation terminal 9114*a* transmits the rewriting signal to the server. The server determines, upon reception of the rewriting signal, whether or not to transmit the rewriting signal to the transmitter according to the stored setting information. The transmitter performs, upon reception of the rewriting signal from the server, rewriting of a visible light signal according to the rewriting signal.

(Selection of Modulation Method According to Presence of Absence of Position Estimation Information)

Figure 39:
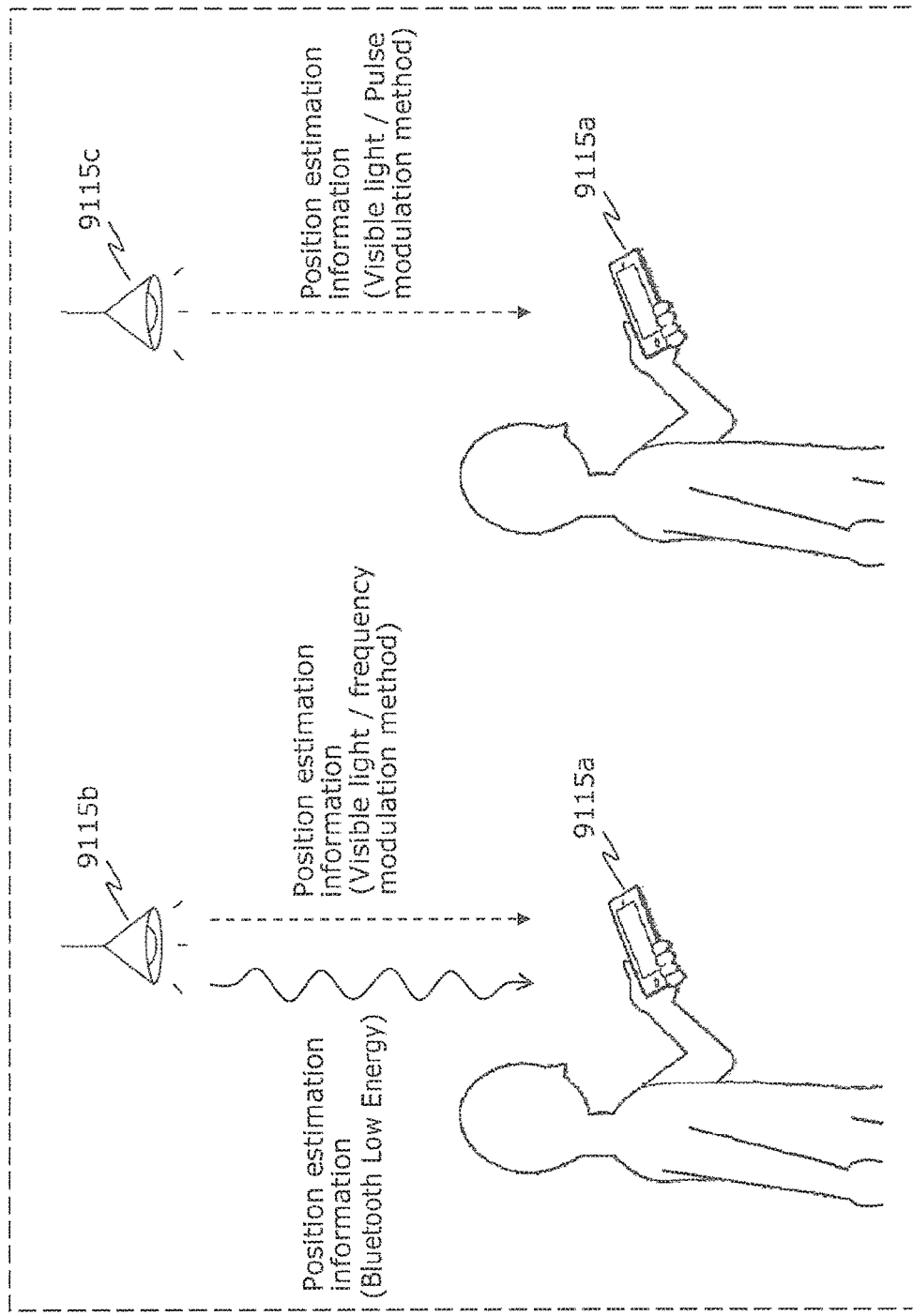
FIG. 39 is a diagram illustrating another example of the signal transmitting and receiving method in Embodiment 4.

FIG. 39 is a diagram describing another example of a signal transmitting and receiving method in Embodiment 4.

A transmitter 9115b configured as the lighting device, as similarly to the transmitters 9110b to 9110e illustrated in FIG. 32, transmits position estimation information including the upper layer data and the lower layer data to the receiver 9115a through BTLE or the like, and transmits position estimation information including only the lower layer data to the receiver 9115a through visible light communication of a frequency modulation method. Moreover, the transmitter 9115c, configured as the lighting device, transmits position estimation information including the upper layer data and the lower layer data to the receiver 9115a through visible light communication of a pulse modulation method (for example, 4 PPM method). It should be noted that the amount of data that can be transmitted per unit time is larger in visible light communication of a pulse modulation method than in visible light communication of a frequency modulation method. Therefore, the transmitter 9115b of a frequency modulation method transmits position estimation information including only the lower layer data through visible light communication, and the transmitter 9115c of a pulse modulation method transmits position estimation information including the upper layer data and the lower layer data through visible light communication.

The transmitter 9115a switches the visible light communication method between a frequency modulation method and a pulse modulation method according to whether or not the receiver 9115a receives position estimation information through BTLE, for example.

Figure 40:
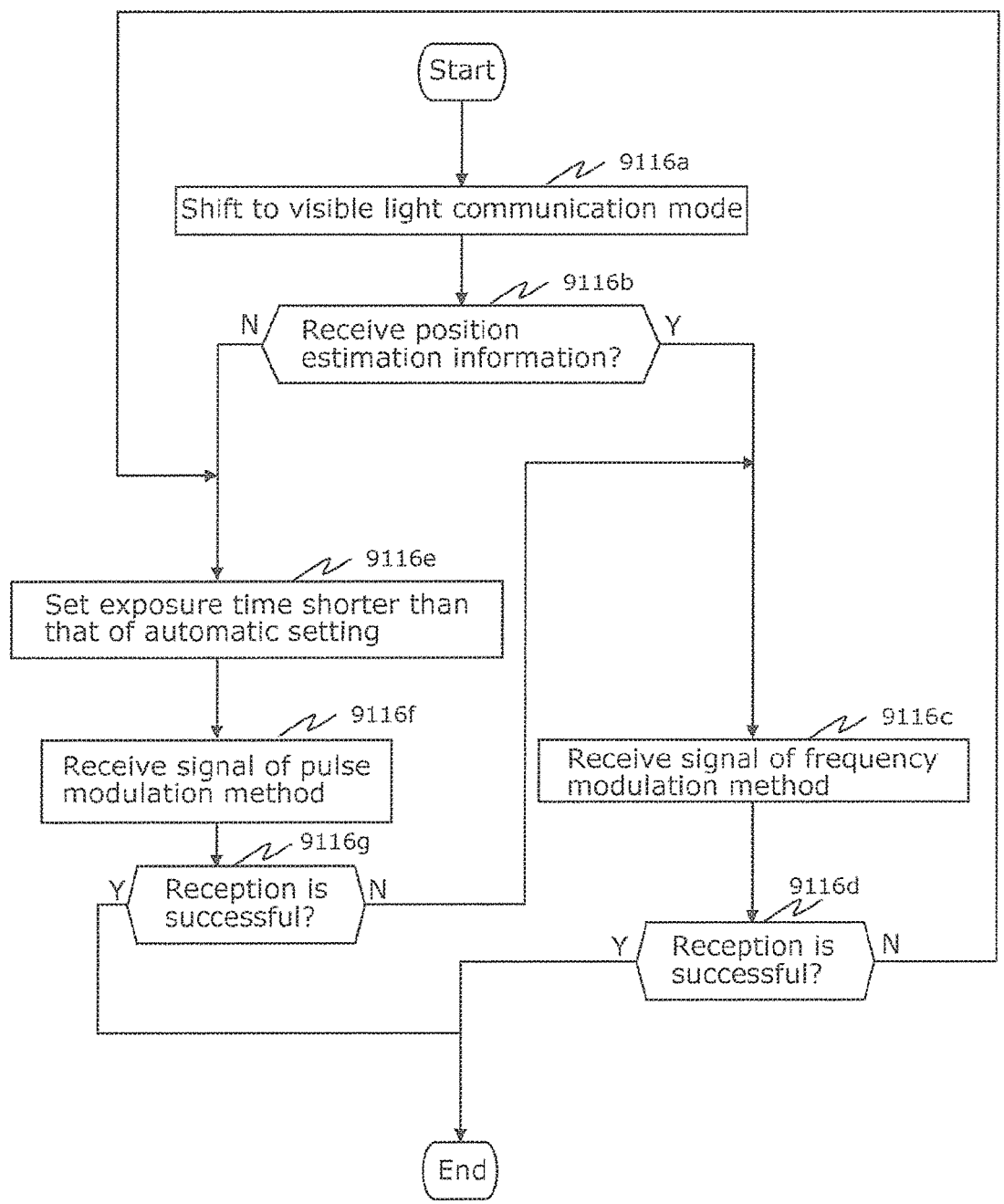
FIG. 40 is a flowchart illustrating an example of the operation of the receiver in Embodiment 4.

FIG. 40 is a flowchart illustrating an example of an operation of the receiver 9115a.

First, the receiver 9115a shifts to a visible light communication mode in Step 9116a. Next, in Step 9116b, the receiver 9115a determines whether or not the receiver 9115a receives position estimation information through communication of Bluetooth (Low Energy), Wi-Fi, or IMES. Here, when it is determined that position estimation information is received (Y in Step 9116b), in Step 9116c, the receiver 9115a receives a visible light signal transmitted from the transmitter according to a frequency modulation method (frequency ID modulation method or FSK modulation method, for example). Then, the transmitter 9115a, in Step 9116d, determines whether or not the reception is successful. When the reception is successful (Y in Step 9116d), the receiving process ends.

Meanwhile, when it is determined that position estimation information is not received (N in Step 9116b) or it is determined that the reception is not successful (N in Step 9116d), the receiver 9115a sets an exposure time in Step 9116e. In other words, the receiver 9115a sets an exposure time set itself to be shorter than the exposure time set by automatic setting. Next, in Step 9116f, the receiver 9115a receives the visible light signal transmitted from the transmitter according to a pulse modulation method (pulse position modulation method or pulse density modulation method, for example). Then, the transmitter 9115a, in Step 9116g, determines whether or not the reception is successful. When the reception is successful (Y in Step 9116g), the receiving process ends. Meanwhile, when it is determined that the reception is not successful (N in Step 9116g), the receiver 9115a performs the process of Step 9116c. It should be noted that in the aforementioned example, when the pulse modulation method is used, an exposure time is set to be short. When the frequency modulation method is used, an exposure time may be set to be short.

With this signal transmitting and receiving method, it is possible to automatically switch between the communication method used in combination with Bluetooth Low Energy or the like and the communication method used without in combination with Bluetooth Low Energy or the like.

Embodiment 5

The following will describe an imaging method according to Embodiment 5. The receiver in each of the aforementioned embodiments may, by imaging the transmitter according to an imaging method in Embodiment 5, receive a signal transmitted from the transmitter (visible light signal). In this case, the receiver includes, as a light receiving unit or an imaging unit, an image sensor including a plurality of exposure lines (imaging element).

(Observation of Luminance of Light Emitting Unit)

Figure 41:
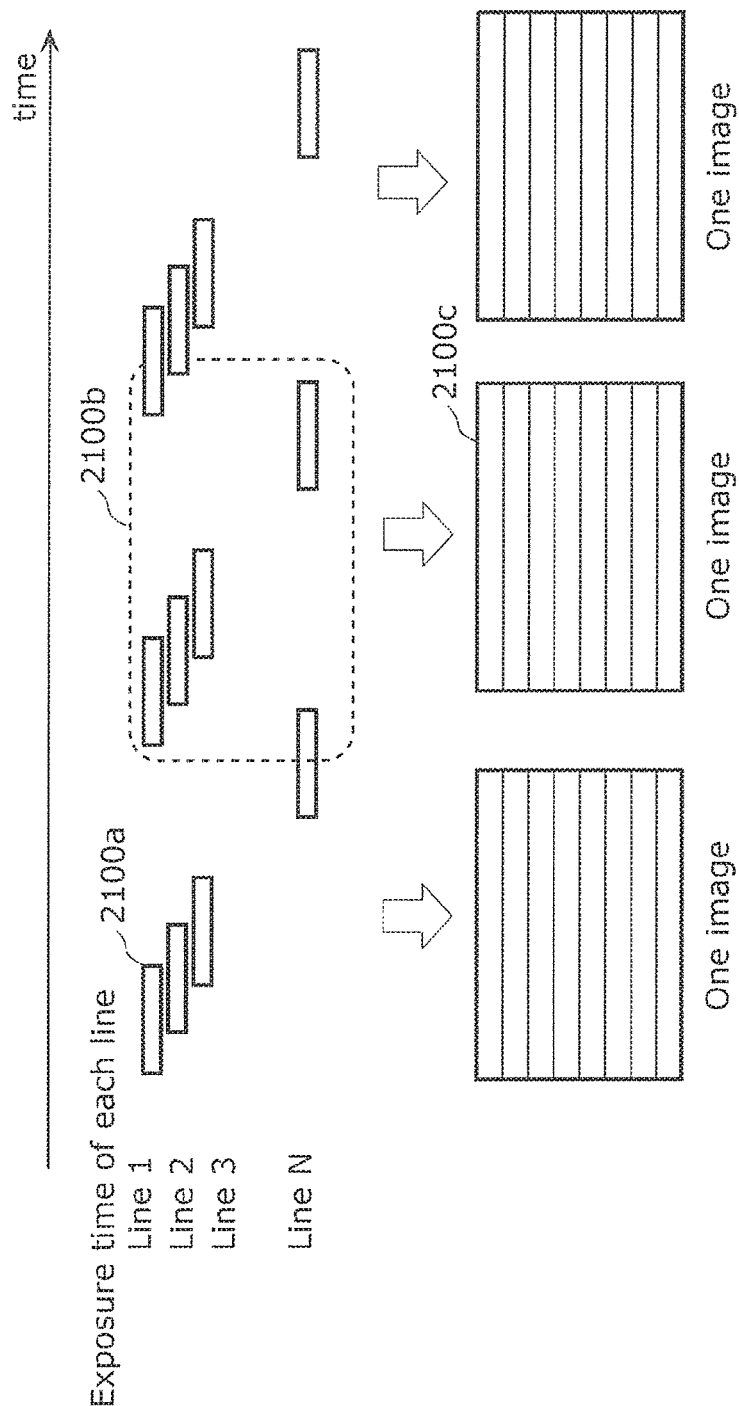
FIG. 41 illustrates an example of an observation method of luminance of a light emitting unit in Embodiment 5.

The following proposes an imaging method in which, when imaging one image, all imaging elements are not exposed simultaneously but the times of starting and ending the exposure differ between the imaging elements. FIG. 41 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

Figure 42:
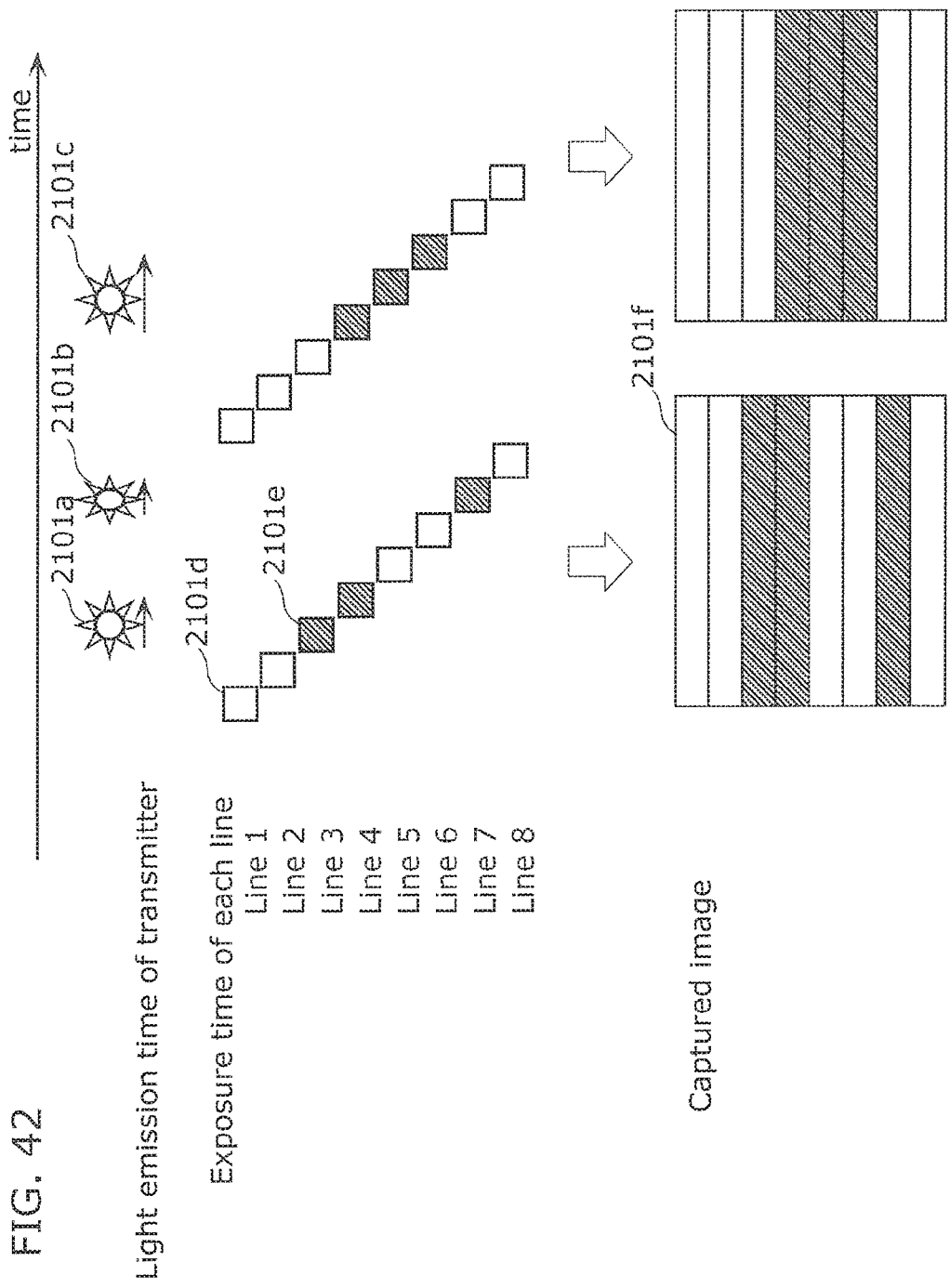
FIG. 42 illustrates an example of an observation method of luminance of a light emitting unit in Embodiment 5.

In the case of imaging a blinking light source shown on the entire imaging elements using this imaging method, bright lines (lines of brightness in pixel value) along exposure lines appear in the captured image as illustrated in FIG. 42. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1.67 milliseconds. In the case where the number of exposure lines whose exposure times do not overlap each other is 1000, it is possible to recognize a luminance change in a period of $\frac{1}{30000}$ second (about 33 microseconds). Note that the exposure time is set to less than 10 milliseconds, for example.

FIG. 42 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and l is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 43:
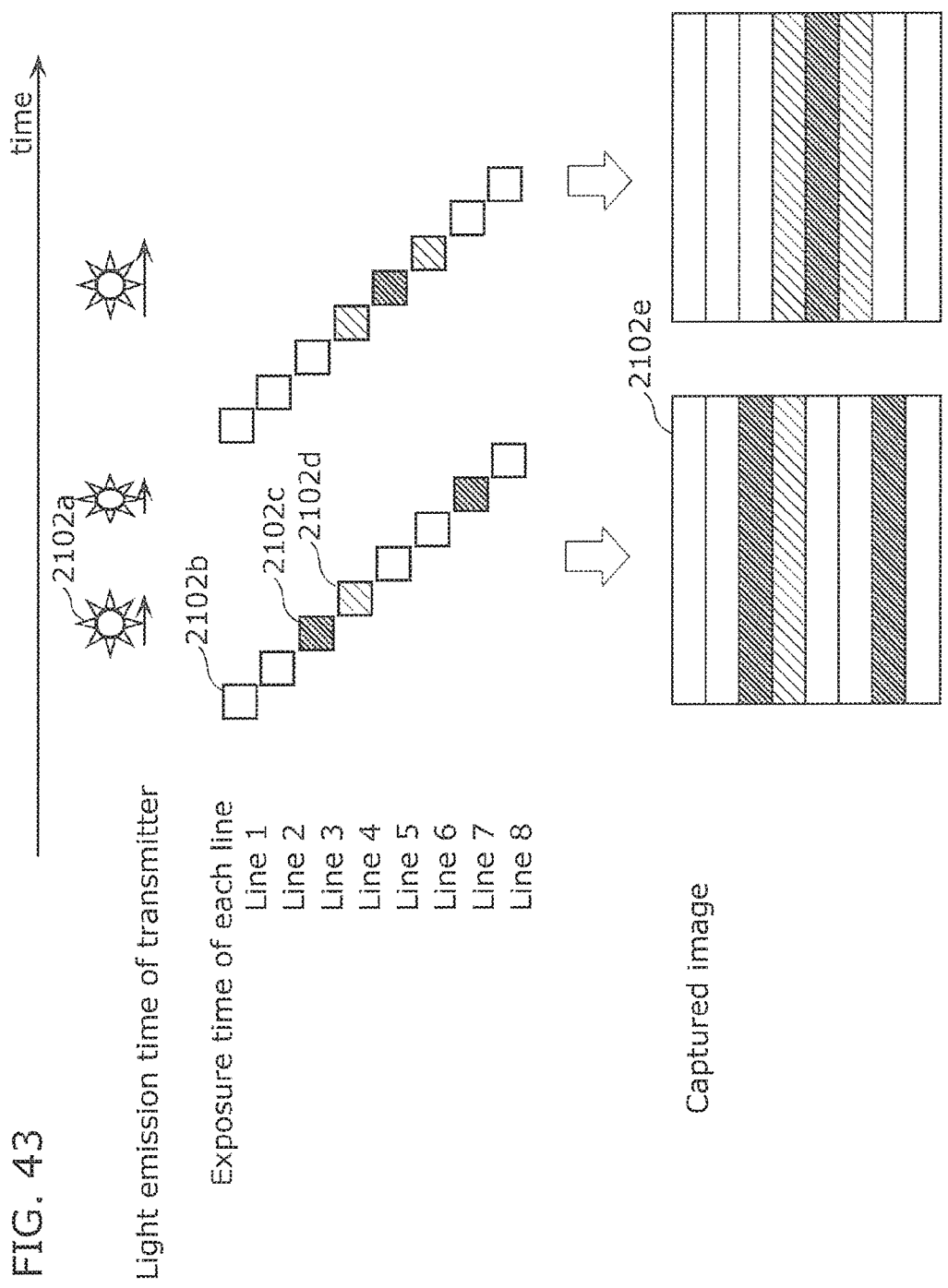
FIG. 43 illustrates an example of an observation method of luminance of a light emitting unit in Embodiment 5.

If the exposure state of each exposure line caused by the light emission of the light emitting unit is recognizable in a plurality of levels as illustrated in FIG. 43, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 44A:
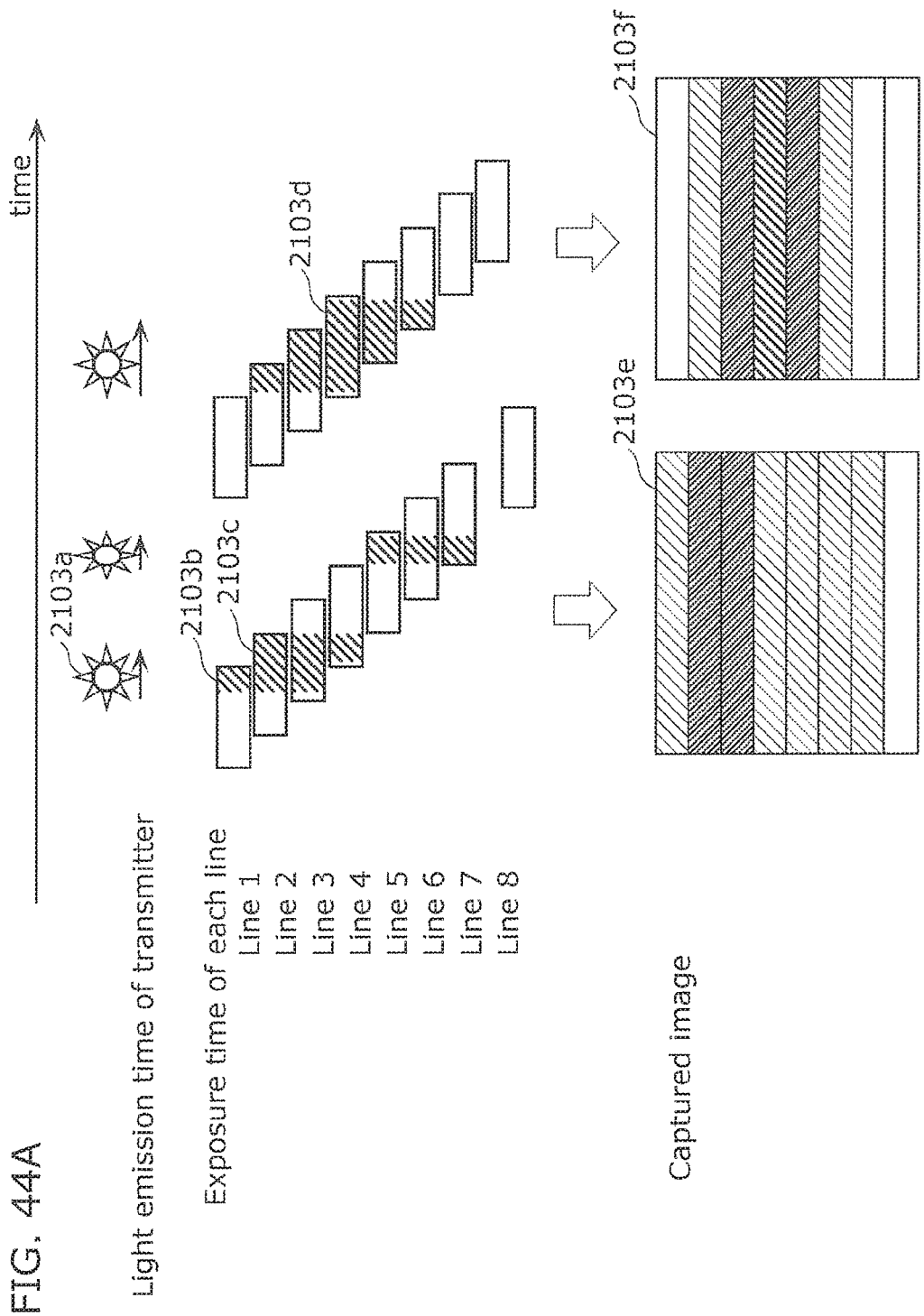
FIG. 44A illustrates an example of an observation method of luminance of a light emitting unit in Embodiment 5.

FIG. 44A illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e. the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 44B:
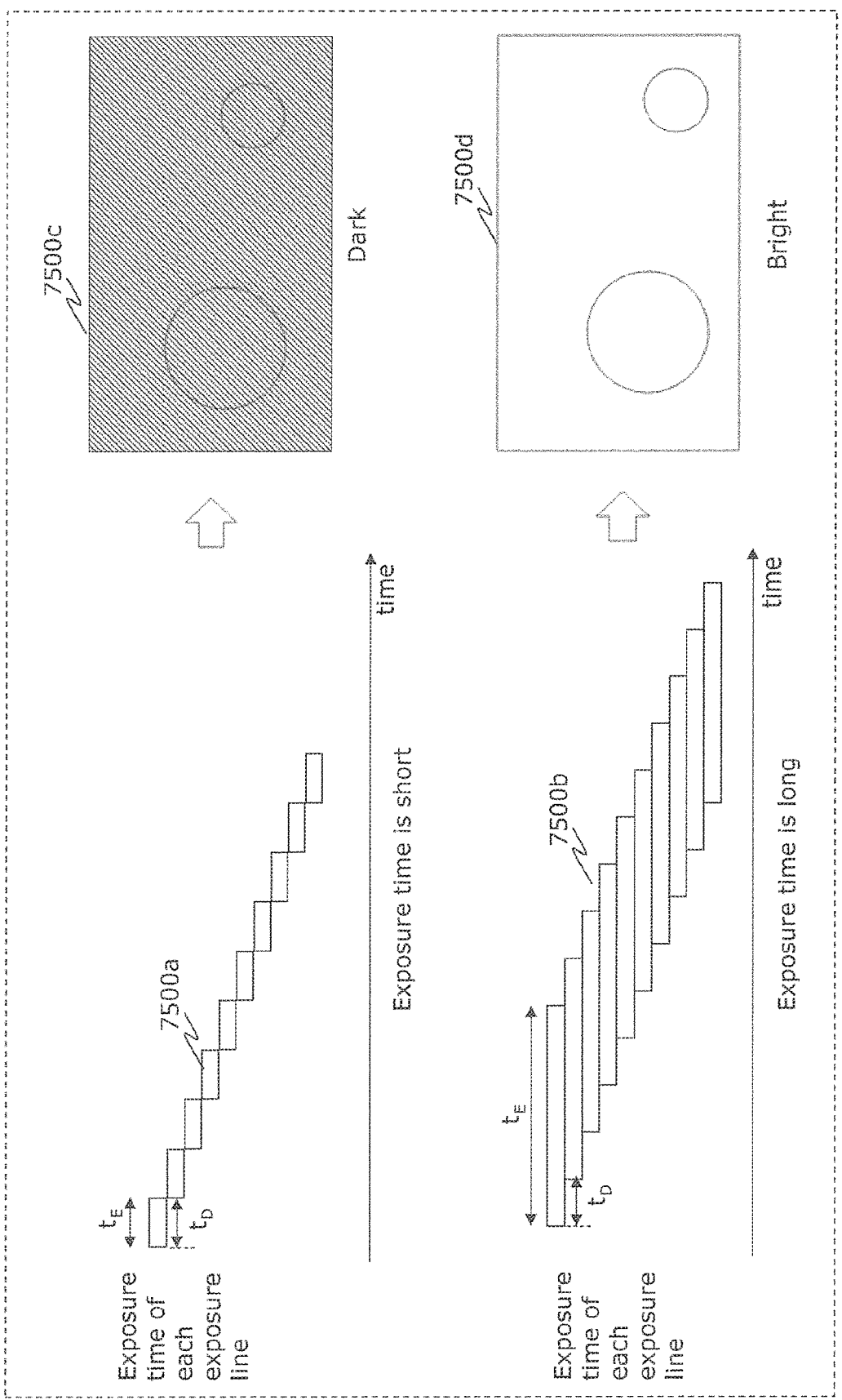
FIG. 44B illustrates an example of an observation method of luminance of a light emitting unit in Embodiment 5.

FIG. 44B illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for imaging an image of the same brightness can be reduced, an image with less noise can be obtained. Communication errors are prevented in this way.

Figure 44C:
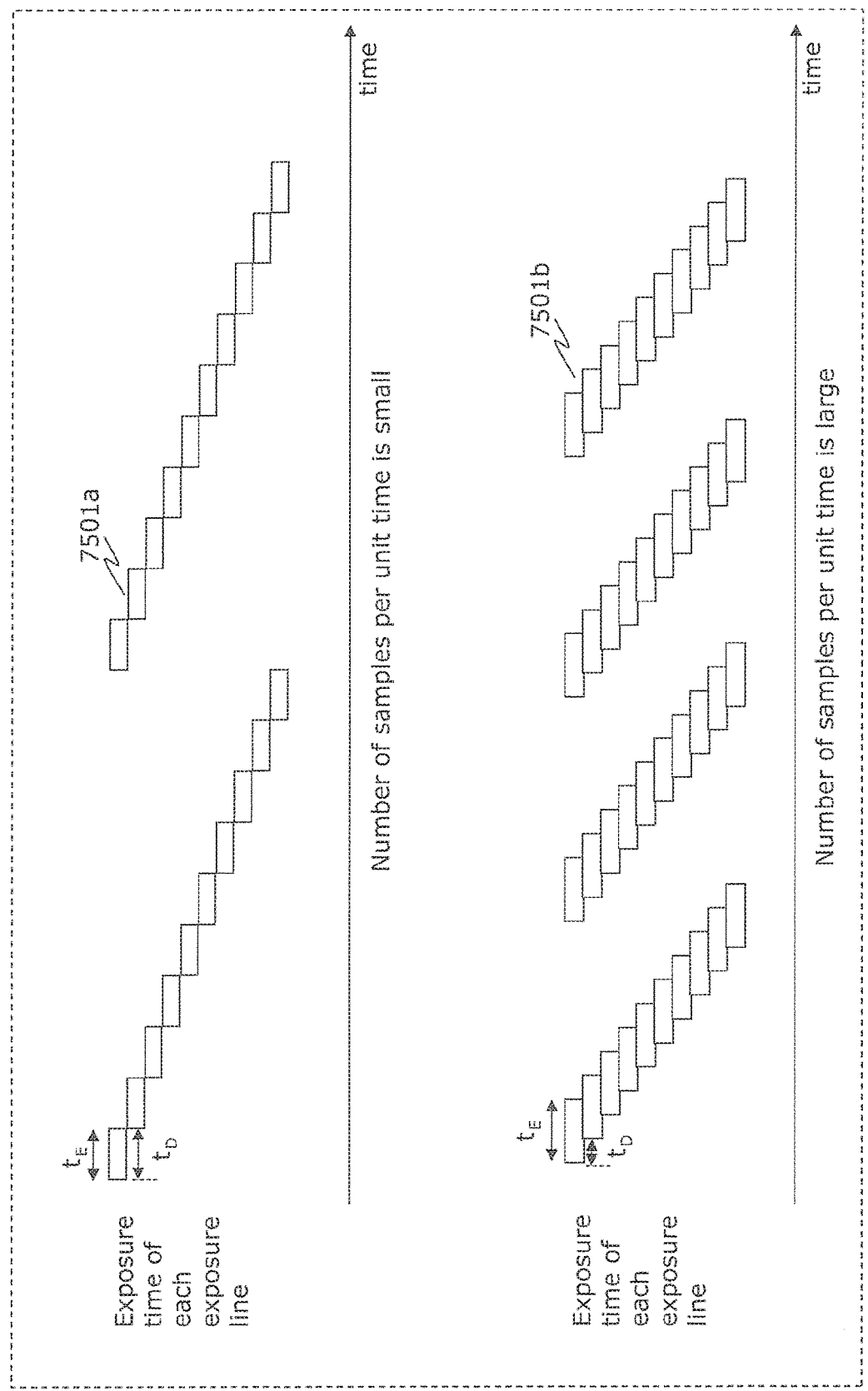
FIG. 44C illustrates an example of an observation method of luminance of a light emitting unit in Embodiment 5.

FIG. 44C illustrates the influence of the difference in exposure start time of each exposure line in the case where the exposure time is the same. In 7501a, the exposure end time of one exposure line and the exposure start time of the next exposure line are the same. In 7501b, the exposure of one exposure line ends after the exposure of the next exposure line starts. The structure in which the exposure times of adjacent exposure lines partially overlap each other as in 7501b allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 44B and 44C, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to $1/480$ second enables an appropriate bright line pattern to be generated. Here, it is necessary to set (exposure time)<$1/8 \times f$, where f is the frame frequency. Blanking during imaging is half of one frame at the maximum. That is, the blanking time is less than or equal to half of the imaging time. The actual imaging time is therefore $1/2f$ at the shortest. Besides, since 4-value information needs to be received within the time of $1/2f$, it is necessary to at least set the exposure time to less than $1/(2f \times 4)$. Given that the normal frame rate is less than or equal to 60 frames per second, by setting the exposure time to less than or equal to $1/480$ second, an appropriate bright line pattern is generated in the image data and thus fast signal transmission is achieved.

Figure 44D:
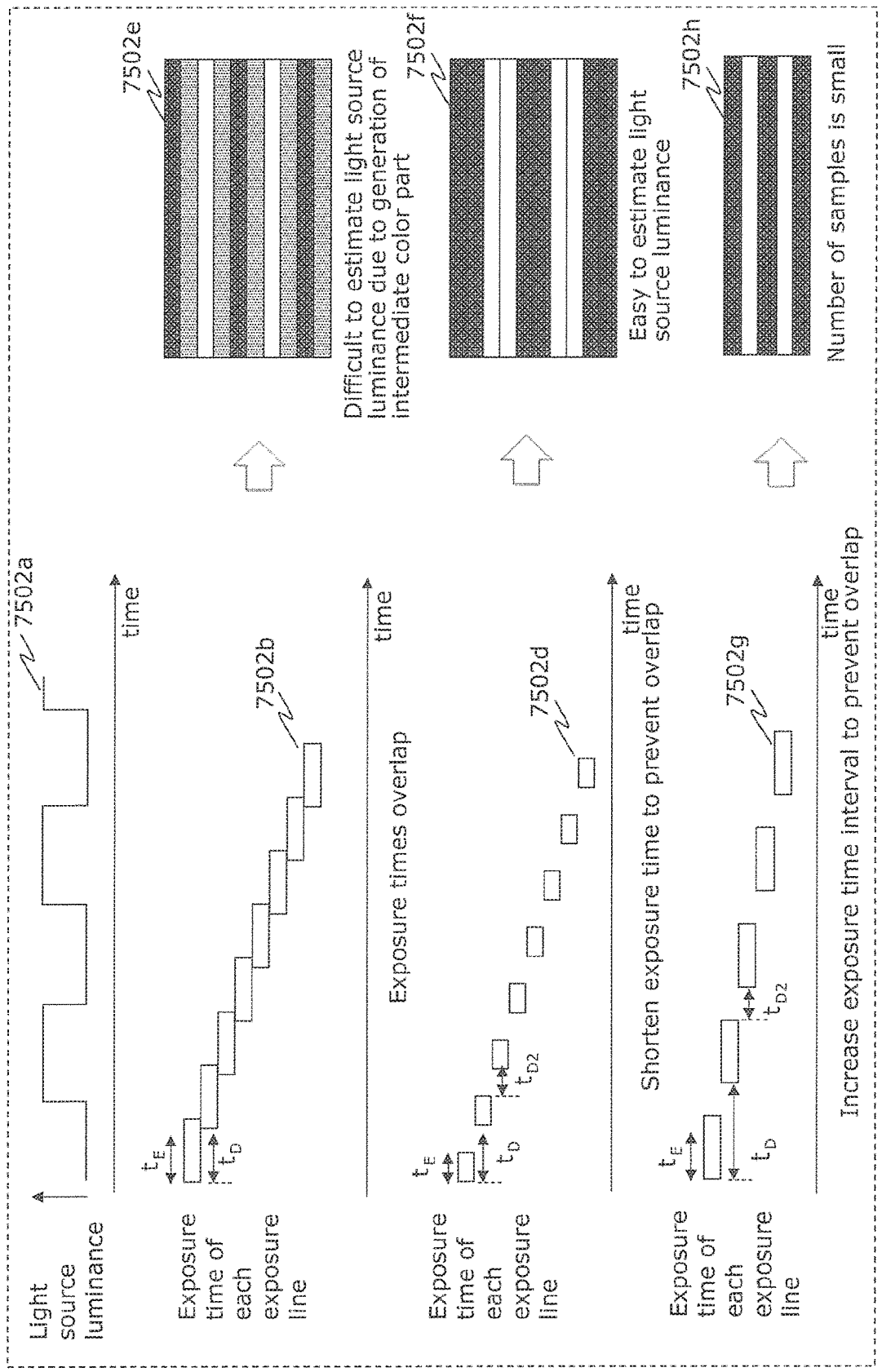
FIG. 44D illustrates an example of an observation method of luminance of a light emitting unit in Embodiment 5.

FIG. 44D illustrates the advantage of using a short exposure time in the case where each exposure line does not overlap in exposure time. In the case where the exposure time is long, even when the light source changes in luminance in a binary fashion as in 7502a, an intermediate-color part tends to appear in the captured image as in 7502e, making it difficult to recognize the luminance change of the light source. By providing a predetermined non-exposure blank time (predetermined wait time) $t_{D2}$ from when the exposure of one exposure line ends to when the exposure of the next exposure line starts as in 7502d, however, the luminance change of the light source can be recognized more easily. That is, a more appropriate bright line pattern can be detected as in 7502f. The provision of the predetermined non-exposure blank time is possible by setting a shorter exposure time $t_E$ than the time difference $t_D$ between the exposure start times of the exposure lines, as in 7502d. In the case where the exposure times of adjacent exposure lines partially overlap each other in the normal imaging mode, the exposure time is shortened from the normal imaging mode so as to provide the predetermined non-exposure blank time. In the case where the exposure end time of one exposure line and the exposure start time of the next exposure line are the same in the normal imaging mode, too, the exposure time is shortened so as to provide the predetermined non-exposure time. Alternatively, the predetermined non-exposure blank time (predetermined wait time) $t_{D2}$ from when the exposure of one exposure line ends to when the exposure of the next exposure line starts may be provided by increasing the interval $t_D$ between the exposure start times of the exposure lines, as in 7502g. This structure allows a longer exposure time to be used, so that a brighter image can be captured. Moreover, a reduction in noise contributes to higher error tolerance. Meanwhile, this structure is disadvantageous in that the number of samples is small as in 7502h, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure blank time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to 1/480 second for visible light communication. The use of the same reading method or circuit to read a signal eliminates the need to employ separate circuits for the normal imaging mode and the visible light communication mode. The circuit size can be reduced in this way.

Figure 44E:
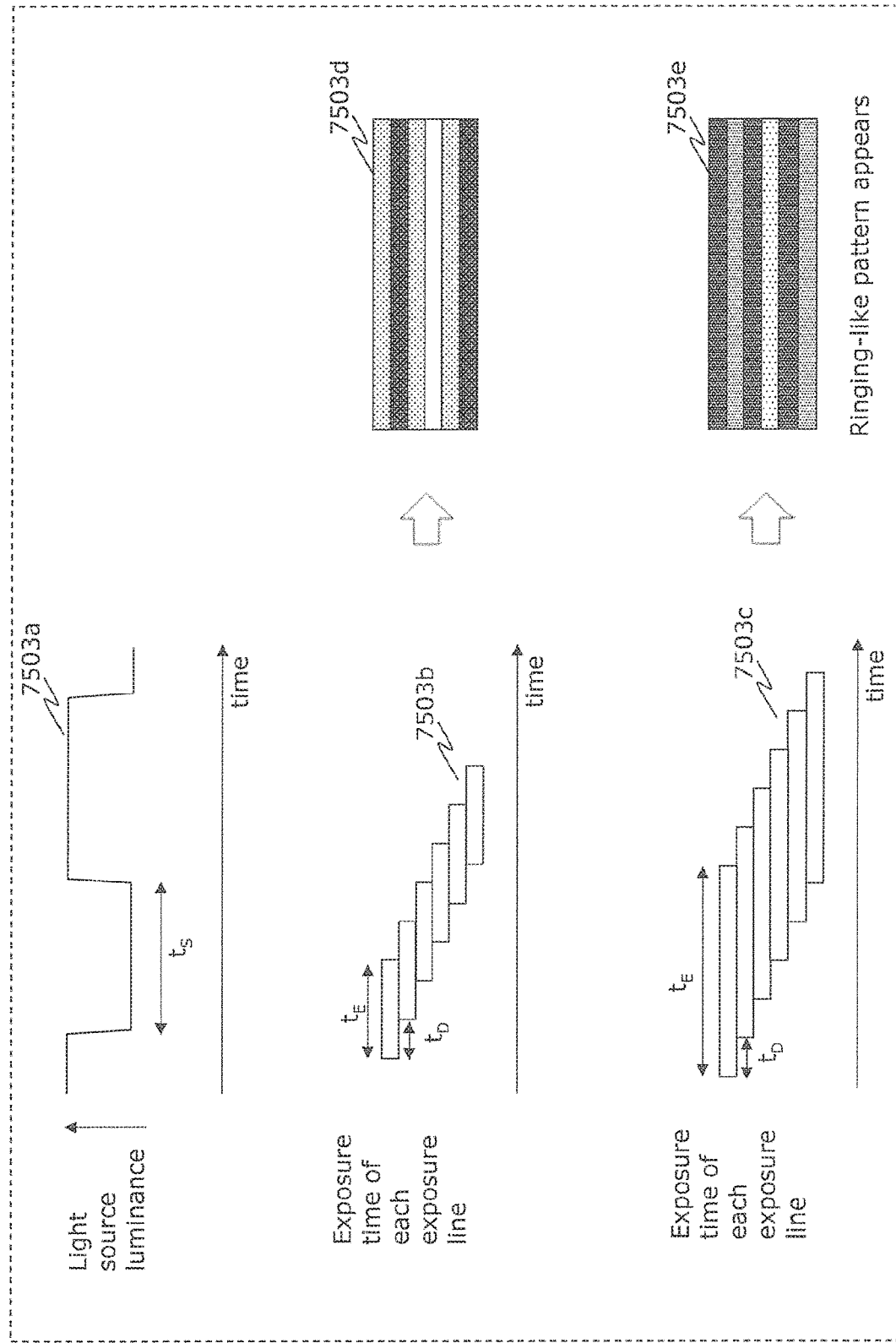
FIG. 44E illustrates an example of an observation method of luminance of a light emitting unit in Embodiment 5.

FIG. 44E illustrates the relation between the minimum change time $t_S$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503d, from which the luminance change of the light source is easily recognizable. In the case where $2t_E>t_S$, a bright line pattern different from the luminance change of the light source might be obtained, making it difficult to recognize the luminance change of the light source from the captured image.

FIG. 44F illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D>t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

Figure 44G:
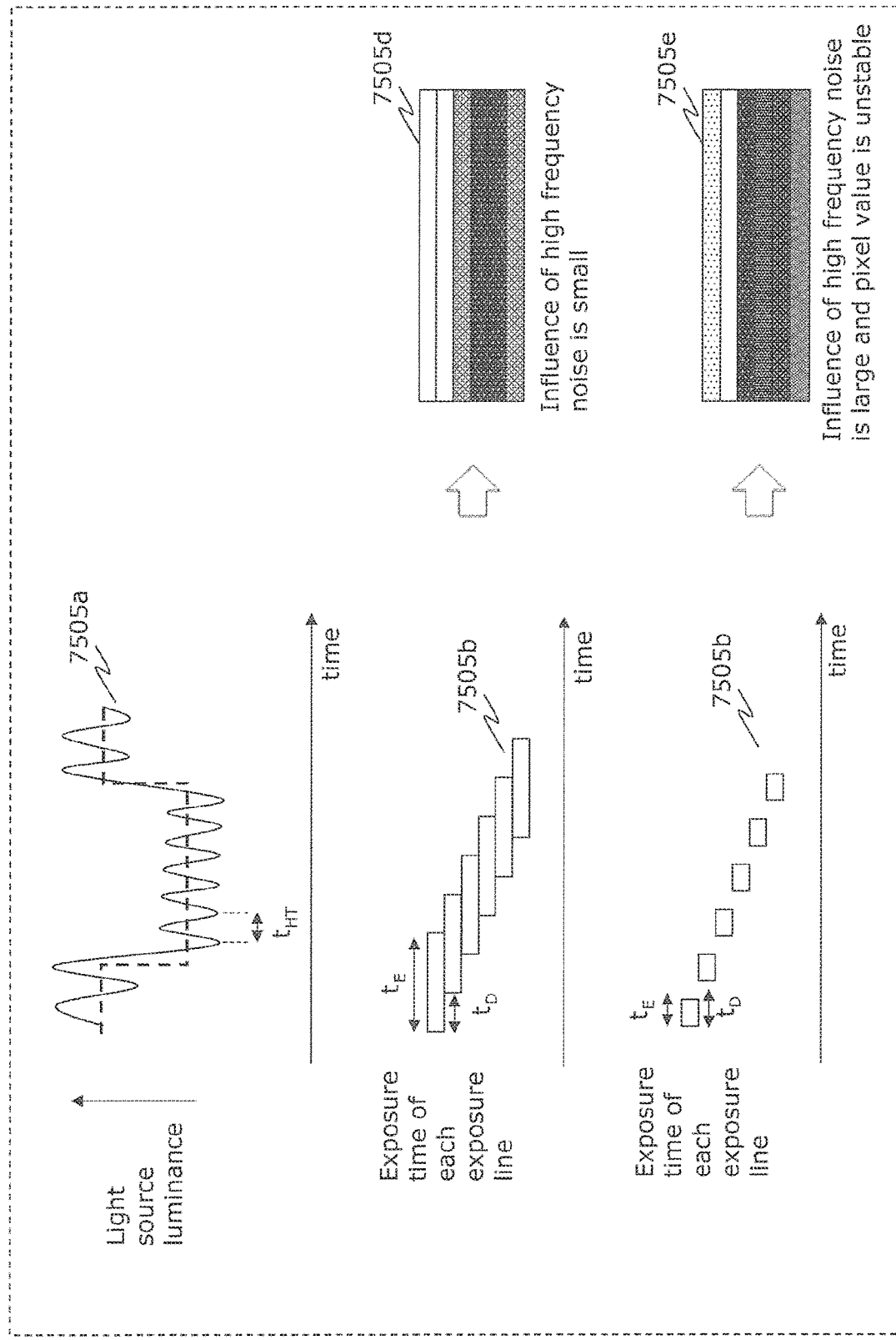
FIG. 44G illustrates an example of an observation method of luminance of a light emitting unit in Embodiment 5.

FIG. 44G illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E>t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

FIG. 44H is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 44I:
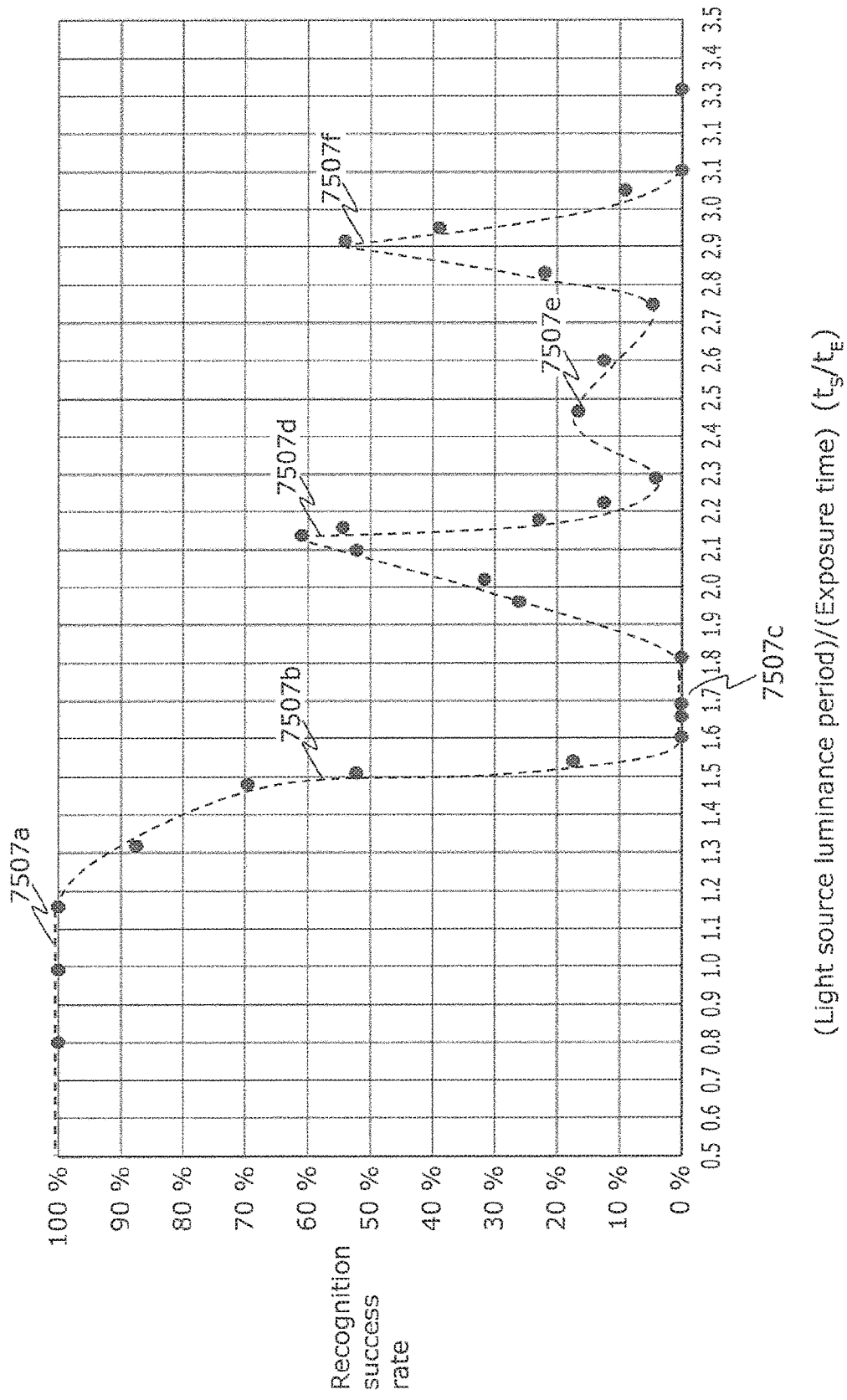
FIG. 44I illustrates an example of an observation method of luminance of a light emitting unit in Embodiment 5.
Figure 46:
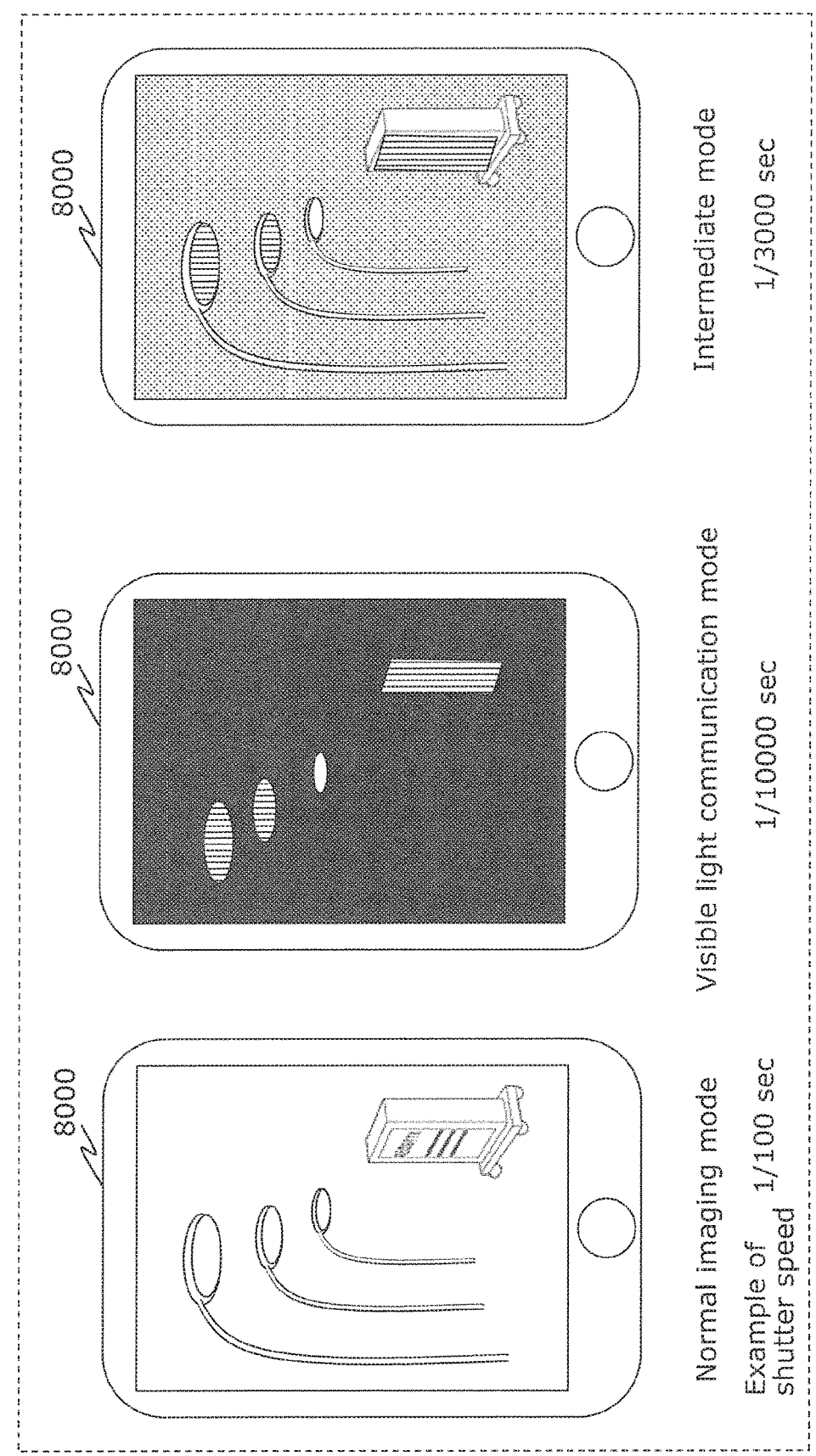
FIG. 46 illustrates an example of each mode of a receiver in Embodiment 5.

FIG. 44I illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period is by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507c, it increases again at 7507d, 7507e, and 7507f. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 46.

Figure 45:
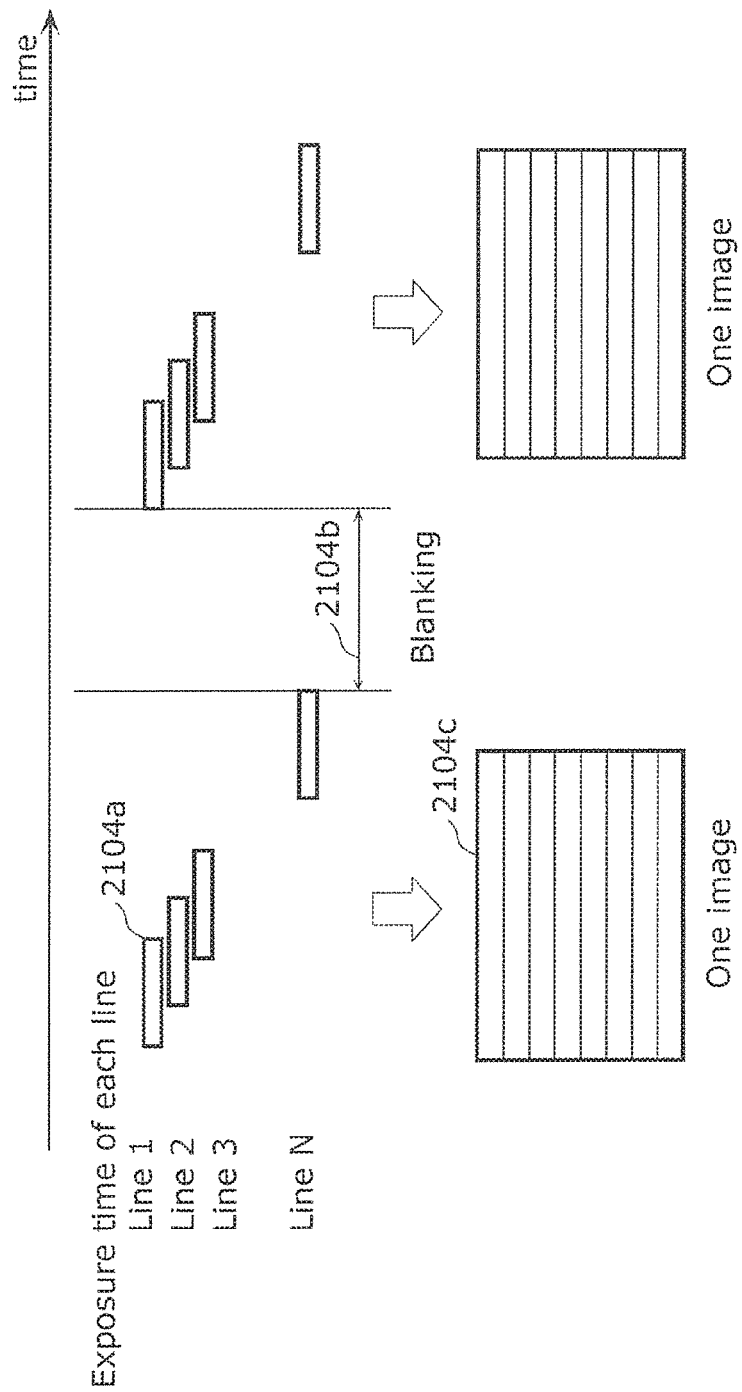
FIG. 45 illustrates an example of an observation method of luminance of a light emitting unit in Embodiment 5.

Depending on imaging devices, there is a time (blanking) during which no exposure is performed, as illustrated in FIG. 45.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 6

Figure 47:
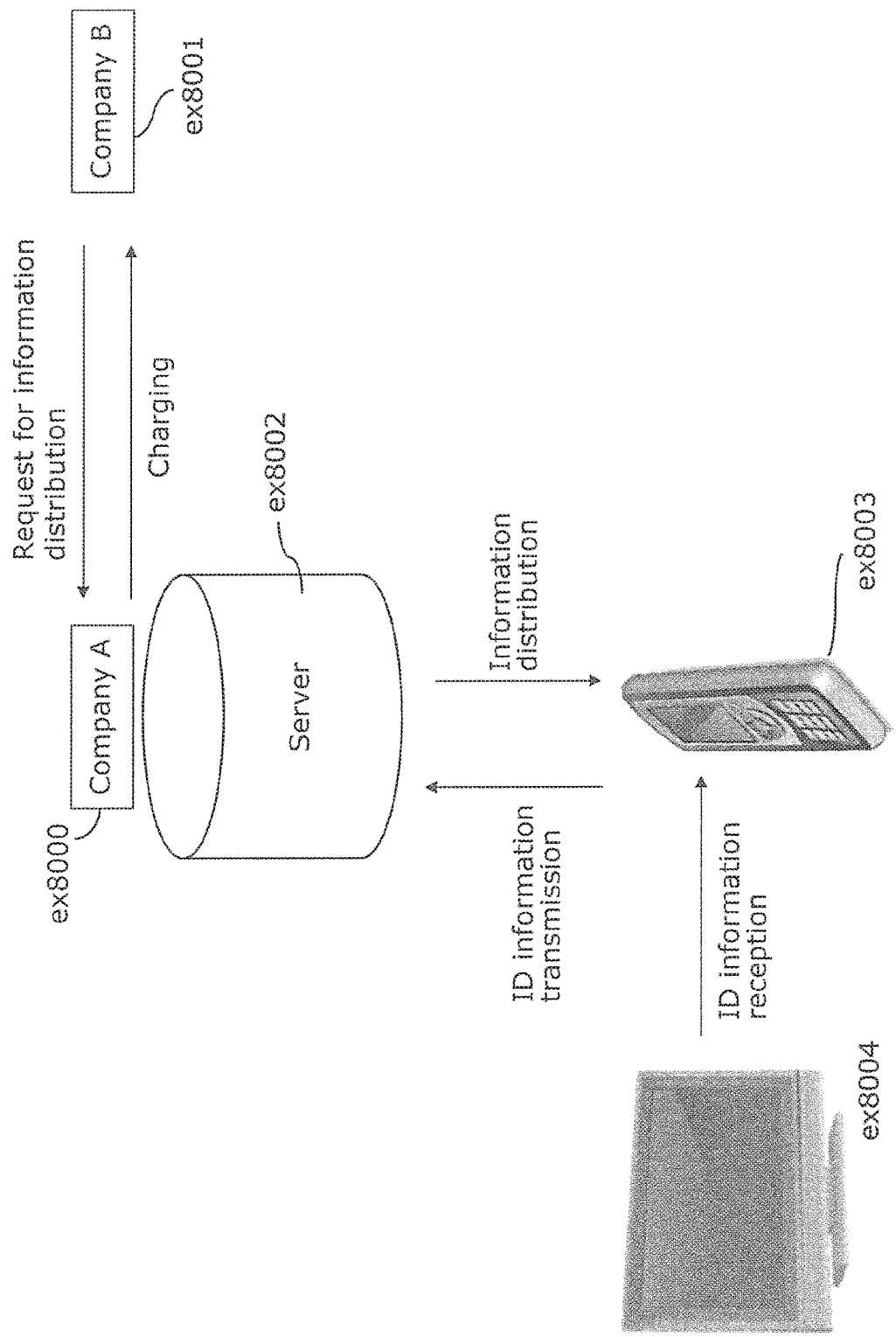
FIG. 47 illustrates a service provision system using the reception method described in any of the foregoing embodiments.

FIG. 47 is a diagram illustrating a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

Figure 48:
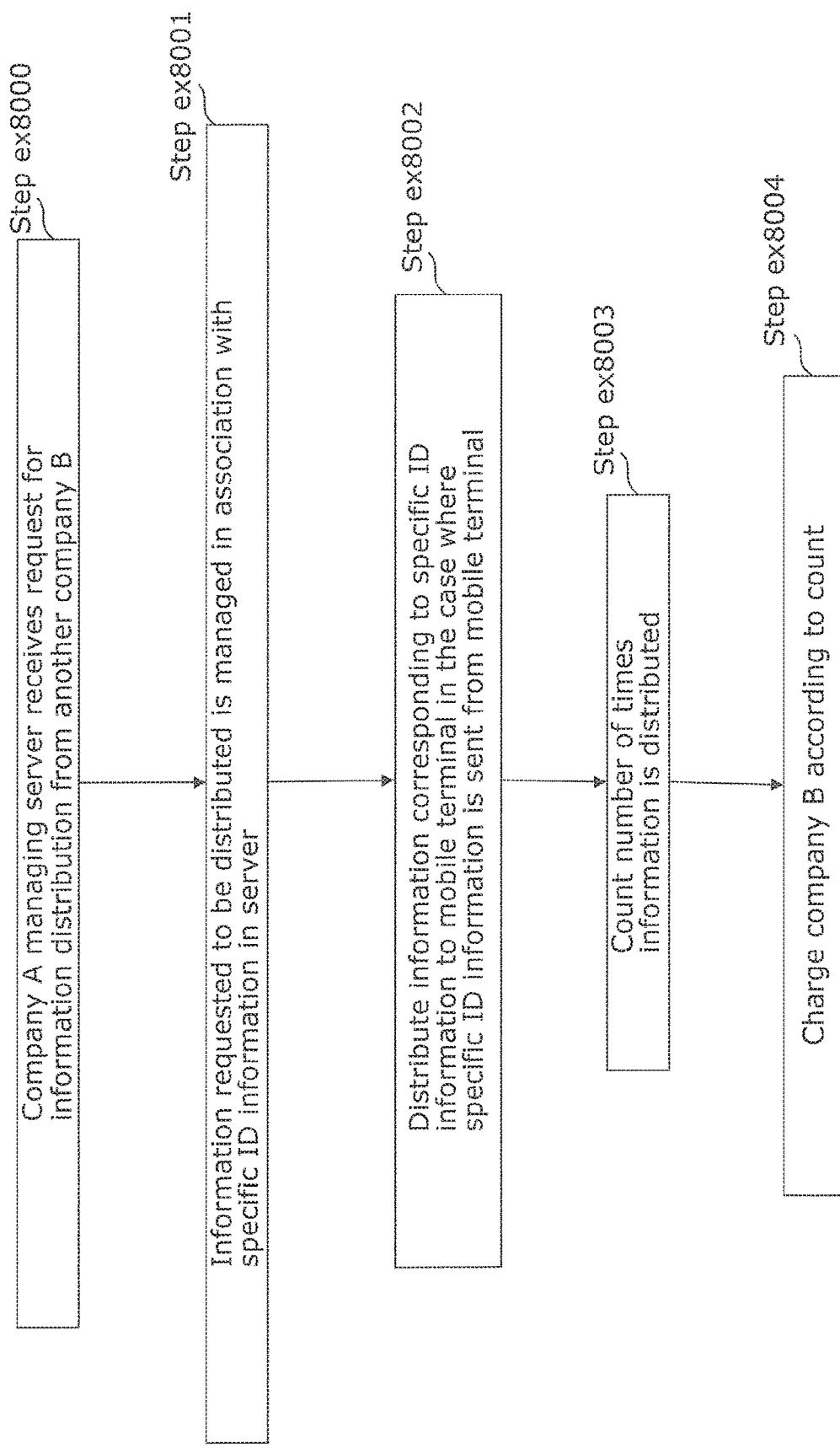
FIG. 48 is a flowchart illustrating flow of service provision.

FIG. 48 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

Figure 49:
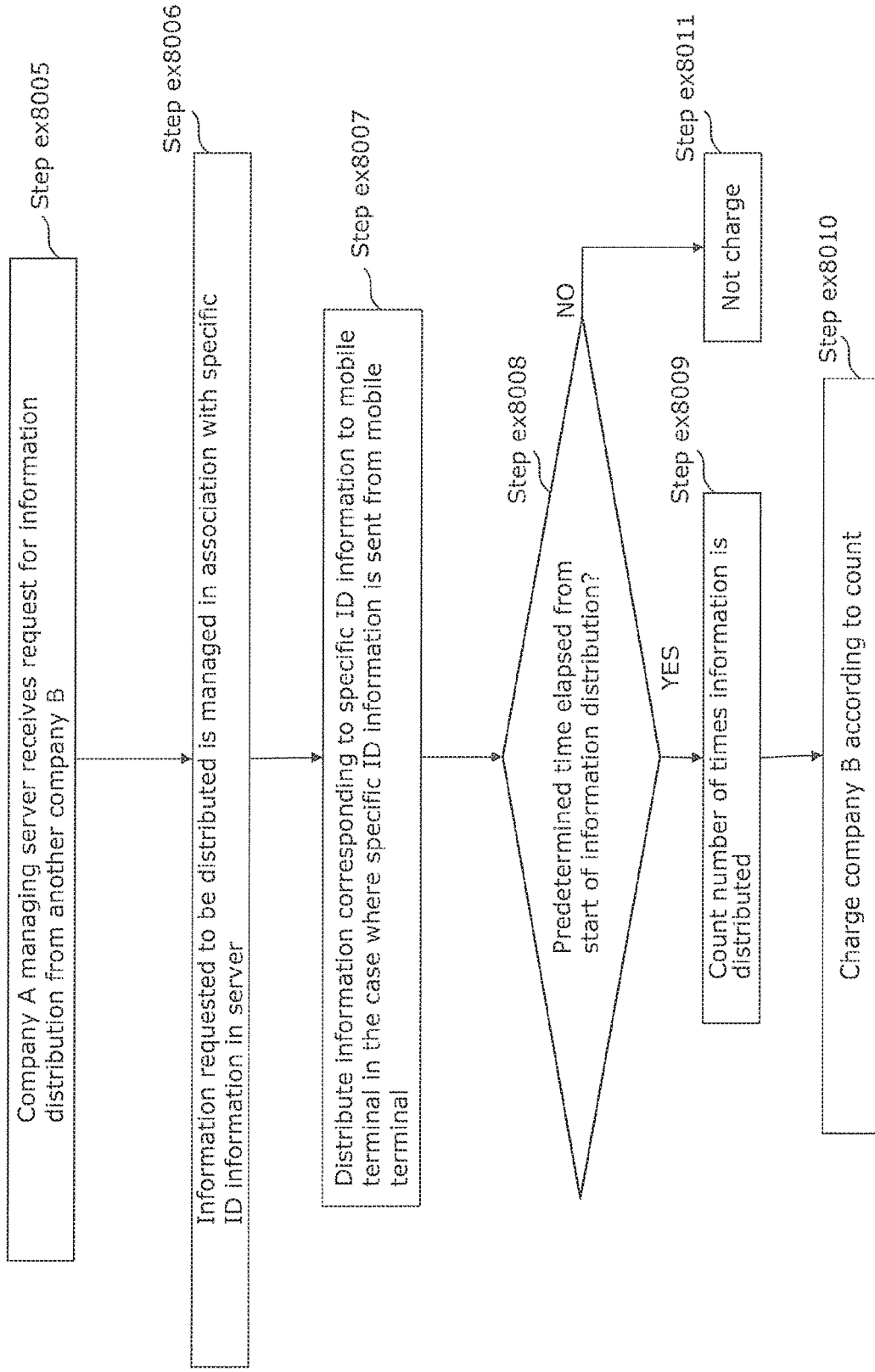
FIG. 49 is a flowchart illustrating service provision in another example.

FIG. 49 is a flowchart illustrating service provision in another example. The description of the same steps as those in FIG. 48 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

Figure 50:
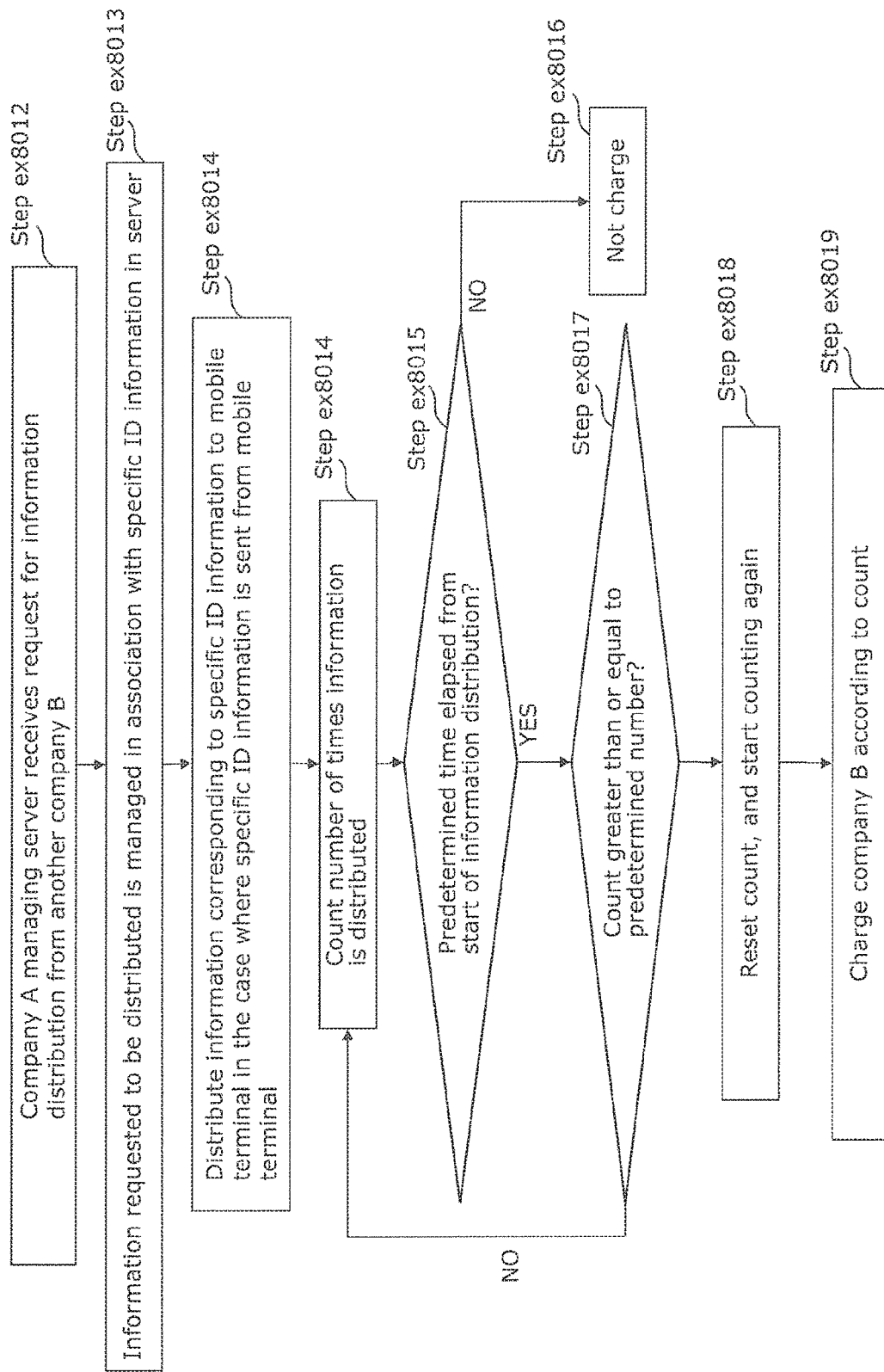
FIG. 50 is a flowchart illustrating service provision in another example.

FIG. 50 is a flowchart illustrating service provision in another example. The description of the same steps as those in FIG. 49 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

The present disclosure is applicable to a transmitter and the like, and in particular to a transmitter and the like used for communication with a mobile terminal such as a smartphone, a tablet terminal, or a mobile phone, and with a home electric appliance such as an air conditioner, a lighting device, or a rice cooker.

We claim:

1. An apparatus, comprising:
a light source;
a first memory storing a visible light signal;
a receiver configured to receive another visible light signal, which rewrites over the visible light signal stored in the first memory, by a communication method that is different from a visible light communication, and
a control circuit configured to
  (i) control a change in luminance of the light source in accordance with the visible light signal,
  (ii) determine whether the visible light signal is to be rewritten by the another visible light signal or not, based on a received password included in the communication method that is different from the visible light communication, the password being stored in a second memory in the apparatus, when the receiver receives the another visible light signal,
  (iii) rewrite the visible light signal by the another visible light signal when it is determined that the visible light signal is to be rewritten by the another visible light signal, and
  (iv) control the change in luminance of the light source to transmit another visible light signal.

2. The apparatus according to claim 1,
wherein the communication method is a blue tooth low energy communication method.

3. The apparatus according to claim 1,
wherein the receiver is further configured to receive the another visible light signal with the received password to rewrite the visible light signal,
wherein the control circuit is further configured to
  (v) determine whether the received password is identical to the stored password stored in the second memory or not,
  (vi) determine that the visible light signal is rewritten by the another visible light signal when the control circuit determines that the received password is identical to the stored password stored in the second memory, and
  (vii) determine that the visible light signal is not rewritten by the another visible light signal when the control circuit determines that the received password is not identical to the stored password stored in the second memory.

4. A system, comprising:
the apparatus according to claim 1; and
a system receiver configured to receive the visible light signal transmitted by the apparatus,
wherein the system receiver includes
  a processor, and
  a system receiver memory storing thereon a computer program, which when executed by the processor, causes the processor to be configured to
    (a) receive a plurality of signals, each of which includes an upper data and a bottom data, by a communication method that is different from the visible light communication,
    (b) receive the visible light signal by the visible light communication,
    (c) compare the received visible light signal with the bottom data in each of the plurality of signals,
    (d) select one of the plurality of signals including the bottom data, which corresponds to the received visible light signal, and
    (e) output the selected one of the plurality of signals.

5. The system according to claim 4,
wherein the communication method is a blue tooth low energy communication method.

6. An apparatus, comprising:
a light source;
a processor; and
a first memory storing a visible light signal and storing thereon a computer program, which when executed by the processor, causes the processor to be configured to
  (i) receive another visible light signal, which rewrites over the visible light signal stored in the first memory, by a communication method that is different from a visible light communication,
  (ii) determine whether the visible light signal is rewritten by the another visible light signal or not, based on a password included in the communication method that is different from the visible light communication, the password being stored in a second memory in the apparatus, when the another visible light signal is received,
  (iii) rewrite the visible light signal by the another visible light signal when the visible light signal is determined to be rewritten by the another visible light signal, and
  (iv) control a change in luminance of the light source to transmit the another visible light signal.

7. A method, comprising:
storing a visible light signal in a first memory;
controlling, by a control circuit, a change in luminance of a light source in accordance with the visible light signal,
receiving, by a receiver, another visible light signal, that rewrites over the visible light signal stored in the first memory, by a communication process that is different from a visible light communication,
determining, by the control circuit, whether the visible light signal is to be rewritten by the another visible light signal or not, based on a password included in the communication method that is different from the visible light communication, the password being stored in a second memory, when the receiver receives the another visible light signal, rewriting, by the control circuit, the visible light signal by the another visible light signal when it is determined that the visible light signal is to be rewritten by the another visible light signal, and
controlling the change in luminance of the light source to transmit another visible light signal.

8. The method according to claim 7,
wherein the communication process is a blue tooth low energy communication process.

9. The method according to claim 7, further comprising:
receiving, by the receiver, the another visible light signal with a password to rewrite the visible light signal,
determining, by the control circuit, whether the received password is identical to the stored password stored in the second memory or not;
determining, by the control circuit, that the visible light signal is rewritten by the another visible light signal when the control circuit determines that the received password is identical to the stored password stored in the second memory, and
determining, by the control circuit, that the visible light signal is not rewritten by the another visible light signal when the control circuit determines that the received password is not identical to the stored password stored in the second memory.

10. The method according to claim 7, further comprising:
receiving, by a system receiver, the visible light signal transmitted by the apparatus,
wherein the system receiver includes
  a processor, and
  a system receiver memory storing thereon a computer program, which when executed by the processor, causes the processor to
    (a) receive a plurality of signals, each of which includes an upper data and a bottom data, by a communication process that is different from the visible light communication,
    (b) receive the visible light signal by the visible light communication,
    (c) compare the received visible light signal with the bottom data in each of the plurality of signals,
    (d) select one of the plurality of signals including the bottom data, which corresponds to the received visible light signal, and
    (e) output the selected one of the plurality of signals.

11. The method according to claim 10,
wherein the communication process is a blue tooth low energy communication process.

12. A tangible computer-readable storage medium that stores therein a computer-executable computer program, which when executed by a computer, causes the computer to be configured to:
  store a visible light signal in a first memory,
  receive another visible light signal, which rewrites over the visible light signal stored in the first memory, by a communication method that is different from a visible light communication,
  determine whether the visible light signal is rewritten by the another visible light signal or not, based on a received password included in the communication method that is different from the visible light communication, the password being stored in a second memory, when the another visible light signal is received,
  rewrite the visible light signal by the another visible light signal when the visible light signal is determined to be rewritten by the another visible light signal, and
  control a change in luminance of the light source to transmit the another visible light signal.

* * * * *